US011999885B2

(12) United States Patent
Pitner et al.

(10) Patent No.: US 11,999,885 B2
(45) Date of Patent: Jun. 4, 2024

(54) HYDROPORPHYRIN BEADS WITH NARROW FLUORESCENCE EMISSIONS

(71) Applicant: NIRvana Sciences, Research Triangle Park, NC (US)

(72) Inventors: James Bruce Pitner, Research Triangle Park, NC (US); Rosemary B. Evans-Storms, Durham, NC (US); Duane A. Olsen, Hillsborough, NC (US)

(73) Assignee: NIRVANA SCIENCES INC., Research Triangle Park, NC (US)

( * ) Notice: Subject to any disclaimer, the term of this patent is extended or adjusted under 35 U.S.C. 154(b) by 0 days.

(21) Appl. No.: 16/308,285

(22) PCT Filed: Jun. 12, 2017

(86) PCT No.: PCT/US2017/037073
§ 371 (c)(1),
(2) Date: Dec. 7, 2018

(87) PCT Pub. No.: WO2017/214637
PCT Pub. Date: Dec. 14, 2017

(65) Prior Publication Data
US 2019/0264102 A1    Aug. 29, 2019

Related U.S. Application Data

(60) Provisional application No. 62/348,532, filed on Jun. 10, 2016.

(51) Int. Cl.
*C09K 11/06* (2006.01)
*C09K 11/02* (2006.01)
*G01N 21/64* (2006.01)

(52) U.S. Cl.
CPC ............. *C09K 11/06* (2013.01); *C09K 11/02* (2013.01); *G01N 21/64* (2013.01); *C09K 2211/186* (2013.01)

(58) Field of Classification Search
CPC ... C09K 11/02; C09K 11/06; C09K 2211/186; G01N 21/64; B01J 2531/025; A61K 47/546; A61K 41/0076; A61K 41/0071; A61K 41/0095; A61L 41/0061
See application file for complete search history.

(56) References Cited

U.S. PATENT DOCUMENTS

| 6,376,483 | B1 | 4/2002 | Robinson |
| 6,559,374 | B2 | 5/2003 | Lindsey et al. |
| 6,913,935 | B1 | 7/2005 | Thomas |
| 6,946,533 | B2 | 9/2005 | Grubbs et al. |
| 7,064,103 | B2 | 6/2006 | Pitner et al. |
| 7,332,599 | B2 | 2/2008 | Yu et al. |
| 7,408,058 | B2 | 8/2008 | Lindsey et al. |
| 7,423,160 | B2 | 9/2008 | Lindsey et al. |
| 7,470,785 | B2 | 12/2008 | Lindsey et al. |
| 7,501,508 | B2 | 3/2009 | Lindsey et al. |
| 7,534,807 | B2 | 5/2009 | Kim et al. |
| 7,553,977 | B2 | 6/2009 | Lindsey et al. |
| 7,582,751 | B2 | 9/2009 | Lindsey et al. |
| 7,678,900 | B2 | 3/2010 | Lindsey et al. |

(Continued)

FOREIGN PATENT DOCUMENTS

| CN | 101940948 B | 1/2011 |
| WO | WO 2000/073308 | 12/2000 |

(Continued)

OTHER PUBLICATIONS

Spagnul et al. Immobilized photosensitizers for antimicrobial applications. J. Photochemistry & photobiology, 2015, vol. 150, pp. 11-130. (Year: 2015).*
Goa et al. multi-functionality of cationic porphyrin-immobilized polymeric microspheres prepared by synchronously synthesizing and immobilizing pyridylporphyrin on surfaces of polymeric microspheres. Materials Chemistry and Physics 2012, vol. 134, pp. 1049-1058. (Year: 2012).*
Abuteen et al., "The evaluation of NIR-absorbing porphyrin derivatives as contrast agents in photoacoustic imaging," Phys. Chem. Chem. Phys., 2013, 15, 18502.
Chen et al., "Synthesis and Physicochemical Properties of Metal-lobacteriochlorins," Inorganic Chemistry, vol. 51, No. 17, pp. 9443-9464 (Jan. 1, 2012), XP055466897.

(Continued)

*Primary Examiner* — Shafiqul Haq
(74) *Attorney, Agent, or Firm* — Jenkins, Taylor & Hunt, P.A.

(57) ABSTRACT

Provided are fluorescent microparticles and/or nanoparticles that have a polymeric matrix and at least one porphyrinic macrocycle associated therewith. The porphyrinic macrocycles associated with the presently disclosed fluorescent microparticles and/or nanoparticles are in some embodiments selected from the group consisting of porphyrins (including 17,18-didehydrophorbines), chlorins (including phorbines), bacteriochlorins (including bacteriophorbines), and isobacteriochlorins (including isobacteriochlorins containing a fused "E" ring). In some embodiments, the porphyrinic macrocycles have structures selected from Formulas I and H. Also provided are populations made up of a plurality of distinct fluorescent microparticles and/or nanoparticles, methods of making and using the same, sets of separately detectable fluorescent microparticles and/or nanoparticles and methods for preparing and using the same, porphyrinic macrocycle-containing dyads conjugated to particles and methods for using the same to calibrate multi-laser flow cytometers, align and/or calibrate confocal fluorescence microscopes, and/or differentially labeling cells and/or other biomolecules, and biomolecules such as antibodies, fragments, and derivatives thereof covalently conjugated to the presently disclosed fluorescent microparticles and/or nanoparticles and/or to the presently disclosed porphyrinic macrocycle-containing dyads.

11 Claims, 25 Drawing Sheets

(56) References Cited

U.S. PATENT DOCUMENTS

| | | | |
|---|---|---|---|
| 7,745,618 | B2 | 6/2010 | Dogutan et al. |
| 7,947,828 | B2 | 5/2011 | Yu et al. |
| 7,947,829 | B2 | 5/2011 | Kiper et al. |
| 7,994,312 | B2 | 8/2011 | Lindsey et al. |
| 8,080,653 | B2 | 12/2011 | Lindsey et al. |
| 8,097,609 | B2 | 1/2012 | Borbas et al. |
| 8,173,691 | B2 | 5/2012 | Kim et al. |
| 8,173,692 | B2 | 5/2012 | Kim et al. |
| 8,187,824 | B2 * | 5/2012 | Lindsey ............... G01N 33/533 435/7.23 |
| 8,207,329 | B2 | 6/2012 | Lindsey et al. |
| 8,664,260 | B2 | 3/2014 | Kim et al. |
| 9,303,165 | B2 | 4/2016 | Lindsey et al. |
| 9,365,722 | B2 | 6/2016 | Lindsey et al. |
| 9,822,123 | B2 | 11/2017 | Kim et al. |
| 2002/0155520 | A9 * | 10/2002 | Lichtman .......... A61F 13/15203 435/40.5 |
| 2003/0167002 | A1 | 9/2003 | Nagar et al. |
| 2008/0019921 | A1 * | 1/2008 | Zhang ................ A61K 49/0004 424/9.6 |
| 2010/0084610 | A1 | 4/2010 | Ftime et al. |
| 2012/0322999 | A1 | 12/2012 | Lindsey et al. |
| 2014/0371286 | A1 | 12/2014 | Kim et al. |
| 2015/0316511 | A1 | 11/2015 | Guo |
| 2016/0077083 | A1 | 3/2016 | Teich et al. |
| 2016/0082127 | A1 | 3/2016 | Lai et al. |
| 2016/0082134 | A1 | 3/2016 | Homme et al. |
| 2019/0085237 | A1 * | 3/2019 | Miteva ................... C09K 11/06 |
| 2020/0009272 | A1 | 1/2020 | Pitner et al. |
| 2021/0361783 | A1 | 11/2021 | Pitner et al. |

FOREIGN PATENT DOCUMENTS

| | | |
|---|---|---|
| WO | WO 2002/000662 | 1/2002 |
| WO | WO 2002/009196 | 1/2002 |
| WO | WO 2007/064841 | 6/2007 |
| WO | WO 2015/084270 | 6/2015 |
| WO | WO2016/178191 A1 | 11/2016 |
| WO | WO 2022/147533 | 7/2022 |

OTHER PUBLICATIONS

De Zerda et al., "Family of Enhanced Photoacoustic Imaging Agents for High Sensitivity and Multiplexing Studies in Living Mice," ACS Nano. Jun. 26, 2012; 6(6): 4694-4701.

European Search Report corresponding to European Patent Application No. 17811169.6 dated Jan. 8, 2020.

Extended European Search Report corresponding to European Patent Application No. 17811169.6 dated May 26, 2020.

Extended European Search Report corresponding to European Patent Application No. 18747932.4 dated Feb. 4, 2021.

Fan et al. "Regioselective 15-Bromination and Functionalization of a Stable Synthetic Bacteriochlorin", J Org Chem. 2007. vol. 72(14), pp. 5350-5357, entire document.

Hu et al. (2016) Panchromatic chromophore-tetrapyrrole light-harvesting arrays constructed from Bodipy, perylene, terrylene, porphyrin, chlorin, and bacteriochlorin building blocks. New J Chem 40:8032-8052.

International Preliminary Report on Patentability corresponding to International Application No. PCT/US2017/037073 dated Dec. 11, 2018.

International Preliminary Report on Patentability corresponding to International Application No. PCT/US2018/016672 dated Aug. 6, 2019.

International Search Report corresponding to International Application No. PCT/US2017/037073 dated Aug. 28, 2017.

International Search Report corresponding to International Application No. PCT/US2018/016672 dated Mar. 28, 2018.

International Search Report corresponding to International Application No. PCT/US2020/033606 dated Oct. 1, 2020.

International Search Report corresponding to International Application No. PCT/US2020/033627 dated Sep. 30, 2020.

Jiang et al., "Hydrophilic tetracarboxy bacteriochlorins for photonics applications," Org. Biomol. Chem., 2014, 12, 86.

Jiang et al., "Hydrophilic tetracarboxy bacteriochlorins for photonics applications," The Royal Society of Chemistry, pp. S1-S81 (2013).

Jiang et al., "Polarity-tunable and wavelength-tunable bacteriochlorins bearing a single carboxylic acid or NHS ester. Use in a protein bioconjugation model system," New J. Chem., 2015, 39, 403.

Laha et al., "Synthetic Chlorins Bearing Auxochromes at the 3- and 13-Positions," J. Org. Chem. 2006, 71, 4092-4102.

Lee et al., Dye-labeled polystyrene latex microspheres prepared via a combined swelling-diffusion technique, Journal of colloid and interface science, (2011), vol. 363, No. 1, pp. 137-144.

Lee et al., Preparation of Self-Assembled Crystalline Microparticles with Bispyridyl Zn-Porphyrin, Bulletin Korean Chemical Society 33(4), pp. 1317-1320, 2012.

Lindsey (2015) De Novo Synthesis of Gem-Dialkyl Chlorophyll Analogues for Probing and Emulating our Green World. Chem Rev 115:6534-6620.

Liu et al., "Bioconjugatable, PEGylated hydroporphyrins for photochemistry and photomedicine. Narrow-band, red-emitting chlorins," The Royal Society of Chemistry and the Centre National de la Recherche Scientifique (2016).

Luciano et al. "Modifications of Porphyrins and Hydroporphyrins for Their Solubilization in Aqueous Media", Molecules. 2017. vol. 22, pp. 980, entire document.

Madison et al. (1990) Latex nanosphere delivery system (LNDS): novel nanometer-sized carriers of fluorescent dyes and active agents selectively target.

Muthiah et al. (2008) Synthesis and Excited-state Photodynamics of a Chlorin-Bacteriochlorin Dyad—Through-space Versus Through-bond Energy Transfer in Tetrapyrrole Arrays. Photochem Photobiol 84:786-801.

Office Action corresponding to Japanese Patent Application No. 2019517192 dated Feb. 15, 2021. Translation.

Office Action corresponding to U.S. Appl. No. 16/483,394 dated Jun. 10, 2021.

Office Action corresponding to U.S. Appl. No. 16/483,394 dated Oct. 29, 2020.

Partial Supplementary European Search Report corresponding to European Patent Application No. 17811169.6 dated Jan. 8, 2020.

Pilch et al., "Molecular symmetry determines the mechanism of a very efficient ultrafast excitation-to-heat conversion in Ni-substituted chlorophylls," Biochimica et Biophysica Acta 1827 (2013) 30-37.

Pitner et al., "Chlorins: A novel family of violet laser-excitable red to far-red fluorophores for polychromatic flow cytometry," submitted Feb. 17, 2016.

Ptaszek et al., "Near-infrared molecular imaging probes based on chlorin-bacteriochlorin dyads," Proc. of SPIE vol. 7576, 75760E-1-75760E-9 (2010).

Ruzie et al. "Tailoring a Bacteriochlorin Building Block with Cationic, Amphipathic, or Lipophilic Substituents", J. Org. Chem. 2008. vol. 73, pp. 5806-5820, entire document, especially: p. 5814, Table 2, Entry 2, Product BC-16.

Schaberle et al., "Multi-spectral photoacoustic mapping of bacteriochlorins diffusing through the skin: exploring a new PAT contrast agent," Molecular Imaging III, SPIE, 1000 20TH St., Bellingham WA 98225-6705 USA, vol. 8089, No. 1, pp. 1-8 (Jun. 9, 2011), XP060015394.

Sun et al. (2013) Synthesis and Characterization of Lipophilic, Near-Infrared Absorbing Metallobacteriochlorins Chem J Chin Univ 34:776-781.

Taniguchi et al. (2008) Accessing the near-infrared spectral region with stable, synthetic, wavelength-tunable bacteriochlorins. New J Chem 32:947-958.

Written Opinion of the International Searching Authority corresponding to International Application No. PCT/US2017/037073 dated Aug. 18, 2017.

Written Opinion of the International Searching Authority corresponding to International Application No. PCT/US2018/016672 dated Mar. 28, 2018.

(56) References Cited

OTHER PUBLICATIONS

Written Opinion of the International Searching Authority corresponding to International Application No. PCT/US2020/033606 dated Oct. 1, 2020.
Written Opinion of the International Searching Authority corresponding to International Application No. PCT/US2020/033627 dated Sep. 30, 2020.
Wu et al., "Squaraine-Based Polymer Dots with Narrow, Bright Near-Infrared Fluorescence for Biological Applications," J. Am. Chem. Soc. 2015, 137, 173-178.
Yang et al. (2011) Photophysical Properties and Electronic Structure of Stable, Tunable Synthetic Bacteriochlorins: Extending the Features of Native Photosynthetic Pigments. J Phys Chem B 115:10801-10816.
Yu et al. (2014) Strongly Conjugated Hydroporphyrin Dyads: Extensive Modification of Hydroporphyrins' Properties by Expanding the Conjugated System. J Org Chem 79:7910-7925.
Yu et al., "Near-IR Emissive Chlorin-Bacteriochlorin Energy-Transfer Dyads with a Common Donor and Acceptors with Tunable Emission Wavelength," J. Org. Chem. 2013, 78, 10678-10691.
Zhang et al., "Bioconjugatable, PEGylated hydroporphyrins for photochemistry and photomedicine. Narrow-band, near-infrared-emitting bacteriochlorins," NewJ.Chem., 2016, 40, 7750.
Decision to Grant corresponding to Japanese Patent Application No. 2019517192 dated Jan. 31, 2022.
Office Action and Search Report corresponding to Chinese Patent Application No. 201780043650.6 dated Dec. 3, 2021. Translations.
Office Action corresponding to Chinese Patent Application No. 201880019863.X dated Nov. 2, 2021. Translation.
Office Action corresponding to Japanese Patent Application No. 2019563327 dated Jan. 21, 2022.
Office Action corresponding to U.S. Appl. No. 16/483,394 dated Mar. 17, 2022.
Office Action corresponding to U.S. Appl. No. 17/140,920 dated May 26, 2022.
International Search Report corresponding to International Application No. PCT/US2022/011120 dated May 18, 2022.
Krayer et al. (2009) Refined syntheses of hydrodipyrrin precursors to chlorin and bacteriochlorin building blocks. Journal of Porphyrins and Phthalocyanines 13(10): 1098-1110.
Laha et al. (2003) A Scalable Synthesis of Meso-Substituted Dipyrromethanes. Organic Process Research & Development 7(6):799-812.
Liu et al., (2018), Chlorophyll-Inspired Red-Region Fluorophores:.
Liu & Lindsey (2016) Northern-Southern Route to Synthetic Bacteriochlorins. J Org Chem 81:11882-11897.
Notice of Publication Corresponding to U.S. Appl. No. 17/140,920 dated Nov. 26, 2021.
Notice of Publication Corresponding to Japanese Patent Application Serial No. 2019-517192 dated Mar. 3, 2022.
Notice of Publication Corresponding to European Patent Application Serial No. 20810806.8 dated Feb. 2, 2022.
Notice of Publication Corresponding to U.S. Appl. No. 17/612,971 dated Aug. 11, 2022.
Office Action corresponding to Chinese Patent Application No. 201880019863.X dated Jul. 4, 2022. Translation.
Office Action corresponding to Chinese Patent Application No. 201780043650.6 dated Sep. 5, 2022.
Office Action corresponding to European Patent Application No. 17811169.6 dated Oct. 19, 2022.
Office Action (Final) corresponding to U.S. Appl. No. 16/483,394 dated Oct. 6, 2022.
Office Action corresponding to Japanese Patent Application Serial No. 2019-563327 dated Nov. 28, 2022.
Rakestraw et al. (1990) Antibody-targeted photolysis: in vitro studies with Sn(IV) chlorin e6 covalently bound to monoclonal antibodies using a modified dextran carrier. Proceedings of the National Academy of Science of the United States of America 87:4217-4221.
Zhang & Lindsey (2017) Construction of the Bacteriochlorin Macrocycle with Concomitant Nazarov Cyclization To Form the Annulated Isocyclic Ring: Analogues of Bacteriochlorophyll a. J Org Chem 82:2489-2504.
Decision of Rejection corresponding to Japanese Patent Application No. 2019-563327 dated Jul. 4, 2023.
Decision of Rejection corresponding to Chinese Patent Application No. 201780043650.6 dated Jun. 1, 2023.
European Search Report corresponding to European Patent Application No. 20810806.8-1108 dated Nov. 29, 2022.
European Search Report corresponding to European Patent Application No. 20810324.2 dated Nov. 29, 2022.
Notice of Publication Corresponding to European Patent Application Serial No. 22734836 dated Sep. 20, 2023.
Notice of Publication Corresponding to U.S. Appl. No. 17/612,968 dated Aug. 12, 2022.
Notice of Allowance corresponding to U.S. Appl. No. 17/140,920 dated Oct. 6, 2023.
Office Action (Non-Final) corresponding to U.S. Appl. No. 16/483,394 dated May 25, 2023.
Office Action corresponding to U.S. Appl. No. 16/308,285 dated Jun. 12, 2023.
Office Action corresponding to Chinese Patent Application Serial No. 202080052207 dated Sep. 23, 2023.
Office Action corresponding to European Patent Application Serial No. 18/747,932 dated Jan. 30, 2023.

* cited by examiner

Chlorophyll a

Synthetic Chlorin core structure

Bacteriochlorophyll a

Synthetic Bacterio-chlorin core

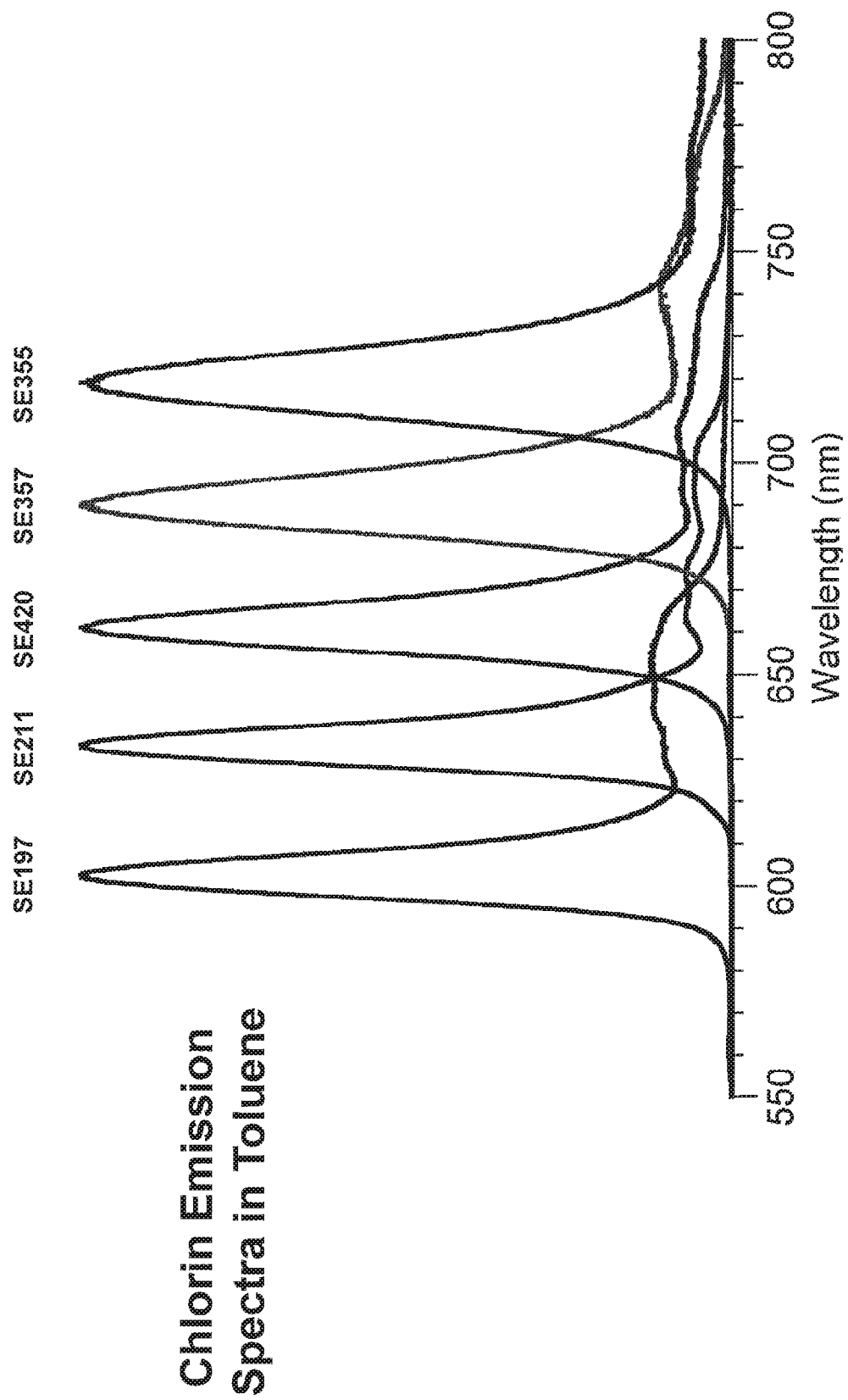

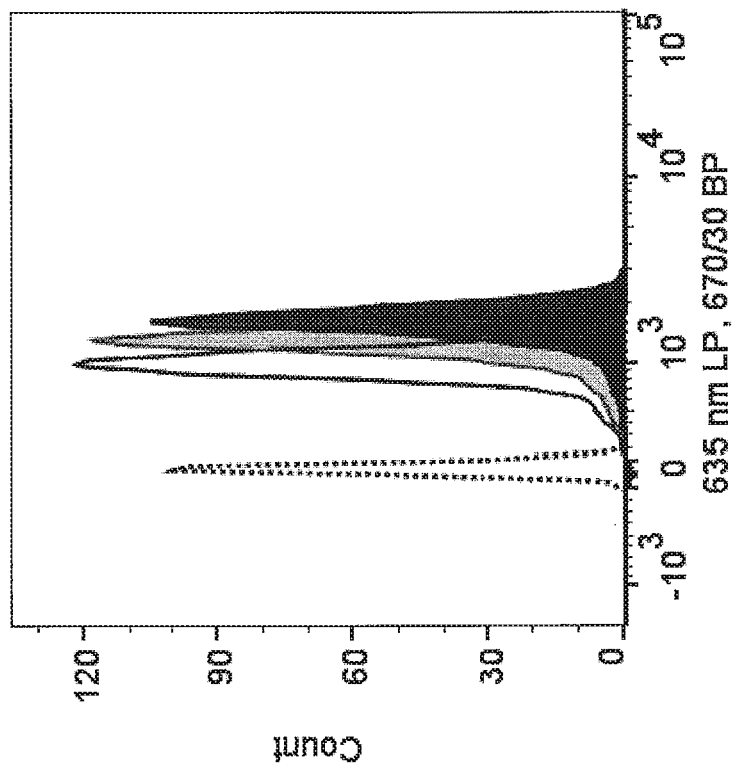
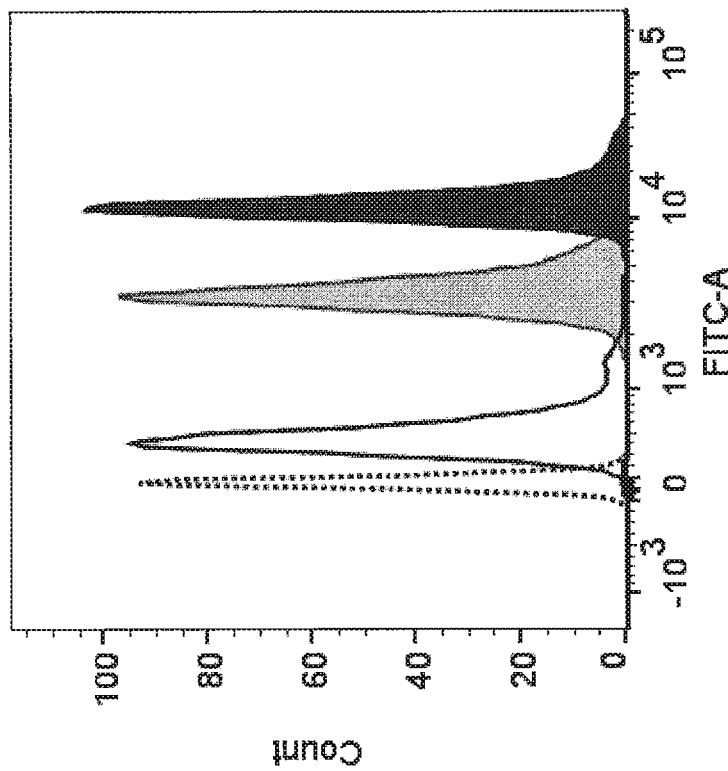
FIG. 14B
FIG. 14A

HYDROPORPHYRIN BEADS WITH NARROW FLUORESCENCE EMISSIONS

CROSS-REFERENCE TO RELATED APPLICATION

This application claims the benefit of U.S. Provisional Patent Application Ser. No. 62/348,532, filed Jun. 10, 2016, the disclosure of which is incorporated herein by reference in its entirety.

TECHNICAL FIELD

The presently disclosed subject matter relates to compositions comprising one or more porphyrinic macrocycles, optionally one or more chlorins, bacteriochlorins, and/or isobacteriochlorins, and methods for using the same to label and/or otherwise detect biological molecules and/or cells. In particular, it relates to compositions comprising the presently disclosed porphyrinic macrocycles, molecules, and vehicles such as nanoparticles and microparticles that have been labeled with the presently disclosed porphyrinic macrocycles, and methods of using the same to label and/or detect targets.

BACKGROUND

Fluorescence-based polychromatic flow cytometry (PFC) is a key analytical technique in modern immunology and life sciences research. PFC is uniquely suited for analysis and immunophenotyping of eukaryotic cells for research and diagnostic purposes and it has enabled increasingly complex analyses of immune cell subsets and functions. Driven initially by the needs of HIV disease research in the 1980s, it has advanced from early three-color measurements of T cell subsets (CDC, 1982), to complex multi-marker studies in HIV-positive patients where disease progression, cell lineage, and vaccine response factors can all be examined by PFC (Chattopadhyay & Roederer, 2010). In addition to immunological diseases, clinical applications for PFC include leukemia and lymphoma immunophenotyping (now using 8-10 colors; see e.g., Craig & Foon, 2008; Peters & Ansari, 2011) and HLA typing for transplantation cross-matching.

Increasing demand for greater multiplexing capabilities, combined with improvements in optics and lasers, has driven the introduction of new high parameter flow cytometers including Becton Dickinson's 50-color FACSYMPHONY™ brand high speed cell analyzer and Bio-Rad's 28-color ZE5™ brand cell analyzer. However, PFC multiplexing capabilities on these and previous instruments are currently hindered by the wide spectral bandwidth of existing dyes, resulting in broad and overlapping emission profiles that severely limit the ability to take full advantage of the capabilities of these newer devices. Broad and overlapping emissions reduce the number of spectrally resolvable colors that can be analyzed by a given laser. Current dyes used for PFC require the use of suboptimal bandpass filters, pre-analytical experimentation, and compensation (overlap correction). These practices result in reduced fluorescence sensitivity and produce artifacts such as "spread." For example, even with a prototype 50-color instrument, leading PFC researchers have only been able to implement a 30-parameter panel (Chattopadhyay et al., 2015). Thus, there is an immediate need for new dyes for high parameter PFC panels for use in areas such as but not limited to vaccine and drug development, infectious disease research, and oncology. Particularly, there is not only a present need for at least twenty (20) or more new fluorophores, there is a simultaneous and increasing need for new very narrow emission, spectrally distinct, fluorophores.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides fluorescent microparticles and/or nanoparticles. In some embodiments, the presently disclosed fluorescent microparticles and/or nanoparticles comprise a polymeric matrix and at least one porphyrinic macrocycle associated therewith. In some embodiments, the at least one porphyrinic macrocycle is selected from the group consisting of porphyrins (including 17,18-didehydrophorbines), chlorins (including phorbines), bacteriochlorins (including bacteriophorbines), and isobacteriochlorins (including isobacteriochlorins containing a fused "E" ring). In some embodiments, one or more of the at least one porphyrinic macrocycles has a structure selected from the group consisting of Formulas I and II:

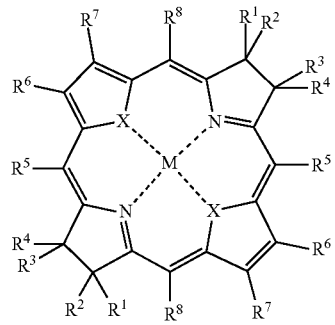

Formula I

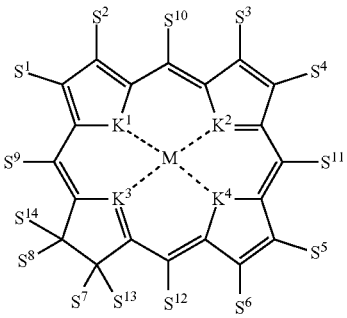

Formula II wherein M is a metal or is absent; X is selected from the group consisting of Se, NH, $CH_2$, O and S; and $R^1$, $R^2$, $R^3$, $R^4$, $R^5$, $R^6$, $R^7$, and $R^8$ are independently selected from the group consisting of H, alkyl, alkenyl, alkynyl, cycloalkyl, cycloalkylalkyl, cycloalkylalkenyl, cycloalkylalkynyl, heterocycle, heterocycloalkyl, heterocycloalkenyl, heterocycloalkynyl, aryl, arylalkyl, arylalkenyl, arylalkynyl, heteroaryl, heteroarylalkyl, heteroarylalkenyl, heteroarylalkynyl, alkoxy, halo, mercapto, azido, cyano, formyl, carboxylic acid, hydroxyl, nitro, acyl, aryloxy, alkylthio, amino, alkylamino, arylalkylamino, disubstituted amino, acylamino, acyloxy, ester, amide, sulfoxyl, sulfonyl, sulfonate, sulfonic acid, sulfonamide, urea, alkoxylacylamino, aminoacyloxy, linking groups, and surface attachment groups; $K^1$, $K^2$, $K^3$, and $K^4$ are hetero atoms independently selected from the group consisting of N, O, S, Se, Te, and CH; $S^3$, $S^4$, $S^7$, $S^8$, $S^9$, $S^{10}$, $S^{11}$, $S^{12}$, $S^{13}$, and $S^{14}$, and either $S^1$ and $S^5$, or $S^2$ and $S^6$ are independently selected from the group consisting of H, aryl, phenyl, cycloalkyl, alkyl, alkenyl, alkynyl, halogen, alkoxy, alkylthio, perfluoroalkyl, perfluoroaryl, pyridyl, cyano, thiocyanato, nitro, amino, alkylamino, acyl, sulfoxyl, sulfonyl, imido, amido, and carbamoyl; or $S^7$ and $S^{13}$ together form =O. In some embodiments, $R^1$, $R^2$, $R^5$, $R^7$, and $R^8$ are each H; $R^3$ and $R^4$ are each alkyl; and $R^6$ is optionally substituted aryl. In some embodiments, $R^1$, $R^2$, $R^5$, $R^7$, and $R^8$ are each H; $R^3$ and $R^4$ are each methyl; and $R^6$ is p-tolyl. In some embodiments, M is present and is selected from the group consisting of Pd, Pt, Mg, Zn, Al, Ga, In, Sn, Cu, Ni, and Au. In some embodiments, M is Zn or Mg. In some embodiments, $K^1$, $K^2$, $K^3$, and $K^4$ are independently selected from the group consisting of N, O, S, and CH. In some embodiments, $K^1$, $K^2$, $K^3$, and $K^4$ are all N. In some embodiments, $S^4$, $S^7$, $S^8$, $S^9$, $S^{10}$, $S^{11}$, $S^{12}$, $S^{13}$, and $S^{14}$ are all alkyl. In some embodiments, the fluorescent microparticle and/or nanoparticle is present in a population of fluorescent microparticles and/or nanoparticles, and further wherein the population comprises a plurality of distinct fluorescent microparticles and/or nanoparticles; each distinct fluorescent microparticle and/or nanoparticle is associated with one or more distinct porphyrinic macrocycles; and each distinct porphyrinic macrocycle has an emission wavelength band that has a full width at half maximum peak that is less than about 25 nm and that is separated by at least 5 nm from that of any of the other distinct porphyrinic macrocycle in the population. In some embodiments, the polymeric matrix is polystyrene, optionally wherein the polymeric matrix comprises a polystyrene bead. In some embodiments, the at least one porphyrinic macrocycle is present non-covalently associated with the exterior of the fluorescent microparticle and/or nanoparticle, is encapsulated by the fluorescent microparticle and/or nanoparticle, or both.

The presently disclosed subject matter also provides populations comprising a plurality of the presently disclosed distinct fluorescent microparticles and/or nanoparticles. In some embodiments, each fluorescent microparticle and/or nanoparticle comprises a polymeric matrix and at least one porphyrinic macrocycle; and the population comprises at least two distinct fluorescent microparticles and/or nanoparticles comprising different porphyrinic macrocycles. In some embodiments, each distinct fluorescent microparticle and/or nanoparticle is associated with one or more distinct porphyrinic macrocycles; and each distinct porphyrinic macrocycle has an emission wavelength band that has a full width at half maximum peak that is less than about 25 nm and that is separated by at least 5 nm from that of any of the other distinct porphyrinic macrocycle in the population. In some embodiments, said population comprises at least three, four, five, six, seven or eight distinct fluorescent polymeric microparticles and/or nanoparticles. In some embodiments, the polymeric matrix comprises polystyrene. In some embodiments, each of the distinct fluorescent polymeric microparticles and/or nanoparticles in the population is capable of excitation by light at a single wavelength and/or by light between about 320 nm and about 450 nm. In some embodiments, at least a subset of the distinct fluorescent polymeric microparticles and/or nanoparticles comprises a porphyrinic macrocycle selected from the group consisting of porphyrins (including 17,18-didehydrophorbines), chlorins (including phorbines), bacteriochlorins (including bacteriophorbines), and isobacteriochlorins (including isobacteriochlorins containing a fused "E" ring). In some embodiments, one or more of the at least one porphyrinic macrocycles has a structure selected from the group consisting of Formulas I and II:

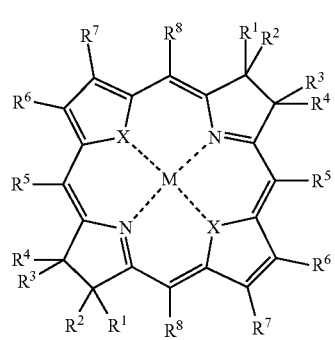

Formula I

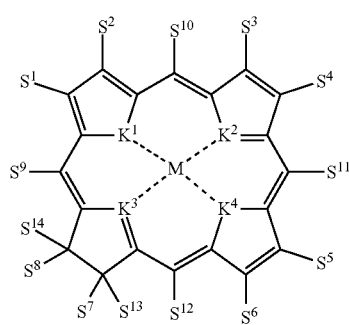

Formula II wherein M is a metal or is absent; X is selected from the group consisting of Se, NH, $CH_2$, O and S; and $R^1$, $R^2$, $R^3$, $R^4$, $R^5$, $R^6$, $R^7$, and $R^8$ are independently selected from the group consisting of H, alkyl, alkenyl, alkynyl, cycloalkyl, cycloalkylalkyl, cycloalkylalkenyl, cycloalkylalkynyl, heterocyclo, heterocycloalkyl, heterocycloalkenyl, heterocycloalkynyl, aryl, arylalkyl, arylalkenyl, arylalkynyl, heteroaryl, heteroarylalkyl, heteroarylalkenyl, heteroarylalkynyl, alkoxy, halo, mercapto, azido, cyano, formyl, carboxylic acid, hydroxyl, nitro, acyl, aryloxy, alkylthio, amino, alkylamino, arylalkylamino, disubstituted amino, acylamino, acyloxy, ester, amide, sulfoxyl, sulfonyl, sulfonate, sulfonic acid, sulfonamide, urea, alkoxylacylamino, aminoacyloxy, linking groups, and surface attachment groups; $K^1$, $K^2$, $K^3$, and $K^4$ are hetero atoms independently selected from the group consisting of N, O, S, Se, Te, and CH; $S^3$, $S^4$, $S^7$, $S^8$, $S^9$, $S^{10}$, $S^{11}$, $S^{12}$, $S^{13}$, and $S^{14}$, and either $S^1$ and $S^5$, or $S^2$ and $S^6$ are independently selected from the group consisting of H, aryl, phenyl, cycloalkyl, alkyl, alkenyl, alkynyl, halogen, alkoxy, alkylthio, perfluoroalkyl, perfluoroaryl, pyridyl, cyano, thiocyanato, nitro, amino, alkylamino, acyl, sulfonyl, sulfonyl, imido, amido, and carbamoyl; or $S^7$ and $S^{13}$ together form =O. In some embodiments, $R^1$, $R^2$, $R^5$, $R^7$, and $R^8$ are each H; $R^3$ and $R^4$ are each alkyl; and $R^6$ is optionally substituted aryl. In some embodiments, $R^1$, $R^2$, $R^5$, $R^7$, and $R^8$ are each H; $R^3$ and $R^4$ are each methyl; and $R^6$ is p-tolyl. In some embodiments, M is present and is selected from the group consisting of Pd, Pt, Mg, Zn, Al, Ga, In, Sn, Cu, Ni, and Au. In some embodiments, M is Zn or Mg. In some embodiments, $K^1$, $K^2$, $K^3$, and $K^4$ are independently selected from the group consisting of N, O, S, and CH. In some embodiments, $K^1$, $K^2$, $K^3$, and $K^4$ are all N. In some embodiments, $S^4$, $S^7$, $S^8$, $S^9$, $S^{10}$, $S^{11}$, $S^{12}$, $S^{13}$, and $S^{14}$ are all alkyl. In some embodiments, the one or more of the at least one porphyrinic macrocycles are selected from the group consisting of hydroporphyrins SE197, SE211, SE420, SE357, SE355, B56, B62, B66, and combinations thereof, and further wherein hydroporphyrins SE197, SE211, SE420, SE357, SE355, B56, B62, and B66 have the following structures:

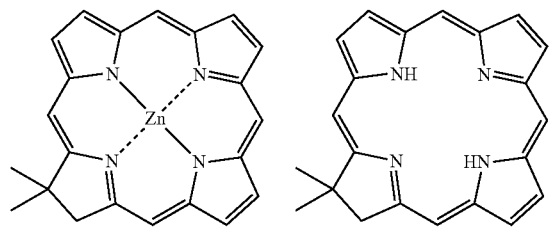

202 ZnC (SE197)   212 H2C (SE211)

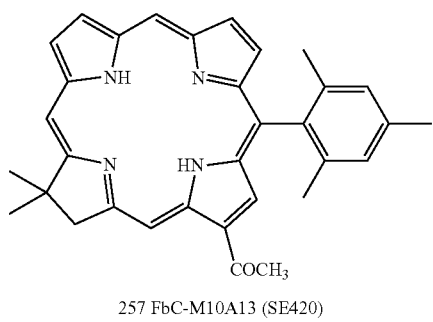

257 FbC-M10A13 (SE420)

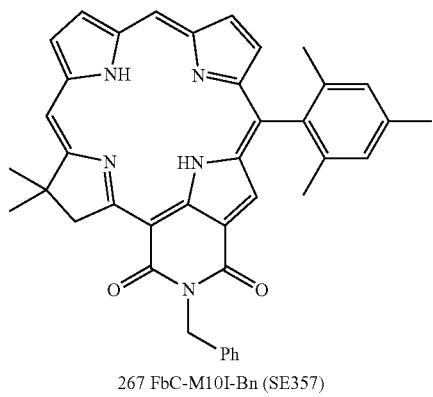

267 FbC-M10I-Bn (SE357)

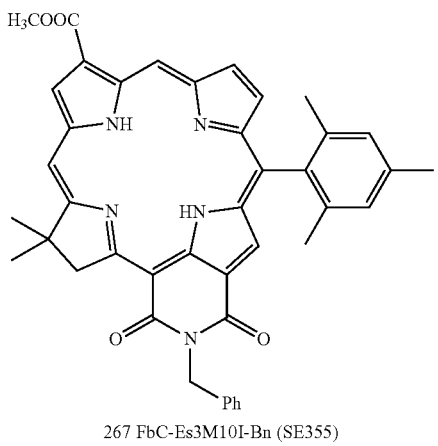

267 FbC-Es3M10I-Bn (SE355)

-continued

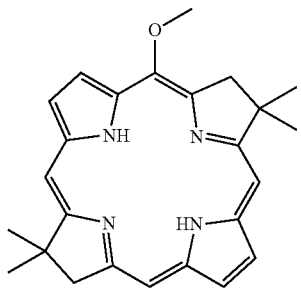

B56

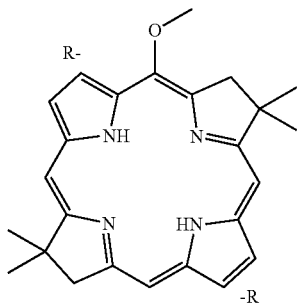

B66

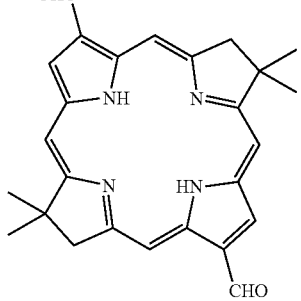

B62

The presently disclosed subject matter also provides in some embodiments a population comprising a plurality of distinct fluorescent polymeric microparticles and/or nanoparticles. In some embodiments, each of the distinct fluorescent polymeric microparticles and/or nanoparticles is prepared by mixing a solution of at least one porphyrinic macrocycle in a solvent, optionally tetrahydrofuran (THF), with an aqueous solution of a microparticle comprising the polymeric matrix and then removing the solvent; and has an emission wavelength band that has a full width at half maximum peak that is less than about 25 nm and is separated by at least 5 nm from the emission wavelength band full width at half maximum peak of any of the other distinct fluorescent polymeric microparticles in the population.

The presently disclosed subject matter also provides in some embodiments a population comprising a plurality of fluorescent polymeric microparticles and/or nanoparticles obtained by a method comprising preparing a first solution of one or more porphyrinic macrocycles in a solvent, optionally tetrahydrofuran (THF), and further optionally wherein the first solution comprises between about 0.25 µg/ml to about 20 µg/ml hydroporphyrin; adding the first solution to a first mixture comprising a polymeric microparticle and/or nanoparticle, water, and a polymeric surfactant, thereby providing a second mixture, optionally wherein the first solution is added to provide a second mixture comprising about 33% solvent and/or wherein the polymeric microparticle and/or nanoparticle comprises polystyrene and/or wherein the polymeric surfactant is a polyalkylene glycol block copolymer; mixing the second mixture for a period of time, optionally wherein the period of time is about 15 minutes; removing the solvent from the second mixture to provide a first fluorescent polymeric microparticle and/or nanoparticle, optionally wherein the removing comprises centrifuging the second mixture and/or rinsing the microparticles; repeating the previous steps to provide one or more additional fluorescent polymeric microparticles and/or nanoparticles, wherein each of the one or more additional fluorescent polymeric microparticles and/or nanoparticles comprises a different porphyrinic macrocycle or porphyrinic macrocycle mixture than the first fluorescent polymeric microparticle and/or nanoparticle or any of the other additional fluorescent polymeric microparticles and/or nanoparticles; and mixing the first fluorescent polymeric microparticle and/or nanoparticle with at least one of the one or more additional fluorescent polymeric microparticles and/or nanoparticles, thereby providing a population comprising a plurality of fluorescent polymeric microparticles and/or nanoparticles, wherein each of the fluorescent polymeric microparticles and/or nanoparticles comprises a polymeric matrix and at least one porphyrinic macrocycle, wherein when the population is excited by light, optionally wherein the light is between about 320 nm and about 450 nm and further optionally wherein the light is of a single wavelength, each of the plurality of fluorescent polymeric microparticles and/or nanoparticles can be separately and/or simultaneously detected.

In some embodiments of the presently disclosed populations, each of the plurality of fluorescent polymeric microparticles and/or nanoparticles has a different emission wavelength band characterized by a full width at half maximum peak that is less than about 25 nm and/or that is separated from the full width at half maximum peak of the emission wavelength band of any one of the other fluorescent polymeric microparticles and/or nanoparticles by at least about 5 nm. In some embodiments, the emission wavelength band of each of the plurality of fluorescent polymeric microparticles and/or nanoparticles is between about 590 nm and about 750 nm. In some embodiments, the population is capable of excitation by light at 405 nm. In some embodiments, each fluorescent microparticle and/or nanoparticle comprises a polymeric matrix and one porphyrinic macrocycle. In some embodiments, the presently disclosed populations comprise from one to five fluorescent polymeric microparticles and/or nanoparticles, wherein each of the one to five fluorescent microparticles and/or nanoparticles comprises a porphyrinic macrocycle selected from the group consisting of hydroporphyrins SE197, SE211; SE420, SE357, SE355, B56, B62, and B66, and combinations thereof, and further wherein hydroporphyrins SE197, SE211, SE420, SE357, SE355, B56, B62, and B66.

The presently disclosed subject matter also provides in some embodiments methods for preparing sets of separately detectable fluorescent microparticles and/or nanoparticles, optionally for use in multiplex assays. In some embodiments, the methods comprise preparing a first solution of one or more porphyrinic macrocycles in a solvent, optionally tetrahydrofuran (THF), and further optionally wherein the first solution comprises between about 0.25 µg/ml to about 20 µg/ml of one or more porphyrinic macrocycles; adding the first solution to a first mixture comprising a polymeric microparticle and/or nanoparticle, water, and a polymeric surfactant, thereby providing a second mixture, optionally wherein the first solution is added to provide a second mixture comprising about 33% solvent and/or wherein the polymeric microparticle and/or nanoparticle comprises polystyrene and/or wherein the polymeric surfactant is a polyalkylene glycol block copolymer; mixing the second mixture for a period of time, optionally wherein the period of time is about 15 minutes; removing the solvent from the second mixture to provide a first fluorescent polymeric microparticle and/or nanoparticle, optionally wherein the removing comprises centrifuging the second mixture and/or rinsing the microparticles and/or nanoparticles with water one or more times; and repeating the previous steps to provide one or more additional fluorescent polymeric microparticles and/or nanoparticles, wherein each of the one or more additional fluorescent polymeric microparticles and/or nanoparticles contains a different porphyrinic macrocycle or porphyrinic macrocycle mixture than the first fluorescent polymeric microparticle and/or nanoparticle or any of the other additional fluorescent polymeric microparticles and/or nanoparticles, wherein the adsorption wavelength bands of the fluorescent polymeric microparticles and/or nanoparticles in the set overlap, and wherein each of the fluorescent polymeric microparticles and/or nanoparticles in the set has a different emission wavelength band characterized by a full width at half maximum peak that is less than about 25 nm and/or that is separated from the full width at half maximum peak of the emission wavelength band of any one of the other fluorescent polymeric microparticles by at least about 5 nm. In some embodiments, the presently disclosed methods further comprise conjugating one or more of the microparticles and/or nanoparticles to one of the group consisting of a molecule, a protein, an antibody, an antibody fragment, a nucleic acid, and a cell.

In some embodiments, the presently disclosed subject matter also provides sets of separately detectable fluorescent microparticles and/or nanoparticles prepared by one of the presently disclosed methods.

The presently disclosed subject matter also provides in some embodiments uses of the presently disclosed sets of separately detectable fluorescent microparticles and/or nanoparticles in a method for calibrating a flow cytometer.

The presently disclosed subject matter also provides in some embodiments porphyrinic macrocycle-containing dyads conjugated to particles, optionally microparticles and/or nanoparticles. In some embodiments, the microparticle and/or the nanoparticle is a bead. In some embodiments, the bead is a polystyrene bead, In some embodiments, the bead further comprises a plurality of different porphyrinic macrocycle-containing dyads such that the beads comprise at least 3, 4, 5, 6, 7, 8, 9, 10, or more distinct fluorescent molecules. In some embodiments, the first fluorescent molecule comprises a chlorin and the second fluorescent molecule comprises a bacteriochlorin, and further wherein upon excitation with violet light, the dyad emits both red and near infrared light. In some embodiments, the second fluorescent molecule comprises a Fluorescence Resonance Energy Transfer (FRET) donor, and further wherein the FRET donor is characterized by an emission spectrum that overlaps with the emission maximum of the first fluorescent molecule.

In some embodiments, the presently disclosed subject matter also provides uses of the presently disclosed porphyrinic macrocycle-containing dyads for calibration of a multi-laser flow cytometer, for alignment and/or calibration of a confocal fluorescence microscope, and/or for differential labeling of cells and/or other biomolecules. In some embodiments, the other biomolecules are selected from the group consisting of antibodies and/or paratope-containing fragments or derivatives thereof.

In some embodiments, the presently disclosed subject matter also provides uses of the presently disclosed populations for differentially labeling wells of a multiwall plate. In some embodiments, the methods comprise coating each of a plurality of wells of the multiwall plate with a distinct fluorescent microparticle and/or nanoparticle such that the coated wells can be distinguished from each other based on excitation spectra derived from the particular fluorescent microparticle and/or nanoparticle present therein.

The presently disclosed subject matter also provides in some embodiments uses of the presently disclosed populations of fluorescent polymeric microparticles and/or nanoparticles for differentially labeling cells. In some embodiments, the methods comprise introducing into cells distinct fluorescent microparticles and/or nanoparticles such that individual cells can be distinguished from each other based on excitation spectra derived from the particular fluorescent microparticle and/or nanoparticle present therein.

The presently disclosed subject matter also provides antibodies, and fragments and/or derivatives thereof, covalently conjugated to the presently disclosed fluorescent microparticles and/or nanoparticles and/or the presently disclosed porphyrinic macrocycle-containing dyads. In some embodiments, the porphyrinic macrocycle is selected from the group consisting of porphyrinic macrocycles SE197, SE211, SE420, SE357, 5E355, B56, B62, B66, and/or any combination thereof, and/or the porphyrinic macrocycle-containing dyad comprises at least one porphyrinic macrocycle selected from the group consisting of porphyrinic macrocycles SE197, SE211, SE420, SE357, 5E355, B56, B62, and B66, and/or any combination thereof.

These and other aspects and embodiments which will be apparent to those of skill in the art upon reading the present disclosure, which provides the art with compositions and methods useful for detecting and/or labeling biological molecules and/or cells.

BRIEF DESCRIPTION OF THE FIGURES

FIGS. 3A and 3B depict the structures (FIG. 3A) and fluorescence emission spectra (FIG. 3B) of five synthetic chlorins. In FIG. 3B, the spectra are in order of increasing emission wavelength and correspond to chlorins SE197, SE211, SE420, SE357, and SE355 (left to right).

FIG. 7A corresponds to bacteriochlorin B62, FIG. 7B corresponds to bacteriochlorin B66, and FIG. 7C corresponds to bacteriochlorin B56. Each panel includes 5 peaks, which from left to right correspond to concentrations of 0, 0.25, 0.5, 1.0, and 5.0 μg/mL, respectively.

FIG. 9A is a plot of fluorescence of magnetic PS beads before staining. FIG. 9B is a plot of fluorescence of a mixture of PS and magnetic PS beads after staining with chlorins SE197 (left peak) and SE355 (right peak). FIG. 9C is a plot of fluorescence of a bead mixture supernatant after magnetic beads were retained with a magnetic rack. FIG. 9D is a plot of fluorescence of re-suspended magnetic beads after wash and vortex steps.

FIGS. 14A and 14B are flow cytometry histograms of goat anti-mouse IgG capture beads unbound (dotted lines), and bound to 0.125 ng, 1.25 ng, and 125 ng of FITC-labeled anti-CD3 (FIG. 14A; left to right plots, respectively) of 1:10, 1:3.16, and 1:1 dilutions of chlorin SE420-doped Protein G/anti-CD3 coated nanoparticles (FIG. 14B; left to right plots, respectively).

FIG. 16A shows forward and side scatter shown with gate for analyzing single beads. FIG. 16B shows fluorescence of a 9-plex bead array with SE197 in the BV605 channel and SE420 in the BV650 channel.

Figure 19:
Figure 19:
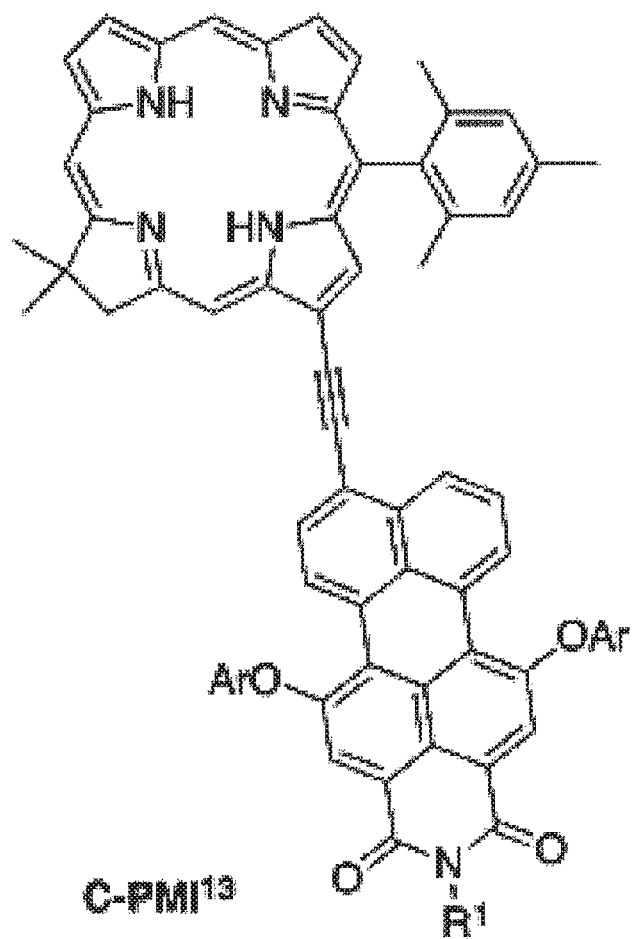

FIG. 19 is the structure of an exemplary beta-linked chlorin-perylene dyad (C-PMI[13]).

Figure 20:
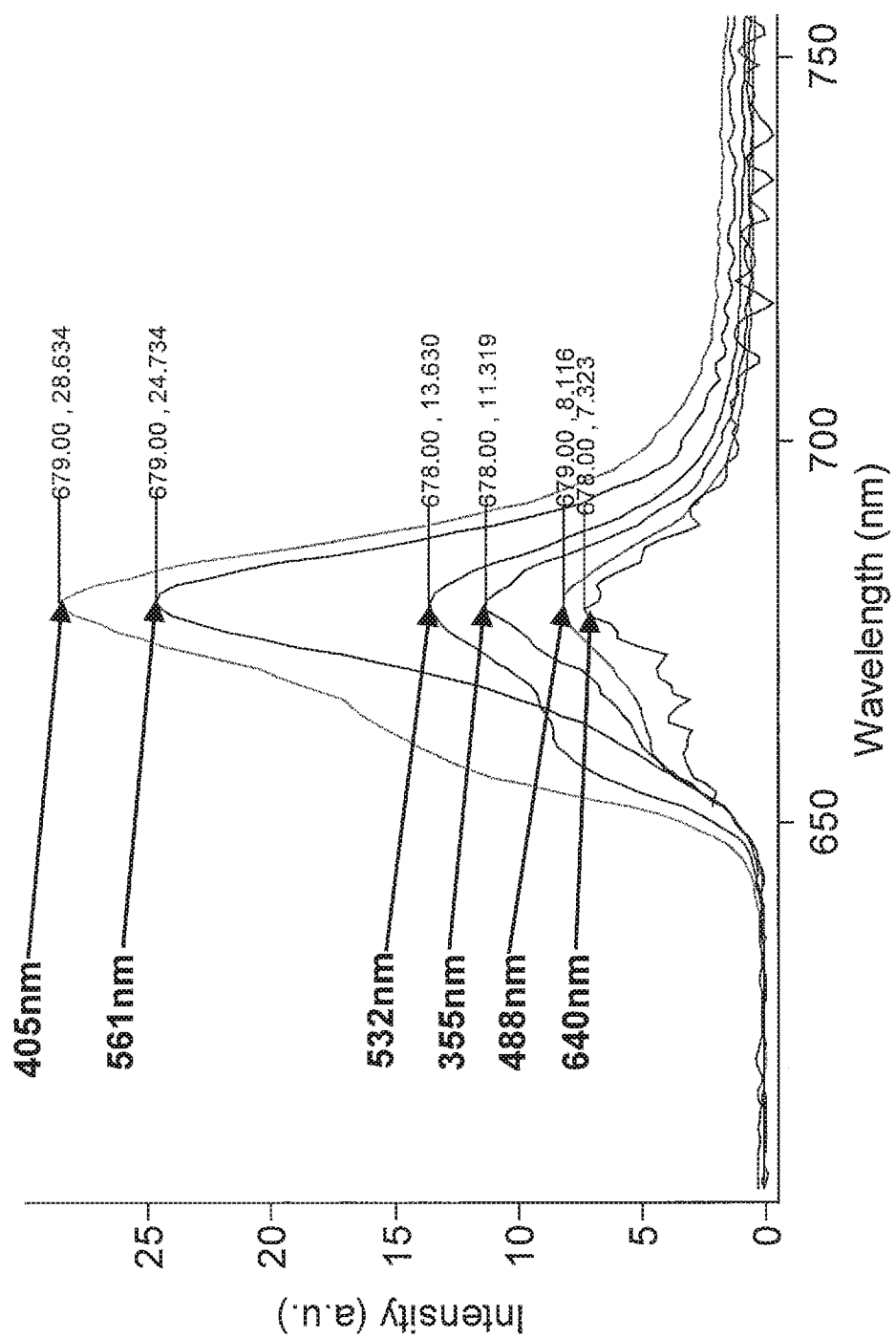

FIG. 20 is a series of fluorescence emissions of a suspension of beads doped with an exemplary chlorin-perylene dyad excited at the indicated excitation wavelengths (i.e., 405 nm, 561 nm, 532 nm, 355 nm, 488 nm, and 640 nm, highest to lowest peaks, respectively).

DETAILED DESCRIPTION

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

I. Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. For example, the phrase "a fluorescent microparticle and/or nanoparticle" refers to one or more fluorescent microparticles and/or nanoparticles, including a plurality of the same fluorescent microparticle and/or nanoparticle. Similarly, the phrase "at least one", when employed herein to refer to an entity, refers to, for example, 1, 2, 3, 4, 5, 6, 7, 8, 9, 10, 15, 20, 25, 30, 35, 40, 45, 50, 75, 100, or more of that entity, including but not limited to whole number values between 1 and 100 and greater than 100.

Unless otherwise indicated, all numbers expressing quantities of ingredients, reaction conditions, and so forth used in the specification and claims are to be understood as being modified in all instances by the term "about". The term "about", as used herein when referring to a measurable value such as an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods. Accordingly, unless indicated to the contrary, the numerical parameters set forth in this specification and attached claims are approximations that can vary depending upon the desired properties sought to be obtained by the presently disclosed subject matter.

As used herein, the term "and/or" when used in the context of a list of entities, refers to the entities being present singly or in combination. Thus, for example, the phrase "A, B, C, and/or D" includes A, B, C, and D individually, but also includes any and all combinations and subcombinations of A, B, C, and D.

The phrase "associated with" refers to any interaction between two entities, e.g., a polymeric matrix and a porphyrinic macrocycle. In some embodiments, a polymeric matrix and a porphyrinic macrocycle are associated with each other by a non-covalent bond such as but not limited to one or more of hydrophobic, electrostatic, and van der Walls interactions. In some embodiments, a polymeric matrix and a porphyrinic macrocycle are associated with each other as a result of the polymeric matrix (e.g., a nanoparticle, a microparticle, a bead, etc.) encompassing the porphyrinic macrocycle such that the porphyrinic macrocycle is present within the polymeric matrix. In such an embodiment, the polymeric matrix is also referred to as being "doped by" or "doped with" the porphyrinic macrocycle, and the porphyrinic macrocycle can be considered "embedded" within the polymeric matrix. In some embodiments, a polymeric matrix and a porphyrinic macrocycle are associated with each other by covalent bond that attaches the porphyrinic macrocycle to a surface of the polymeric matrix.

The term "comprising", which is synonymous with "including" "containing", or "characterized by", is inclusive or open-ended and does not exclude additional, unrecited elements and/or method steps. "Comprising" is a term of art that means that the named elements and/or steps are present, but that other elements and/or steps can be added and still fall within the scope of the relevant subject matter.

As used herein, the phrase "consisting of" excludes any element, step, or ingredient not specifically recited. It is noted that, when the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of the related disclosure or claim to the specified materials and/or steps, plus those that do not materially affect the basic and novel characteristic(s) of the disclosed and/or claimed subject matter, For example, a fluorescent microparticle and/or nanoparticle can "consist essentially of" a polymeric matrix and at least one porphyrinic macrocycle associated therewith, which means that the recited polymeric matrix is the only polymeric matrix present in the fluorescent microparticle and/or nanoparticle.

With respect to the terms "comprising", "consisting of", and "consisting essentially of", where one of these three terms is used herein, the presently disclosed and claimed subject matter can include the use of either of the other two terms. For example, in some embodiments, the presently disclosed subject matter relates to fluorescent microparticles and/or nanoparticles. It would be understood by one of ordinary skill in the art after review of the instant disclosure that the presently disclosed subject matter thus encompasses fluorescent microparticles and/or nanoparticles that consist essentially of the polymeric matrices and at least one porphyrinic macrocycle associated therewith of the presently disclosed subject matter, as well as fluorescent microparticles and/or nanoparticles that consist of the polymeric matrices and at least one porphyrinic macrocycle associated therewith of the presently disclosed subject matter.

"Halo" as used herein refers to any suitable halogen, including —F, —Cl, —Br, —I, and —At.

"Mercapto" as used herein refers to an —SH group.

"Azido" as used herein refers to an —$N_3$ group,

"Cyano" as used herein refers to a —CN group.

"Hydroxyl" as used herein refers to an —OH group.

"Nitro" as used herein refers to an —$NO_2$ group.

"Alkyl" as used herein alone or as part of another group, refers to a straight or branched chain hydrocarbon containing from 1 or 2 to 10, 20 or 50 carbon atoms (e.g., $C_1$ to $C_4$ alkyl; $C_4$ to $C_{10}$ alkyl; $C_{11}$ to $C_{50}$ alkyl). Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Loweralkyl" as used herein, is a subset of alkyl, in some embodiments preferred, and refers to a straight or branched chain hydrocarbon group containing from 1 to 4 carbon atoms. Representative examples of loweralkyl include, but are not limited to, methyl, ethyl, n-propyl, iso-propyl, n-butyl, iso-butyl, tert-butyl, and the like. The term "akyl" or "loweralkyl" is intended to include both substituted and unsubstituted alkyl or loweralkyl unless otherwise indicated and these groups may be substituted with groups selected from halo, alkyl, haloalkyl, alkenyl, alkynyl, cycloalkyl, cycloalkylalkyl, aryl, arylalkyl, heterocycle, heterocycloalkyl, hydroxyl, alkoxy, alkenyloxy, alkynyloxy, haloalkoxy, cycloalkoxy, cycloalkylalkyloxy, aryloxy, arylalkyloxy, heterocyclooxy, heterocycloalkyloxy, mercapto, alkyl-S(O)m, haloalkyl-S(O)m, alkenyl-S(O)m, alkynyl-S(O)m, cycloalkyl-S(O)m, cycloalkylalkyl-S(O)m, aryl-S(O)m, arylalkyl-S(O)m, heterocycle-S(O)m, heterocycloalkyl-S(O)m, amino, carboxy, alkylamino, alkenylamino, alkynylamino, halo alkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkylene" as used herein refers to a difunctional linear, branched or cyclic alkyl group, which may be substituted or unsubstituted, and where "alkyl" is as defined above.

"Alkenyl" as used herein alone or as part of another group, refers to a straight or branched chain hydrocarbon containing from 1 or 2 to 10, 20 or 50 carbon atoms (e.g., $C_1$ to $C_4$ alkenyl; $C_4$ to $C_{10}$ alkenyl; $C_{11}$ to $C_{50}$ alkenyl) (or in loweralkenyl 1 to 4 carbon atoms) which include 1 to 4 double bonds in the normal chain. Representative examples of alkenyl include, but are not limited to, vinyl, 2-propenyl, 3-butenyl, 2-butenyl, 4-pentenyl, 3-pentenyl, 2-hexenyl, 3-hexenyl, 2,4-heptadienyl, and the like. The term "alkenyl" or "loweralkenyl" is intended to include both substituted and unsubstituted alkenyl or loweralkenyl unless otherwise indicated and these groups may be substituted with groups as described in connection with alkyl and loweralkyl above.

"Alkenylene" as used herein refers to a difunctional linear, branched or cyclic alkyl group, which may be substituted or unsubstituted, and where "alkenyl" is as defined above.

"Alkynyl" as used herein alone or as part of another group, refers to a straight or branched chain hydrocarbon containing from 1 or 20 to 10, 20 or 50 carbon atoms (e.g., $C_1$ to $C_4$ alkynyl; $C_4$ to $C_{10}$ alkynyl; $C_{11}$ to $C_{50}$ alkynyl) (or in loweralkynyl 1 to 4 carbon atoms) which include 1 triple bond in the normal chain. Representative examples of alkynyl include, but are not limited to, 2-propynyl, 3-butynyl, 2-butynyl, 4-pentynyl, 3-pentynyl, and the like. The term "alkynyl" or "loweralkynyl" is intended to include both substituted and unsubstituted alkynyl or loweralknynyl unless otherwise indicated and these groups may be substituted with the same groups as set forth in connection with alkyl and loweralkyl above.

"Alkynylene" as used herein refers to a difunctional linear, branched or cyclic alkynyl group, which may be substituted or unsubstituted, and where "alkynyl" is as defined above.

"Alkylidene chain" as used herein refers to a difunctional linear, branched, and/or cyclic organic group, which may be substituted or unsubstituted, which may be saturated or unsaturated, and which may optionally contain one, two or three heteroatoms selected from the group consisting of N, O, and S. Examples include but are not limited to alkylene, alkenylene, alkynylene, arylene, alkarylene, and aralkylene. See e.g., U.S. Pat. No. 6,946,533. The alkylidene chain may contain any suitable number of carbon atoms (e.g., a $C_1$ to $C_4$; $C_4$ to $C_{10}$; $C_{10}$ to $C_{20}$; $C_{20}$ to $C_{50}$).

"Alkoxy" as used herein alone or as part of another group, refers to an alkyl or loweralkyl group, as defined herein, appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like.

"Acyl" as used herein alone or as part of another group refers to a —C(O)R radical, where R is any suitable substituent such as aryl, alkyl, alkenyl, alkynyl, cycloalkyl or other suitable substituent as described herein.

"Haloalkyl" as used herein alone or as part of another group, refers to at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, 2-chloro-3-fluoropentyl, and the like.

"Alkylthio" as used herein alone or as part of another group, refers to an alkyl group, as defined herein, appended to the parent molecular moiety through a thio moiety, as defined herein. Representative examples of alkylthio include, but are not limited to, methylthio, ethylthio, tert-butylthio, hexylthio, and the like.

"Aryl" as used herein alone or as part of another group, refers to a monocyclic carbocyclic ring system or a bicyclic carbocyclic fused ring system having one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above.

"Arylalkyl" as used herein alone or as part of another group, refers to an aryl group, as defined herein, appended to the parent molecular moiety through an alkyl group, as defined herein. Representative examples of arylalkyl include, but are not limited to, benzyl, 2-phenylethyl, 3-phenylpropyl, 2-naphth-2-ylethyl, and the like.

"Amino" as used herein means the radical —NH2.

"Alkylamino" as used herein alone or as part of another group means the radical —NHR, where R is an alkyl group.

"Arylalkylamino" as used herein alone or as part of another group means the radical —NHR, where R is an arylalkyl group.

"Disubstituted-amino" as used herein alone or as part of another group means the radical —NRaRb, where Ra and Rb are independently selected from the groups alkyl, haloalkyl, alkenyl, alkynyl, cycloalkyl, cycloalkylalkyl, aryl, arylalkyl, heterocyclo, heterocycloalkyl.

"Acylamino" as used herein alone or as part of another group means the radical —NRaRb, where Ra is an acyl group as defined herein and Rb is selected from the groups hydrogen, alkyl, haloalkyl, alkenyl, alkynyl, cycloalkyl, cycloalkylalkyl, aryl, arylalkyl, heterocyclo, heterocycloalkyl.

"Acyloxy" as used herein alone or as part of another group means the radical —OR, where R is an acyl group as defined herein.

"Ester" as used herein alone or as part of another group refers to a —C(O)OR radical, where R is any suitable substituent such as alkyl, cycloalkyl, alkenyl, alkynyl or aryl.

"Formyl" as used herein refers to a —C(O)H group.

"Carboxylic acid" as used herein refers to a —C(O)OH group.

"Sulfoxyl" as used herein refers to a compound of the formula —S(O)R, where R is any suitable substituent such as alkyl, cycloalkyl, alkenyl, alkynyl or aryl.

"Sulfonyl" as used herein refers to a compound of the formula —S(O)(O)R, where R is any suitable substituent such as alkyl, cycloalkyl, alkenyl, alkynyl or aryl.

"Sulfonate" as used herein refers to a compound of the formula —S(O)(O)OR, where R is any suitable substituent such as alkyl, cycloalkyl, alkenyl, alkynyl or aryl.

"Sulfonic acid" as used herein refers to a compound of the formula —S(O)(O)OH.

"Amide" as used herein alone or as part of another group refers to a —C(O)NR$_a$R$_b$ radical, where R$_a$ and R$_b$ are any suitable substituent such as H, alkyl, cycloalkyl, alkenyl, alkynyl or aryl.

"Sulfonamide" as used herein alone or as part of another group refers to a —S(O)$_2$N$_a$R$_a$R$_b$ radical, where R$_a$ and R$_b$ are any suitable substituent such as H, alkyl, cycloalkyl, alkenyl, alkynyl or aryl.

"Urea" as used herein alone or as part of another group refers to an —N(R$_c$)C(O)NR$_a$R$_b$ radical, where R$_a$, R$_b$, and R$_c$ are any suitable substituent such as H, alkyl, cycloalkyl, alkenyl, alkynyl or aryl.

"Alkoxyacylamino" as used herein alone or as part of another group refers to an —N(R$_a$)C(O)OR$_b$ radical, where R$_a$, R$_b$ are any suitable substituent such as H, alkyl, cycloalkyl, alkenyl, alkynyl or aryl.

"Aminoacyloxy" as used herein alone or as part of another group refers to an —OC(O)NR$_a$R$_b$ radical, where R$_a$ and R$_b$ are any suitable substituent such as H, alkyl, cycloalkyl, alkenyl, alkynyl or aryl.

"Cycloalkyl" as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include, cyclopropyl, cyclobutyl, cyclopentyl, cyclohexyl, cycloheptyl, and cyclooctyl. These rings may be optionally substituted with additional substituents as described herein such as halo or loweralkyl. The term "cycloalkyl" is generic and intended to include heterocyclic groups as discussed below unless specified otherwise.

II. Compositions

II.A. Generally

The presently disclosed subject matter provides in some embodiments fluorescent microparticles and/or nanoparticles comprising a polymeric matrix and at least one porphyrinic macrocycle (alternatively referred to herein as a "hydroporphyrin") associated therewith. As used herein, a "polymeric matrix" can be any molecule or complex of molecules that form a microparticle and/or a nanoparticle, thereby providing a scaffold for associating one or more porphyrinic macrocycles. Exemplary polymeric matrices include polystyrene.

The term "microparticle" refers to a structure having at least one region with a dimension (e.g., length, width, diameter, etc.) of less than about 1,000 µm but greater than about 1000 nm. The dimension can be in some embodiments less than about 500 µm, in some embodiments less than about 250 µm, in some embodiments less than about 200 µm, in some embodiments less than about 150 µm, in some embodiments less than about 125 µm, in some embodiments less than about 100 µm, in some embodiments less than about 80 µm, in some embodiments less than about 70 µm, in some embodiments less than about 60 µm, in some embodiments less than about 50 µm, in some embodiments less than about 40 µm, in some embodiments less than about 30 µm, in some embodiments less than about 20 µm, in some embodiments less than about 10 µm, and in some embodiments less than about 5 µm. In some embodiments, the dimension is between about 1 µm and about 250 µm (e.g., about 5, 10, 15, 20, 30, 40, 50, 60, 70, 80, 90, 100, 110, 120, 130, 140, 150, 160, 170, 180, 190, 200, 210, 220, 230, 240, or 250 µm).

Similarly, the term "nanoparticle" refers to a structure having at least one region with a dimension (e.g., length, width, diameter, etc.) of less than about 1,000 nm. In some embodiments, the dimension is smaller (e.g., less than about 500 nm, less than about 250 nm, less than about 200 nm, less than about 150 nm, less than about 125 nm, less than about 100 nm, less than about 80 nm, less than about 70 nm, less than about 60 nm, less than about 50 nm, less than about 40 nm, less than about 30 nm or even less than about 20 nm). In some embodiments, the dimension is between about 5 nm and about 250 nm (e.g., about 1, 5, 10, 15, 20, 30, 40, 50, 60, 70, 80, 90, 100, 110, 120, 130, 140, 150, 160, 170, 180, 190, 200, 210, 220, 230, 240, or 250 nm).

In some embodiments, the microparticle or nanoparticle is approximately spherical. When the microparticle or nanoparticle is approximately spherical, the characteristic dimension can correspond to the diameter of the sphere. In addition to spherical shapes, the microparticle or nanoparticle can be disc-shaped, plate-shaped (e.g., hexagonally plate-like), oblong, polyhedral, rod-shaped, cubic, or irregularly-shaped.

The microparticle or nanoparticle can comprise a core region (i.e., the space between the outer dimensions of the particle) and an outer surface (i.e., the surface that defines the outer dimensions of the particle). In some embodiments, the microparticle or nanoparticle can have one or more coating layers surrounding or partially surrounding the microparticle or nanoparticle core. Thus, for example, a spherical microparticle or nanoparticle can have one or more concentric coating layers, each successive layer being dispersed over the outer surface of a smaller layer closer to the center of the particle.

The terms "polymer" and "polymeric" refer to chemical structures that have repeating units (i.e., multiple copies of a given chemical substructure). Polymers can be formed from polymerizable monomers. A polymerizable monomer is a molecule that comprises one or more moieties that can react to form bonds (e.g., covalent or coordination bonds) with moieties on other molecules of polymerizable monomer. In some embodiments, each polymerizable monomer molecule can bond to two or more other molecules/moieties. In some cases, a polymerizable monomer will bond to only one other molecule, forming a terminus of the polymeric material.

Polymers can be organic, or inorganic, or a combination thereof. As used herein, the term "inorganic" refers to a compound or composition that contains at least some atoms other than carbon, hydrogen, nitrogen, oxygen, sulfur, phosphorous, or one of the halides. Thus, for example, an inorganic compound or composition can contain one or more silicon atoms and/or one or more metal atoms. In some embodiments, the polymer is polystyrene, and the microparticle and/or nanoparticle is made up of polystyrene. In some embodiments, the microparticle and/or nanoparticle is a polystyrene bead.

As disclosed herein, the polymeric matrix is associated at least one porphyrinic macrocycle in order to produce a fluorescent microparticle and/or nanoparticle of the presently disclosed subject matter. In some embodiments, the at least one porphyrinic macrocycle is present non-covalently associated with the exterior of the fluorescent microparticle and/or nanoparticle, is encapsulated by the fluorescent microparticle and/or nanoparticle, or both. In some embodiments, the at least one porphyrinic macrocycle is a fluorescent molecule. In some embodiments, the at least one porphyrinic macrocycle is selected from the group consisting of porphyrins (including 17,18-didehydrophorbines), chlorins (including phorbines), bacteriochlorins (including bacteriophorbines), and isobacteriochlorins (including isobacteriochlorins containing a fused "E" ring). As used herein, the term "porphyrin" refers to a cyclic structure typically composed of four pyrrole rings together with four nitrogen atoms and two replaceable hydrogens for which various metal atoms can readily be substituted. A typical porphyrin is hemin. Exemplary porphyrinic macrocycles that can be employed in the compositions and methods of the presently disclosed subject matter are disclosed in U.S. Pat. Nos. 6,559,374; 7,173,691; 8,173,691; 8,207,329; 8,546,088; and 9,417,245; Taniguchi et al., 2008; and Lindsey, 2015, each of which is incorporated by reference in its entirety.

In some embodiments, the at least one porphyrinic macrocycle has an emission wavelength band that has a full width at half maximum peak that is less than about 25 nm and that is separated by at least 5 nm from that of any of the other distinct porphyrinic macrocycle in the population. Methods for producing porphyrinic macrocycles that have advantageous excitation and emission spectra for use in the microparticles and/or nanoparticles of the presently disclosed subject matter are described, for example, in U.S. Pat. Nos. 6,559,374; 7,173,691; and 9,417,245; each of which is incorporated by reference in its entirety.

With respect to the exemplary porphyrinic macrocycles disclosed herein, modifications to the same can also be made in order to "wavelength tune" the exemplary porphyrinic macrocycles to give additional porphyrinic macrocycles with different and/or modified emission spectra. In some embodiments, the emission wavelengths of a porphyrinic macrocycle of the presently disclosed subject matter is modified (i.e., "tuned") by placement of different auxochromes at the β-pyrrole positions. In some embodiments, a dimethyl group is also added at the reduced pyrrole to enhance stability of the porphyrinic macrocycle. See e.g., Lindsey, 2015.

II.B. Bacteriochlorins as Porphyrinic Macrocycle

In some embodiments of the presently disclosed subject matter, a porphyrinic macrocycle of the presently disclosed subject matter is a bacteriochlorin. As used herein, a "bacteriochlorin" is essentially the same as a porphyrin, but differs from a porphyrin in having two partially saturated non-adjacent (i.e., trans) pyrrole rings. Exemplary, non-limiting bacteriochlorins include, but are not limited to the bacteriochlorins disclosed in U.S. Pat. No. 8,173,691. As set forth therein, an exemplary bacteriochlorin has the structure of Formula I presented herein above, wherein:

M is absent or is a metal, optionally a metal selected from the group consisting of Pd, Pt, Mg, Zn, Al, Ga, In, Sn, Cu, Ni, and Au;

X is selected from the group consisting of Se, NH, $CH_2$, O and S; and $R^1$, $R^2$, $R^3$, $R^4$, $R^5$, $R^6$, $R^7$, and $R^8$ are independently selected from the group consisting of H, alkyl, alkenyl, alkynyl, cycloalkyl, cycloalkylalkyl, cycloalkylalkenyl, cycloalkylalkynyl, heterocycle, heterocycloalkyl, heterocycloalkenyl, heterocycloalkynyl, aryl, arylalkyl, arylalkenyl, arylalkynyl, heteroaryl, heteroarylalkyl, heteroarylalkenyl, heteroarylalkynyl, alkoxy, halo, mercapto, azido, cyano, formyl, carboxylic acid, hydroxyl, nitro, acyl, aryloxy, alkylthio, amino, alkylamino, arylalkylamino, disubstituted amino, acylamino, acyloxy, ester, amide, sulfoxyl, sulfonyl, sulfonate, sulfonic acid, sulfonamide, urea, alkoxylacylamino, aminoacyloxy, linking groups, and surface attachment groups.

In some embodiments, $R^1$, $R^2$, $R^5$, $R^7$, and $R^8$ are each H; $R^3$ and $R^4$ are each alkyl; and $R^6$ is optionally substituted aryl. In some embodiments, $R^1$, $R^2$, $R^5$, $R^7$, and $R^8$ are each H; $R^3$ and $R^4$ are each methyl; and $R^6$ is p-tolyl.

In some embodiments, a bacteriochlorin of Formula I is produced by self-condensing a compound (or condensing a pair of compounds) of Formula III, wherein Formula III is:

Formula III

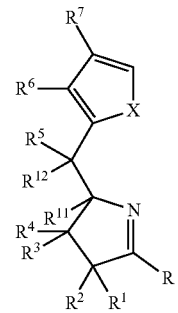

in an organic solvent in the presence of an acid, wherein R is an acetal or aldehyde group; X and $R^1$ to $R^7$ are as given above and $R^8$ is H (or alkoxy, or as otherwise contributed by the acetal or aldehyde group); and $R^{11}$ and $R^{12}$ are each H; or $R^{11}$ and $R^{12}$ together form a covalent bond. Optionally, the compound can then be further derivatized to exchange hydrogen at the $R^8$ position with the further substituents given above, in accordance with known techniques.

II.C. Chlorins as Porphyrinic Macrocycle

In some embodiments of the presently disclosed subject matter, a porphyrinic macrocycle of the presently disclosed subject matter is a chlorin. As used herein, a "chlorin" is essentially the same as a porphyrin, but differs from a porphyrin in having one partially saturated pyrrole ring. The basic chromophore of chlorophyll, the green pigment of plant photosynthesis, is a chlorin. Exemplary, non-limiting chlorins of the presently disclosed subject matter include the trans-substituted chlorins disclosed in U.S. Pat. No. 6,559,374. As set forth therein, an exemplary trans-substituted chlorin has the structure of Formula II depicted herein above, wherein:

M is absent or is a metal, optionally a metal selected from the group consisting of Pd, Pt, Mg, Zn, Al, Ga, In, Sn, Cu, Ni, and Au;

$K^1$, $K^2$, $K^3$, and $K^4$ are hetero atoms independently selected from the group consisting of N, O, S, Se, Te, and CH; and $S^3$, $S^4$, $S^7$, $S^8$, $S^9$, $S^{10}$, $S^{11}$, $S^{12}$, $S^{13}$, and $S^{14}$, and either $S^1$ and $S^5$, or $S^2$ and $S^6$ are independently selected from the group consisting of H, aryl, phenyl, cycloalkyl, alkyl, alkenyl, alkynyl, halogen, alkoxy, alkylthio, perfluoroalkyl, perfluoroaryl, pyridyl, cyano, thiocyanate, nitro, amino, alkylamino, acyl, sulfoxyl, sulfonyl, imido, amido, and carbamoyl; or $S^7$ and $S^{13}$ together form =O.

In some embodiments, M is Zn or Mg. In some embodiments, $K^1$, $K^2$, $K^3$, and $K^4$ are independently selected from the group consisting of N, O, S, and CH. In some embodiments, $K^1$, $K^2$, $K^3$, and $K^4$ are all N. In some embodiments, $S^4$, $S^7$, $S^8$, $S^9$, $S^{10}$, $S^{11}$, $S^{12}$, $S^{13}$, and $S^{14}$ are all alkyl.

Trans-substituted chlorins of Formula II can be produced as set forth in U.S. Pat. No. 6,599,374. In some embodiments, trans-substituted chlorins of Formula II are produced by condensing a compound of Formula IV with a compound of Formula V (see below) in an organic solvent in the presence of an acid to form a condensation product.

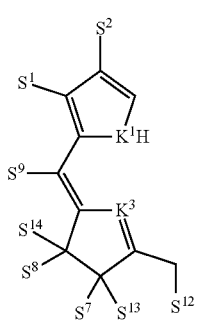

Formula IV

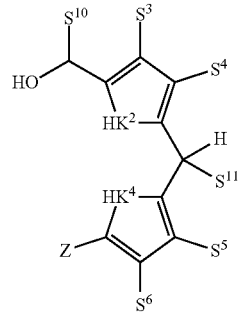

Formula V

II.D. Isobacteriochlorins as Porphyrinic Macrocycle

In some embodiments of the presently disclosed subject matter, a porphyrinic macrocycle of the presently disclosed subject matter is an isobacteriochlorin. An "isobacteriochlorin" is essentially the same as a porphyrin, but differs from a porphyrin in having two partially saturated adjacent (i.e., cis) pyrrole rings. Exemplary isobacteriochlorins of the presently disclosed subject matter include but are not limited to those disclosed in U.S. Pat. No. 8,546,088.

II.E. Porphyrinic Macrocycles and Fluorescence Resonance Energy Transfer (FRET)

In some embodiments, the microparticles and/or nanoparticles of the presently disclosed subject matter comprise a fluorescence resonance energy transfer (FRET) donor, wherein the porphyrinic macrocycle acts as a FRET acceptor. This provides for adding different fluorescence excitation wavelengths to excite porphyrinic macrocycles where they typically display little or no excitation efficiency on their own. By way of example and not limitation, organic solutions containing a porphyrinic macrocycle and a second hydrophobic dye are added together to beads or particles using the methods described herein for doping beads and particles with individual porphyrinic macrocycles. Typically, a FRET donor is chosen with the desired excitation properties and an emission which overlaps significantly with the excitation maxima of the selected porphyrinic macrocycle. In some embodiments, the FRET donor is characterized by an emission spectrum that overlaps significantly with the emission maximum of the first fluorescent molecule. As used herein, the phrase "overlaps significantly" refers to the area of overlap between normalized donor emission and normalized acceptor absorption. See Lakowicz, 1999.

II.F. Dyads

In some embodiments, the presently disclosed subject matter also provides dyads of porphyrinic macrocycles. As used herein, the term "dyad" refers to porphyrinic macrocycles covalently linked to one or more other porphyrinic macrocycles and/or to other dyes. Thus, as used herein, the term "dyad" encompasses porphyrinic macrocycles covalently linked that are linked to 1, 2, 3, 4, 5, or more distinct porphyrinic macrocycles and/or to other dyes. Linkers can vary, but typically alkynyl, phenyl-alkynyl, aryl-alkynyl, etc., linkers are used to attach porphyrinic macrocycles and other partners. In some cases, this can enhance properties such as fluorescence quantum yield or can provide properties such as solvent-dependent fluorescence (see Yu et al., 2014). Chlorin-bacteriochlorin dyads for example can combine chlorin excitation with bacteriochlorin NIR fluorescence emission (see Muthiah et al., 2008). While not wishing to be bound by any theory of operation, using this approach it would be possible to create violet-excitable beads/particles with not only the red emissions typical with chlorins but also with NIR emissions using chlorin-bacteriochlorins dyads. See also U.S. Pat. No. 6,420,648, incorporated by reference herein in its entirety.

Also disclosed herein are porphyrinic macrocycle dyad-doped beads and/or particles with multiple excitation wavelengths. Currently, beads with this property are used for calibration of multi-laser flow cytometers and are prepared using mixtures of multiple fluorophores, as for example in SPHERO™ Rainbow Calibration Particles (Spherotech Inc., Lake Forest, Illinois, United States of America). These are also used for alignment and calibration of confocal fluorescence microscopes. Using multiple fluorophores presents significant challenges due to varying efficiency of doping of fluorophores, plus energy transfer and other interfering or competing optical properties of multiple fluorophores. Dyads offer a far simpler single fluorescence component plus a consistent and even doping process compare to using multiple fluorophores. As an example, "panchromatic" fluorescent dyads are described in Hu et al., 2016, which combine hydroporphyrins with broadly absorbing perylene dyes. Other partner groups besides perylene that can be employed with hydroporphyrins in dyads include, but are not limited to BODIPY, porphyrin, pyrene, terrylene, coumarin, etc. See also U.S. Pat. No. 6,420,648, which is incorporated herein by reference in its entirety.

Thus, in some embodiments the presently disclosed subject matter provides porphyrinic macrocycle-containing dyads conjugated to particles, optionally microparticles, nanoparticles, and/or beads, optionally polystyrene beads. In some embodiments, the bead further comprises a plurality of different porphyrinic macrocycle-containing dyads such that the beads comprise at least 3, 4, 5, 6, 7, 8, 9, 10, or more distinct fluorescent molecules. In some embodiments, the first fluorescent molecule comprises a chlorin and the second fluorescent molecule comprises a bacteriochlorin, and further wherein upon excitation with violet light, the dyad emits both red and near infrared light. In some embodiments, the porphyrinic macrocycle-containing dyad of the presently disclosed subject matter are used for calibration of multi-laser flow cytometers, alignment and/or calibration of confocal fluorescence microscopes, or differential labeling of cells and/or other biomolecules (e.g., antibodies or fragments or derivatives thereof). In some embodiments, a porphyrinic macrocycle-containing dyad of the presently disclosed subject matter is conjugated to an antibody and/or a paratope-containing fragment or derivative thereof.

II.G. Populations of Distinct Fluorescent Microparticles and/or Nanoparticles

The presently disclosed subject matter also provides populations comprising a plurality of distinct fluorescent microparticles and/or nanoparticles. As used herein, the term "distinct" refers to fluorescent microparticles and/or nanoparticles that can be distinguished from each other based on any measurable criteria. For example, fluorescent microparticles and/or nanoparticles can be considered distinct if they have different porphyrinic macrocycles associated therewith that have distinguishable emission spectra. In some embodiments, a distinct fluorescent microparticle and/or nanoparticle of the presently disclosed subject matter is associated with one or more distinct porphyrinic macrocycles, wherein each distinct porphyrinic macrocycle has an emission wavelength band that has a full width at half maximum peak that is less than about 25 nm and that is separated by at least 5 nm from that of any of the other distinct porphyrinic macrocycle in the population.

In some embodiments, each fluorescent microparticle and/or nanoparticle comprises a polymeric matrix and at least one porphyrinic macrocycle, and in some embodiments the population comprises at least two distinct fluorescent microparticles and/or nanoparticles comprising different porphyrinic macrocycles.

In some embodiments, each distinct fluorescent microparticle and/or nanoparticle is associated with one or more distinct porphyrinic macrocycles; and each distinct porphyrinic macrocycle has an emission wavelength band that has a full width at half maximum peak that is less than about 25 nm and that is separated by at least 5 nm from that of any of the other distinct porphyrinic macrocycle in the population. In some embodiments, the population comprises at least three, four, five, six, seven or eight distinct fluorescent polymeric microparticles and/or nanoparticles.

In some embodiments, the polymeric matrix comprises polystyrene, which is optionally in the form of a bead. In some embodiments, the at least one porphyrinic macrocycle is present non-covalently associated with the exterior of the fluorescent microparticle, nanoparticle, and/or bead, is encapsulated by the fluorescent microparticle, nanoparticle, and/or bead, is covalently attached to a surface of the fluorescent microparticle, nanoparticle, and/or bead, or any combination thereof.

In some embodiments of the presently disclosed populations, each of the distinct fluorescent polymeric microparticles and/or nanoparticles present in the population is capable of excitation by light at a single wavelength and/or by light between about 320 nm and about 450 nm.

In some embodiments of the presently disclosed populations, at least a subset of the distinct fluorescent polymeric microparticles and/or nanoparticles comprises a porphyrinic macrocycle selected from the group consisting of porphyrins (including 17,18-didehydrophorbines), chlorins (including phorbines), bacteriochlorins (including bacteriophorbines), and isobacteriochlorins (including isobacteriochlorins containing a fused "E" ring). In some embodiments, one or more of the at least one porphyrinic macrocycles has a structure selected from the group consisting of Formulas I and II depicted herein above. In some embodiments, one or more of the at least one porphyrinic macrocycles are selected from the group consisting of hydroporphyrins SE197, SE211, SE420, SE357, S355, B56, B62, B66, and combinations thereof.

In some embodiments of the presently disclosed populations, each of the plurality of fluorescent polymeric microparticles and/or nanoparticles has a different emission wavelength band characterized by a full width at half maximum peak that is less than about 25 nm and/or that is separated from the full width at half maximum peak of the emission wavelength band of any one of the other fluorescent polymeric microparticles and/or nanoparticles by at least about 5 nm.

In some embodiments, the emission wavelength band of each of the plurality of fluorescent polymeric microparticles and/or nanoparticles is between about 590 nm and about 750 nm. In some embodiments, the population is capable of excitation by light at 405 nm. In some embodiments, each fluorescent microparticle and/or nanoparticle comprises a polymeric matrix and one porphyrinic macrocycle. In some embodiments, the presently disclosed populations comprise at least 1, 2, 3, 4, 5, 6, 7, 8, 9, 10, 15, 20, 25, 30, 35, 40, 45, 50, or more fluorescent polymeric microparticles and/or nanoparticles, optionally wherein one or more of the fluorescent microparticles and/or nanoparticles comprises a porphyrinic macrocycle selected from the group consisting of hydroporphyrins SE197, SE211, SE420, SE357, SE355, B56, B62, and B66, and combinations thereof.

In some embodiments, the distinct fluorescent polymeric microparticles and/or nanoparticles of the presently disclosed populations are prepared by mixing a solution of at least one porphyrinic macrocycle in a solvent, optionally tetrahydrofuran (THF), with an aqueous solution of a microparticle comprising the polymeric matrix and then removing the solvent; and has an emission wavelength band that has a full width at half maximum peak that is less than about 25 nm and is separated by at least 5 nm from the emission wavelength band full width at half maximum peak of any of the other distinct fluorescent polymeric microparticles in the population. It is noted that other solvents besides THF can be employed, such as but not limited to p-dioxane, tetrahydropyran, and 2-methyl-tetrahydrofuran. The solvent selected should dissolve the hydroporphyrin, be miscible in water, and should ideally very mildly swell the microparticles and/or nanoparticles (e.g., the polystyrene particle or bead), thereby permitting the at least one porphyrinic macrocycle to associate with the microparticles and/or nanoparticles (e.g., the polystyrene particle or bead).

In some embodiments, the population is prepared by preparing a first solution of one or more porphyrinic macrocycles in a solvent, optionally tetrahydrofuran (THF), and further optionally wherein the first solution comprises between about 0.25 µg/ml to about 20 µg/ml hydroporphyrin; adding the first solution to a first mixture comprising a polymeric microparticle and/or nanoparticle, water, and a polymeric surfactant, thereby providing a second mixture, optionally wherein the first solution is added to provide a second mixture comprising about 33% solvent and/or wherein the polymeric microparticle and/or nanoparticle comprises polystyrene and/or wherein the polymeric surfactant is a polyalkylene glycol block copolymer; mixing the second mixture for a period of time, optionally wherein the period of time is about 15 minutes; removing the solvent from the second mixture to provide a first fluorescent polymeric microparticle and/or nanoparticle, optionally wherein the removing comprises centrifuging the second mixture and/or rinsing the microparticles; repeating the previous steps to provide one or more additional fluorescent polymeric microparticles and/or nanoparticles, wherein each of the one or more additional fluorescent polymeric microparticles and/or nanoparticles comprises a different porphyrinic macrocycle or porphyrinic macrocycle mixture than the first fluorescent polymeric microparticle and/or nanoparticle or any of the other additional fluorescent polymeric microparticles and/or nanoparticles; and mixing the first fluorescent polymeric microparticle and/or nanoparticle with at least one of the one or more additional fluorescent polymeric microparticles and/or nanoparticles, thereby providing a population comprising a plurality of fluorescent polymeric microparticles and/or nanoparticles, wherein each of the fluorescent polymeric microparticles and/or nanoparticles comprises a polymeric matrix and at least one porphyrinic macrocycle, wherein when the population is excited by light, optionally wherein the light is between about 320 nm and about 450 nm and further optionally wherein the light is of a single wavelength, each of the plurality of fluorescent polymeric microparticles and/or nanoparticles can be separately and/or simultaneously detected.

In some embodiments, the presently disclosed methods further comprise conjugating one or more of the microparticles and/or nanoparticles to one of the group consisting of a molecule, a protein, an antibody, an antibody fragment, a nucleic acid, and a cell.

As used herein, the terms "antibody" and "antibodies" refer to proteins comprising one or more polypeptides substantially encoded by immunoglobulin genes or fragments of immunoglobulin genes. Immunoglobulin genes typically include the kappa (κ), lambda (λ), alpha (α), gamma (γ), delta (δ), epsilon (ε), and mu (µ) constant region genes, as well as myriad immunoglobulin variable region genes. Light chains are classified as either κ or λ. In mammals, heavy chains are classified as γ, µ, α, δ, or ε, which in turn define the immunoglobulin classes, IgG, IgM, IgA, IgD, and IgE, respectively. Other species have other light and heavy chain genes (e.g., certain avians produced what is referred to as IgY, which is an immunoglobulin type that hens deposit in the yolks of their eggs), which are similarly encompassed by the presently disclosed subject matter.

A typical immunoglobulin (antibody) structural unit is known to comprise a tetramer. Each tetramer is composed of two identical pairs of polypeptide chains, each pair having one "light" chain (average molecular weight of about 25 kiloDalton (kDa)) and one "heavy" chain (average molecular weight of about 50-70 kDa), The two identical pairs of polypeptide chains are held together in dimeric form by disulfide bonds that are present within the heavy chain region. The N-terminus of each chain defines a variable region of about 100 to 110 or more amino acids primarily responsible for antigen recognition. The terms variable light chain ($V_L$) and variable heavy chain ($V_H$) refer to these light and heavy chains, respectively.

Antibodies typically exist as intact immunoglobulins or as a number of well-characterized fragments that can be produced by digestion with various peptidases. For example, digestion of an antibody molecule with papain cleaves the antibody at a position N-terminal to the disulfide bonds. This produces three fragments: two identical "Fab" fragments, which have a light chain and the N-terminus of the heavy chain, and an "Fc" fragment that includes the C-terminus of the heavy chains held together by the disulfide bonds. Pepsin, on the other hand, digests an antibody C-terminal to the disulfide bond in the hinge region to produce a fragment known as the "F(ab)'$_2$" fragment, which is a dimer of the Fab fragments joined by the disulfide bond. The F(ab)'$_2$ fragment can be reduced under mild conditions to break the disulfide linkage in the hinge region, thereby converting the F(ab')$_2$ dimer into two "Fab'" monomers. The Fab' monomer is essentially an Fab fragment with part of the hinge region (see e.g., Paul, 1993, for a more detailed description of other antibody fragments). With respect to these various fragments, Fab, F(ab')$_2$, and Fab' fragments include at least one intact antigen binding domain (referred to as a "paratope"), and thus are capable of binding to antigens.

While various antibody fragments are defined in terms of the digestion of an intact antibody, one of skill will appreciate that various of these fragments (including, but not limited to Fab' fragments) can be synthesized de novo either chemically or by utilizing recombinant DNA methodology. Thus, the term "antibody" as used herein also includes antibody fragments either produced by the modification of whole antibodies or synthesized de novo using recombinant DNA methodologies. In some embodiments, the term "antibody" comprises a fragment that has at least one antigen binding domain.

The antibodies, fragments, and derivatives of the presently disclosed subject matter can also include chimeric antibodies. As used herein in the context of antibodies, the term "chimeric", and grammatical variants thereof, refers to antibody derivatives that have constant regions derived substantially or exclusively from antibody constant regions from one species and variable regions derived substantially or exclusively from the sequence of the variable region from another species. A particular kind of chimeric antibody is a "humanized" antibody, in which the antibodies are produced by substituting the complementarity determining regions (CDRs) of, for example, a mouse antibody, for the CDRs of a human antibody (see e.g., PCT International Patent Application Publication No. WO 1992/22653). Thus in some embodiments, a humanized antibody has constant regions and variable regions other than the CDRs that are derived substantially or exclusively from the corresponding human antibody regions, and CDRs that are derived substantially or exclusively from a mammal other than a human.

The antibodies, fragments, and derivatives of the presently disclosed subject matter can also be single chain antibodies and single chain antibody fragments. Single-chain antibody fragments contain amino acid sequences having at least one of the variable regions and/or CDRs of the whole antibodies described herein, but are lacking some or all of the constant domains of those antibodies. These constant domains are not necessary for antigen binding, but constitute a major portion of the structure of whole antibodies.

Single-chain antibody fragments can overcome some of the problems associated with the use of antibodies containing a part or all of a constant domain, For example, single-chain antibody fragments tend to be free of undesired interactions between biological molecules and the heavy-chain constant region, or other unwanted biological activity. Additionally, single-chain antibody fragments are considerably smaller than whole antibodies and can therefore have greater capillary permeability than whole antibodies, allowing single-chain antibody fragments to localize and bind to target antigen-binding sites more efficiently. Also, antibody fragments can be produced on a relatively large scale in prokaryotic cells, thus facilitating their production. Furthermore, the relatively small size of single-chain antibody fragments makes them less likely to provoke an immune response in a recipient than whole antibodies. The single-chain antibody fragments of the presently disclosed subject matter include, but are not limited to single chain fragment variable (scFv) antibodies and derivatives thereof such as, but not limited to tandem di-scFv, tandem tri-scFv, diabodies, including bispecific diabodies, triabodies, tetrabodies, miniantibodies, minibodies, tetravalent bispecific molecules, bi-specific F(ab')$_2$ fragments, etc.

Thus, in some embodiments the presently disclosed subject matter relates to an antibody, or a fragment or derivative thereof, covalently conjugated to and/or associated with a fluorescent microparticle, nanoparticle, and/or dyad as described herein. In some embodiments, the antibody, or the fragment or derivative thereof, of the presently disclosed subject matter is conjugated to and/or associated with a porphyrinic macrocycle selected from the group consisting of porphyrinic macrocycles SE197, SE211, SE420, SE357, SE355, B56, B62, B66, and/or any combination thereof, and/or is conjugated to and/or associated with one or more porphyrinic macrocycle-containing dyads that comprises at least one porphyrinic macrocycle selected from the group consisting of porphyrinic macrocycles SE197, SE211, SE420, SE357, SE355, B56, B62, and B66, and/or any combination thereof.

II.H. Other Compositions

In some embodiments, the presently disclosed subject matter also provides sets of separately detectable fluorescent microparticles, nanoparticles, and/or dyads, which in some embodiments are prepared by the presently disclosed methods. In some embodiments, a set of separately detectable fluorescent microparticles, nanoparticles, and/or dyads includes at least 1, 2, 3, 4, 5, 6, 7, 8, 9, 10, 15, 20, 25, 30, 35, 40, 45, 50, or more separately detectable fluorescent microparticles, nanoparticles, and/or dyads.

Additional starting materials and methods for synthesizing the fluorescent microparticles, nanoparticles, and/or dyads of the presently disclosed subject matter can be found in U.S. Pat. Nos. 7,332,599; 7,408,058; 7,423,160; 7,470,785; 7,501,508; 7,518,905; 7,534,807; 7,553,977; 7,582,751; 7,595,407; 7,633,007; 7,678,900; 7,723,513; 7,745,618; 7,884,280; 7,947,828; 7,947,829; 7,951,939; 7,964,720; 7,994,312; 8,013,149; 8,062,756; 8,080,653; 8,097,609; 8,129,520; 8,173,691; 8,173,692; 8,187,824; 8,188,298; 8,207,329; 8,212,023; 8,212,055; 8,278,439; 8,304,561; 8,445,695; 8,524,892; 8,530,459; 8,546,088; 8,664,260; 8,980,565; 9,303,165; 9,365,722; and 9,417,245; each of which is incorporated by reference in its entirety.

III. Methods of Use

The presently disclosed compositions (e.g., fluorescent microparticles, nanoparticles, beads, dyads, etc.) can be employed for any purpose for which fluorescent molecules, particularly particles comprising a plurality of fluorescent molecules, can be employed. Exemplary uses for the fluorescent microparticles, nanoparticles, beads, dyads, and populations thereof of the presently disclosed subject matter include use as calibration standards for flow cytometry and other diagnostics applications (including, but not limited to compensation controls, instrument setup controls, etc.; see e.g., Perfetto et al., 2006); use in multiplex bead arrays for flow cytometry (including but not limited to immunoassays, nucleic acid detection, PCR products, etc.); labels for flow cytometry analysis of cell surface markers; labels for imaging and microscopy; and use in particle arrays and barcoding of cells and biomolecules such as, but not limited to antibodies and fragments and derivatives thereof.

Thus, in some embodiments a population of fluorescent polymeric microparticles, nanoparticles, and/or dyads of the presently disclosed subject matter can be employed for differentially labeling wells of a multiwall plate. In some embodiments, one or more of the wells of the multiwall plate are coated, each with a distinct fluorescent microparticle, nanoparticle, or dyad, or a combination thereof, such that the coated wells can be distinguished from each other based on excitation spectra derived from the particular fluorescent microparticle, nanoparticle, and/or dyad present therein.

Similarly, in some embodiments a population of fluorescent polymeric microparticles, nanoparticles, and/or dyads of the presently disclosed subject matter can be employed for differentially labeling cells and/or biomolecules. In some embodiments, this is accomplished by introducing into one or more cells a distinct fluorescent microparticle, nanoparticle, and/or dyad, or a combination thereof, or associating and/or conjugating the same to a biomolecule (including but not limited to an antibody or a fragment or derivative thereof), such that individual cells and/or biomolecules can be distinguished from each other based on excitation spectra derived from the particular fluorescent microparticle, nanoparticle, and/or dyad present therein and/or conjugated or otherwise associated therewith.

By way of example and not limitation, narrow emission porphyrinic macrocycles offer distinct advantages for barcoding experiments. First, narrow emissions allow for less compensation (correction) between channels and therefore increase accuracy of bead/nanoparticle identification. Second, narrow emissions allow for more emission channels from one laser, such as the violet laser, eliminating cross-excitation issues and allowing for as many as 6-10 distinct emission channels to be used. Third, synthetic porphyrinic macrocycles are in some embodiments quite hydrophobic, allowing for even loading of beads/nanoparticles and ensuring minimal loss of dye from beads/nanoparticles when used in aqueous conditions typical of most bioassays. An example of using Quantum Dots (QDs) for barcoding is provided by Rees et al., 2014, which describes using three different QDs to generate 17,000 individual cell codes.

IV. Kits

The presently disclosed subject matter also provides kits, which in some embodiments comprise one or more fluorescent microparticles, nanoparticles, and/or dyads. In some embodiments, the presently disclosed kits comprise a plurality of fluorescent microparticles and/or nanoparticles and/or dyads, wherein each fluorescent microparticle, nanoparticle, or dyad comprises at least one porphyrinic macrocycle. In some embodiments, the kits provide the plurality of fluorescent microparticles and/or nanoparticles and/or dyads comprising at least one porphyrinic macrocycle as purified species in separate containers, such that each container contains only one species of fluorescent microparticle, nanoparticle, or dyad. As used herein, a "species" is a single microparticle, nanoparticle, or dyad that is labeled with one or more porphyrinic macrocycles or a plurality of identical microparticles, nanoparticles, or dyads that are labeled with the same one or more porphyrinic macrocycles such that different species are separately detectable from each other. In some embodiments, the kits thus provide reagents that can be used single or in various combinations to perform the methods and/or take part in the uses set forth herein. In some embodiments, the kits comprise at least 1, 2, 3, 4, 5, 6, 7, 8, 9, 10, 15, 20, 25, 30, 35, 40, 45, 50, or more separately detectable fluorescent microparticles, nanoparticles, and/or dyads.

EXAMPLES

The following Examples provide illustrative embodiments. In light of the present disclosure and the general level of skill in the art, those of skill will appreciate that the following Examples are intended to be exemplary only and that numerous changes, modifications, and alterations can be employed without departing from the scope of the presently disclosed subject matter.

Example 1

Staining of Polystyrene Beads with Chlorins

Figure 1:
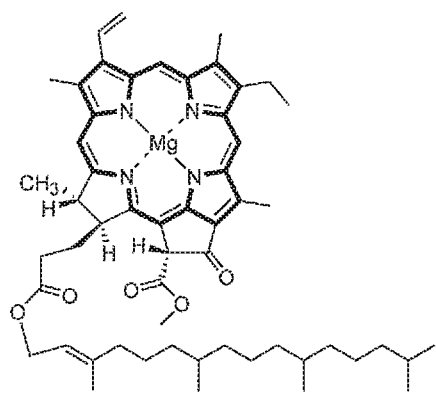
FIG. 1 depicts the structures of chlorophyll a and bacteriochlorophyll a, as well as the synthetic chlorin and bacteriochlorin core structures that are based on chlorophyll a and bacteriochlorophyll a, respectively.
Figure 1:
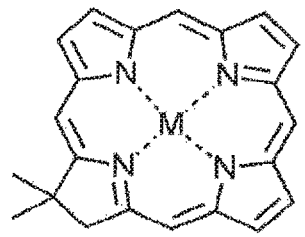
Figure 1:
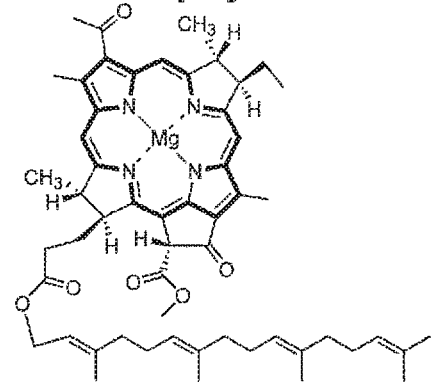
Figure 1:
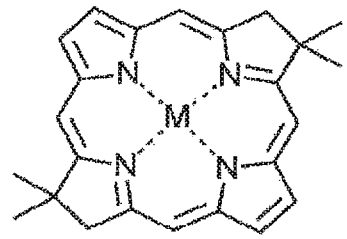
Figures 2A, 2B:
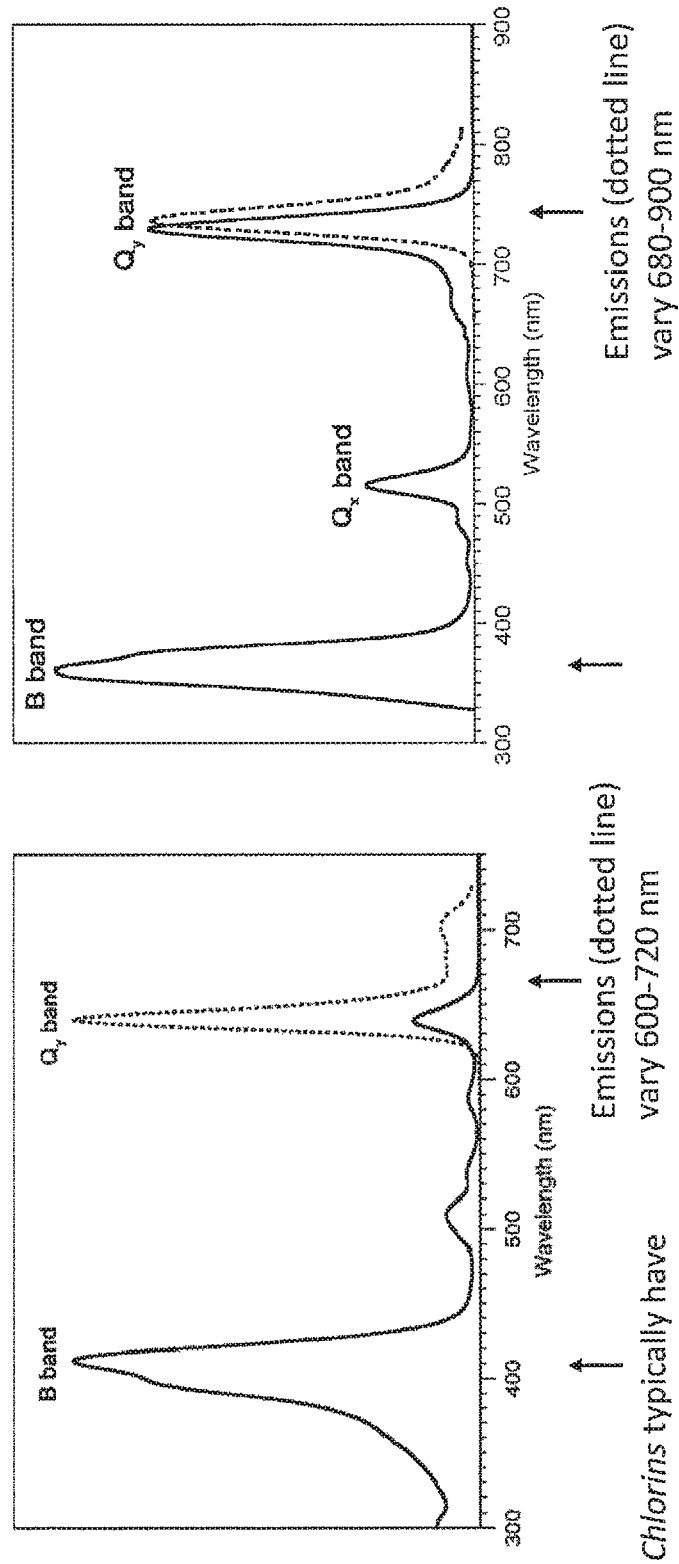
FIGS. 2A and 2B are plots of typical absorbance and fluorescence emission spectra of chlorins and bacteriochlorins (FIG. 2B).
Figure 3A:
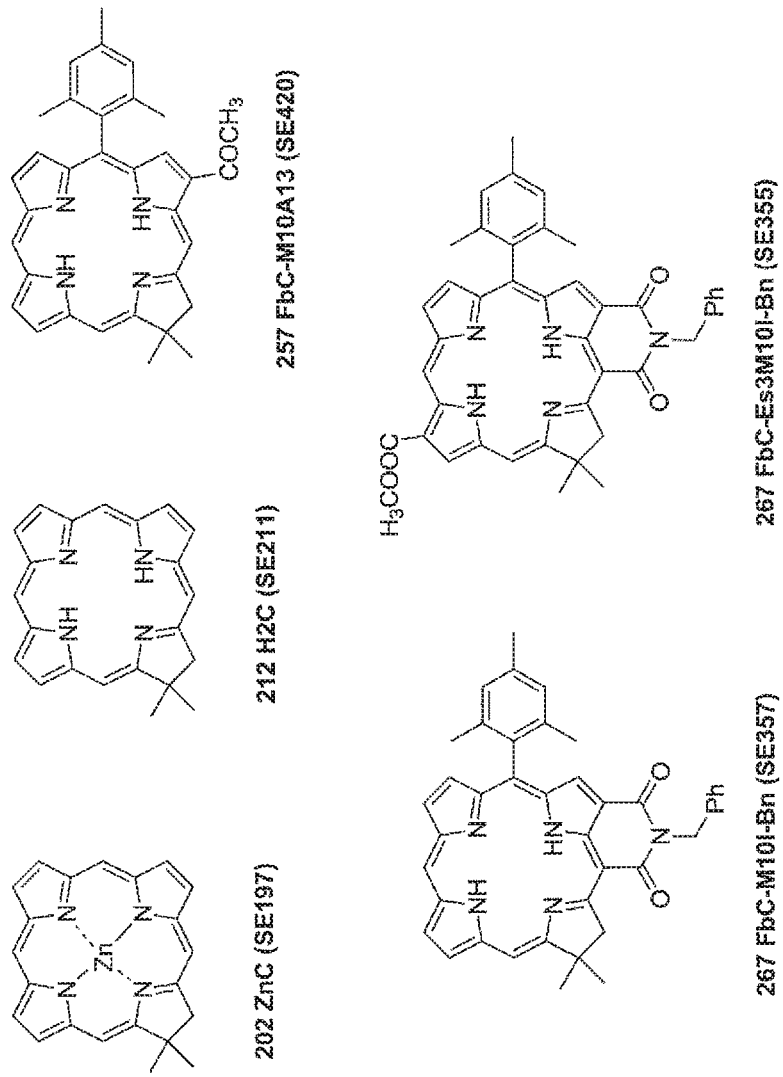

Materials: PLURONIC® F127 brand non-ionic detergent was purchased from Sigma-Aldrich Co., LLC (St. Louis, Missouri, United States of America). Various chlorins, including SE197, SE211, SE420, SE355, and SE357 (see FIG. 3), were obtained from John Lindsey of the North Carolina State University (Raleigh, North Carolina, United States of America). Tetrahydrofuran (THF) without inhibitors (no BHT) was purchased from Sigma-Aldrich Co., LLC (St. Louis, Missouri, United States of America; catalogue No. 401757). Polystyrene (PS) beads (mean diameter 5.43 μm) were purchased from Bangs Laboratories, Inc. (Fishers, Indiana, United States of America; Catalogue No. PS06N). Water meeting the U.S. National Committee for Clinical Laboratory Standards (NCCLS) was purchased from Worldwide Medical Corporation (Lake Forest, California, United States of America; Catalog No. ES612). Fluorescence was detected and quantified on a Varian Cary Eclipse Fluorescent Spectrophotometer (Varian, Inc., now part of Agilent Technologies, Palo Alto, California, United States of America).

Method: The following were added to a 1.7 mL microfuge tube: 140.0 μL NCCLS water, 70.0 μL 2.0% (v/v) PLURONIC® F127 brand non-ionic detergent, and 15.0 μL PS beads (resuspended well before use). A chlorin/THF solution (115 μL; chlorin concentration in THF 0.25 μg/mL to 20.0 μg/mL) was added drop-wise while vortexing the contents of microfuge tube for a final concentration of approximately 33% THF. The tube was incubated at room temperature for 15 minutes "horizontally" on a rotary mixer at 70-80 RPM. The reaction tubes were centrifuged at 850×g for 3 minutes to pellet the doped PS beads. The supernatant was carefully removed using a Rainin P200 pipettor and tip. 300 μL NCCLS water was added to the pellet and the tube was vortexed using a "pulsed" method at ⅝ speed times five pulses. The centrifugation and subsequent steps were repeated two more times for a total of three washes of the PS beads. After the third supernatant removal, 30.0 μL NCCLS water was added, the tube was vortexed again, and the sample was diluted 1:75 in NCCLS water (i.e., 4.0 μL sample plus 300 μL NCCLS water) for characterization by fluorescence spectroscopy. The spectra of the chlorin-doped PS beads were essentially the same as for the chlorin fluorescence measured in toluene (see FIG. 3B).

Example 2

Flow Cytometry with PS Beads Doped with Chlorins to Assess Relative Brightnesses of Labels Polystyrene beads (5.43 μm) were obtained from Bangs Laboratories and prepared with chlorins as described in EXAMPLE 1 Samples were prepared for flow cytometry in 5 mL polystyrene round-bottom tubes (Catalog No. 352058, Corning, Inc., Corning, New York, United States of America). For a negative control, unlabeled polystyrene beads were treated with THF as in EXAMPLE 1 for loading, except no dye was added. Material was washed in the same manner and resuspended in water for use as a blank in flow cytometry. For analysis, beads (blank or dyed) were diluted 1:400 in water containing 0.05% PLURONIC® F127 brand non-ionic detergent into flow cytometry tubes.

Samples were analyzed at the University of North Carolina Core Flow Cytometry Facility (Chapel Hill, North Carolina, United States of America) on either a nineteen parameter LSR-II SORP flow cytometer (BD Biosciences, San Jose, California, United States of America) equipped with seven (7) lasers (355, 405, 488, 532, 561, 594, and 633 nm) or a LSRFORTESSA™ brand flow cytometer (BD Biosciences) equipped with five (5) lasers (355, 405, 488, 561, and 640 nm) using FACSDiva 8.0 acquisition software (BD Biosciences). Chlorin SE420 data were collected in channel A of the 100 mW 405 nm laser with a 630 nm longpass (LP) filter and a 660/20 nm bandpass (BP) filter in place to acquire the data shown in FIG. 4. The LP and BP filters were obtained from either BD Biosciences or Chroma Technology Corporation (Bellows Falls, Vermont, United States of America). For the five chlorin panel data shown in FIG. 5, the filters and channels described in Table 1 were used. Post-experimental analysis was performed with FlowJo software (version 10.0.8, FlowJo, LLC, Ashland, Oregon, United States of America).

TABLE 1

Spectral Properties for Five Chlorin Dyes with Matching Flow Cytometry Channels and Filter Selections for Their Analysis by Flow Cytometry

| Chlorin | C1 (SE197) | C2 (SE211) | C3 (SE420) | C4 (SE357) | C5 (SE355) |
|---|---|---|---|---|---|
| $\lambda_{max}$ (nm) | 602.6 | 633.4 | 661.0 | 689.6 | 719.0 |
| Violet (405 nm) Channel | E | D | C | B | A |
| LP filter (nm) | 570 | 615 | 650 | 670 | 710 |
| BP filter (nm) | 610/20 | 630/22 | 660/20 | 690/20 | 730/45 |

Figure 4:
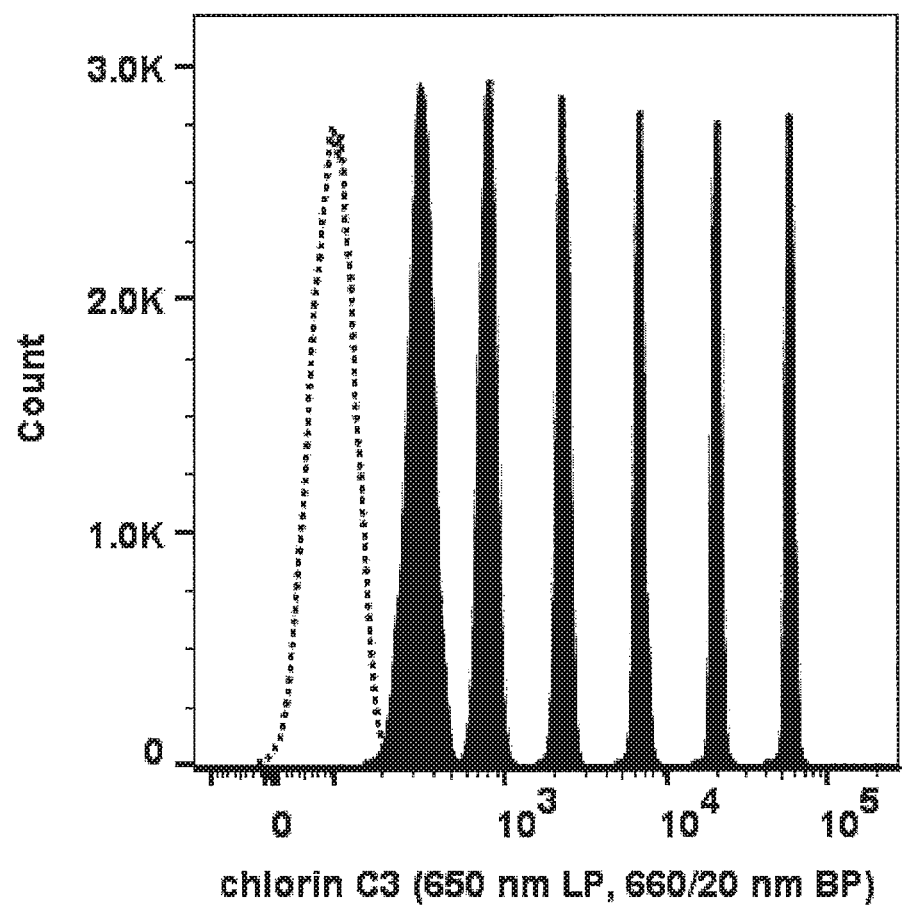
FIG. 4 is a series of flow cytometry histograms for a half log concentration titration of chlorin SE420 (also referred to as chlorin C3) in 5.4 μm diameter polystyrene beads (solid) versus beads treated with THF but with no added chlorin (dotted line).

Blank beads were identified on the basis of forward and side light scatter. Gating was applied to exclude events with both lower and higher scatter than single beads and all further data was analyzed using this gating. For all experiments, 3000 gated events were collected. FIG. 4 shows an example of a flow cytometry histogram for a combination of sets of beads treated with solutions of a single chlorin (SE420) prepared in half log concentration steps with the highest doping concentration equal to 1 μg/mL. The sharp peaks indicated the evenness of the chlorin application to the beads for over more than a two log concentration range.

Figure 5:
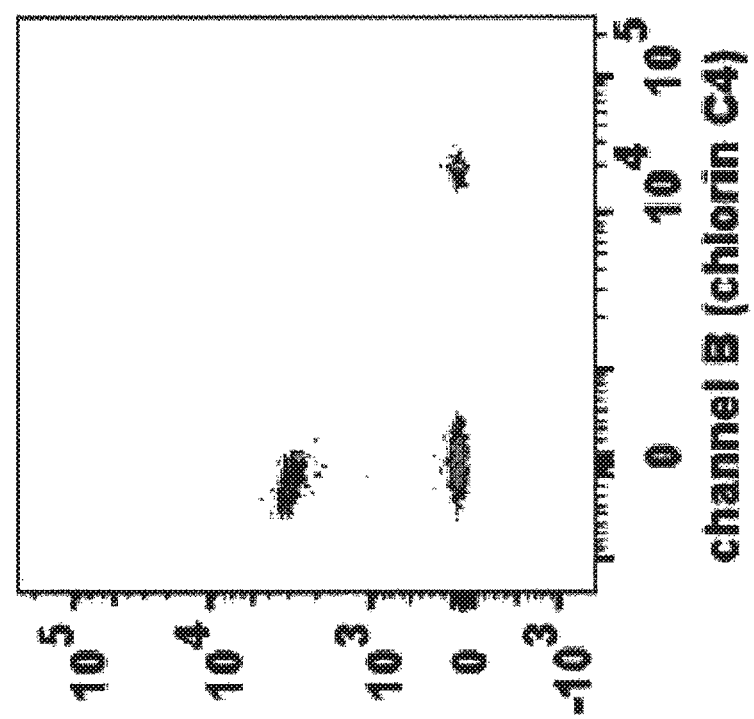
FIG. 5 is a series of select pair-wise dot plots of compensated data from the mixture of beads treated individually with five different chlorins C1 through C5 Compensation was applied using the values from Table 2.
Figure 5:
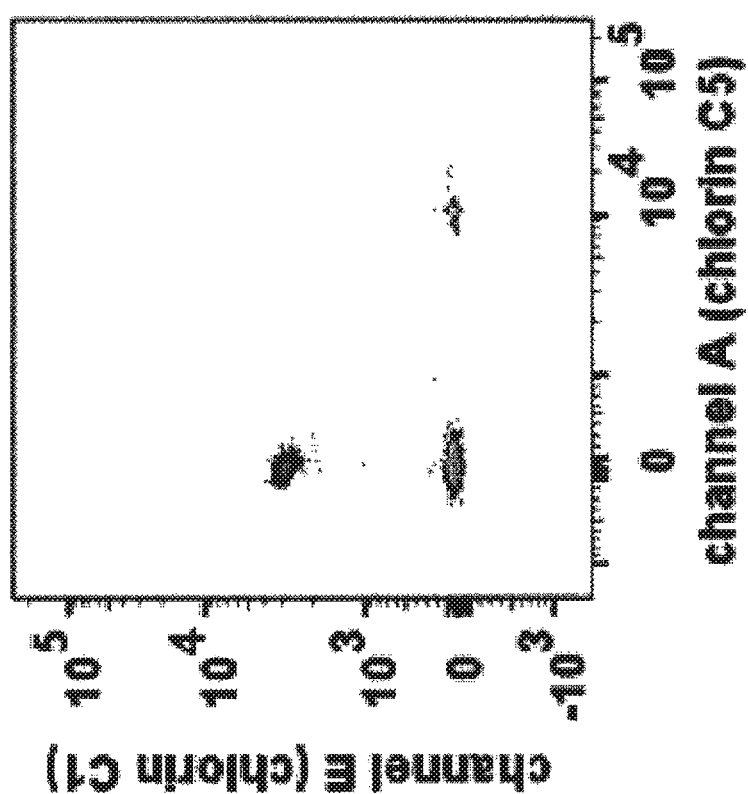
Figure 5:
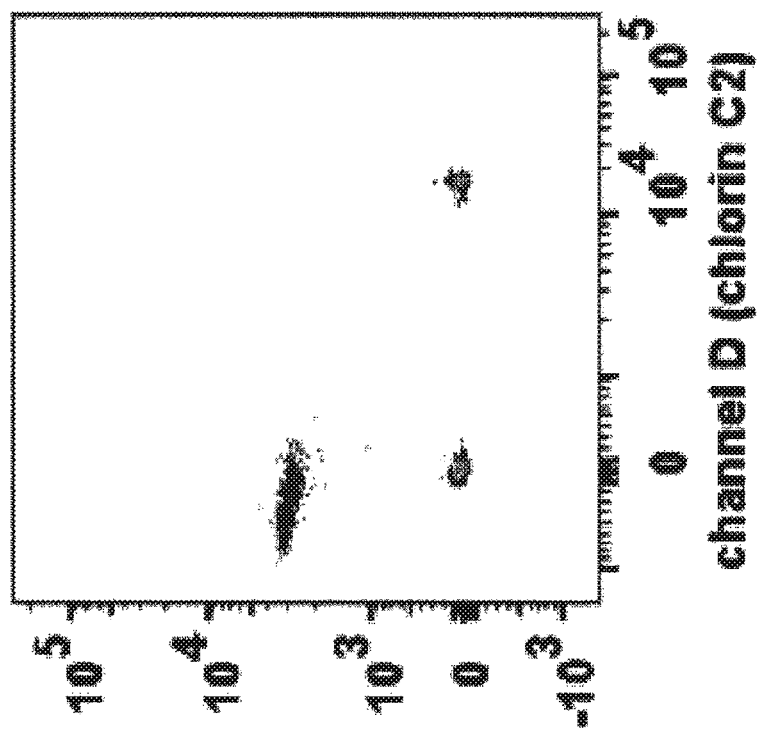
Figure 5:
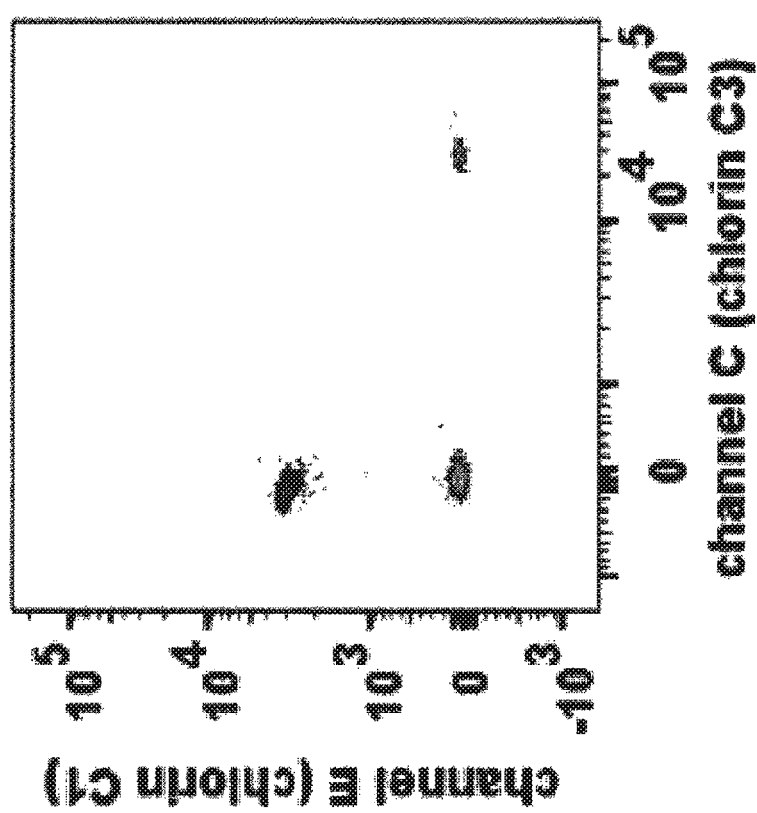
Figure 6A:
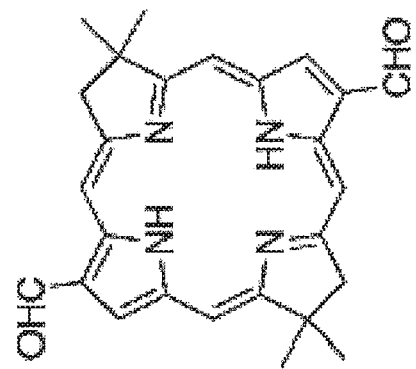
FIGS. 6A and 6B depict the structures of three bacteriochlorins with emission between 700 and 800 nm (FIG. 6A) and fluorescence emission spectra (FIG. 6B) of the same three bacteriochlorins in order of increasing wavelength B56, B66, and B62.
Figure 6A:
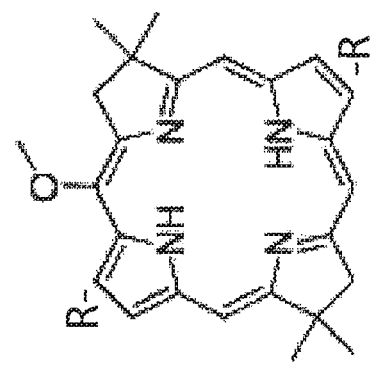
Figure 6A:
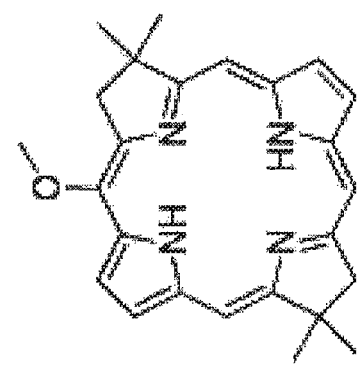
Figure 6B:
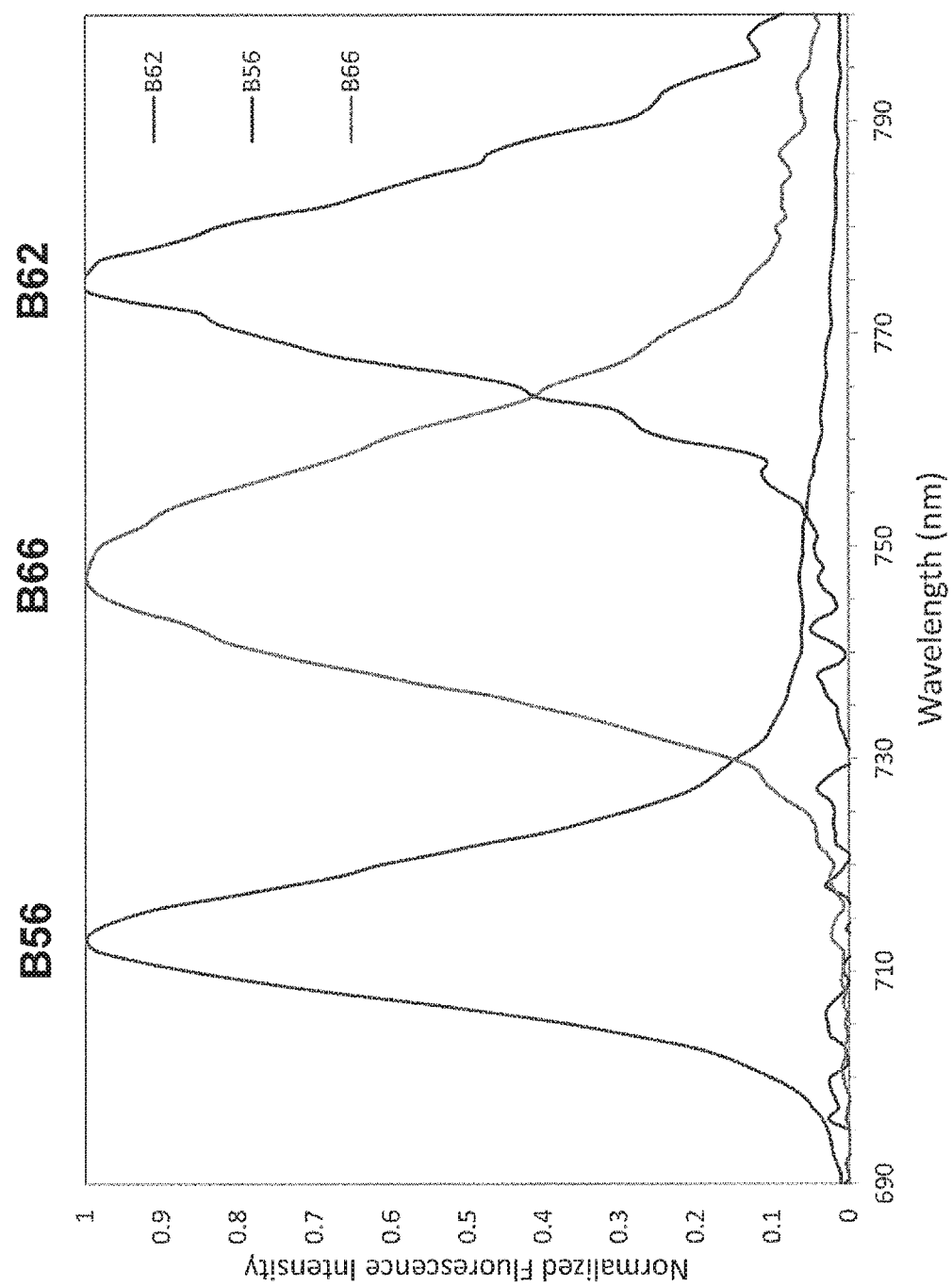

FIG. 5 shows a selection of dot plots for simultaneous pair-wise interactions among the mixed bead populations. These dot plots were produced after applying the compensation matrix values in Table 2. These compensation values were determined from measuring spillover of each individual bead into the other four channels. In this data set the channels and chlorins were named C1-C5 as specified in Table 1. The data and compensation table values showed that five violet-excitable narrow emission chlorins with peak emissions separated by less than 120 nm could be accurately analyzed by flow cytometry using minimal correction (compensation) and using a conventional flow cytometer with commercially available filter sets.

TABLE 2

Compensation Matrix for Simultaneous Detection of Five Chlorin-stained Polystyrene Beads

| Channels | Channels | | | | |
|---|---|---|---|---|---|
| Chlorins | C1 | C2 | C3 | C4 | C5 |
| C1 | 100 | 67.19 | 42.20 | 44.54 | 27.64 |
| C2 | 0.58 | 100 | 8.51 | 12.21 | 3.46 |
| C3 | 0.12 | 0.72 | 100 | 16.59 | 13.44 |
| C4 | 0.33 | 0.44 | 5.41 | 100 | 15.93 |
| C5 | 0.05 | 0.62 | 0.91 | 4.03 | 100 |

Example 3

Staining of Polystyrene Beads with Bacteriochlorins

Polystyrene (PS) Beads (5.43 μm; Catalogue No, PS06N/6667, Bangs Laboratories) were stained with three bacteriochlorins in similar procedures to those used for preparing chlorin stained beads in EXAMPLE 1, The bacteriochlorins were prepared according to either Taniguchi et al., 2008 or Yang et al., 2011. The structures and fluorescence emission spectra of the three bacteriochlorins in toluene are given in FIG. 6.

Example 4

Analysis of Bacteriochlorin-Doped Beads by Flow Cytometry

Figure 7A:
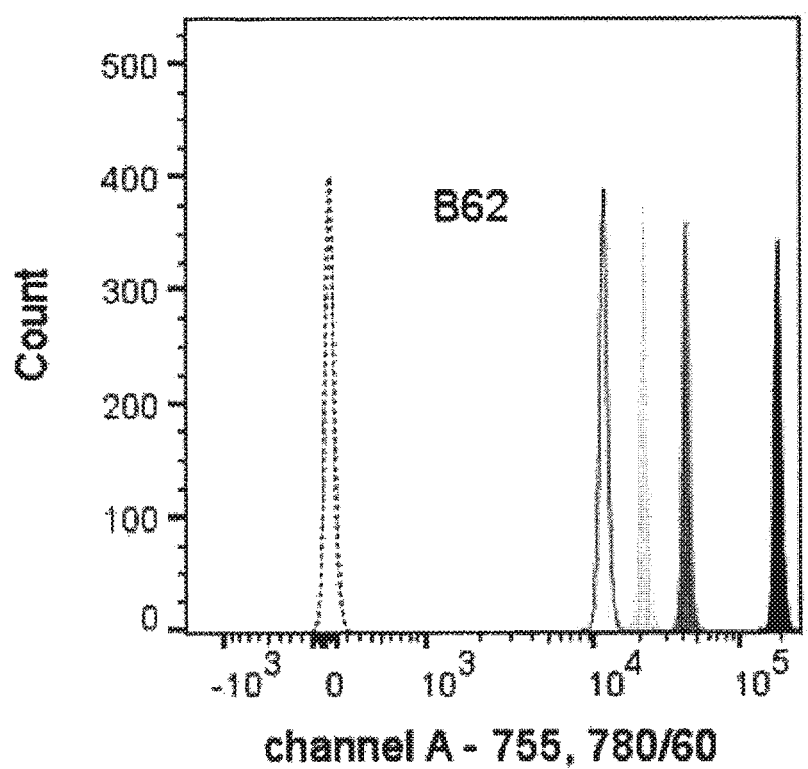
FIGS. 7A-7C is a series of flow cytometry histograms of bacteriochlorin-doped 5.43 micron diameter polystyrene beads titrated from dye solutions of five different concentrations.
Figure 7B:
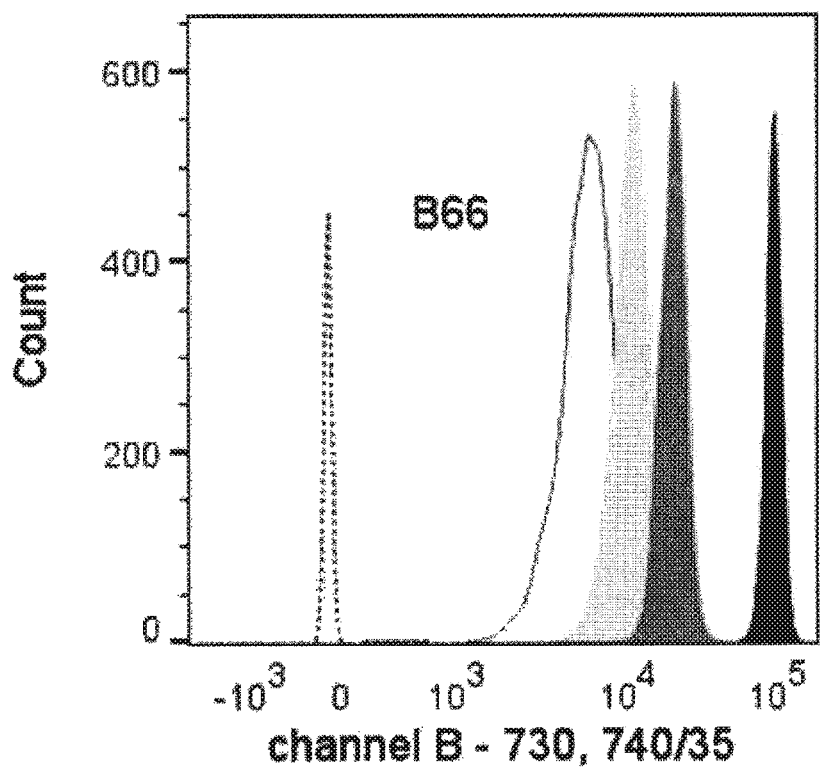
Figure 7C:
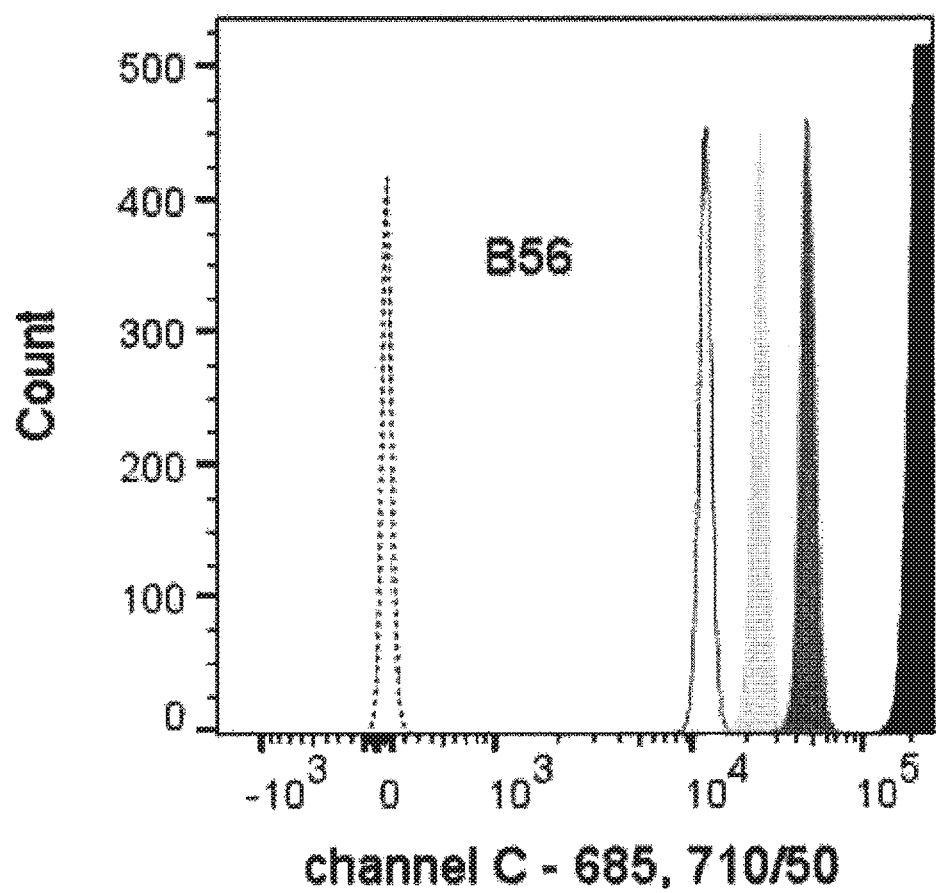

Flow cytometry analysis were similar to the methods described in EXAMPLE 2. However, only the LSR-FORTESSA™ brand flow cytometer was used, the excitation source was the UV laser (355 nm), and the filters for the analysis were as specified in Table 3. FIGS. 7A-7C shows titrations of each of the three bacteriochlorins from doping solutions of 0, 0.25, 0.5, 1.0, and 5.0 μg/mL for each bacteriochlorin as analyzed using the filters specified in Table 3. The sharp bands in FIG. 7 indicated the evenness of hydroporphyrin doping within the beads.

TABLE 3

Spectral Properties for Bacteriochlorins with Matching Flow Cytometry Channels and Filter Selections for Their Analysis by Flow Cytometry

| Bacteriochlorin | B1 (B56) | B2 (B66) | B3 (B62) |
|---|---|---|---|
| $\lambda em_{max}$ (nm) | 711 | 748 | 777 |
| UV (355 nm) Channel | C | B | A |
| LP filter (nm) | 685 | 730 | 755 |
| BP filter (nm) | 710/50 | 740/35 | 780/60 |

Figure 8:
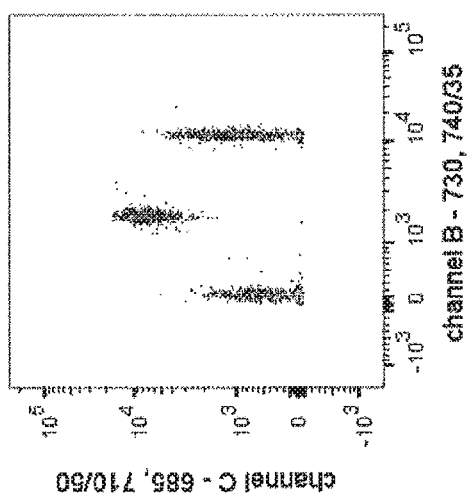
FIG. 8 provides a series of uncompensated (top three panels) and compensated (bottom three panels) dot plots for flow cytometry analysis of a mixture of three bacteriochlorin-doped 5.43 μm diameter beads.
Figure 8:
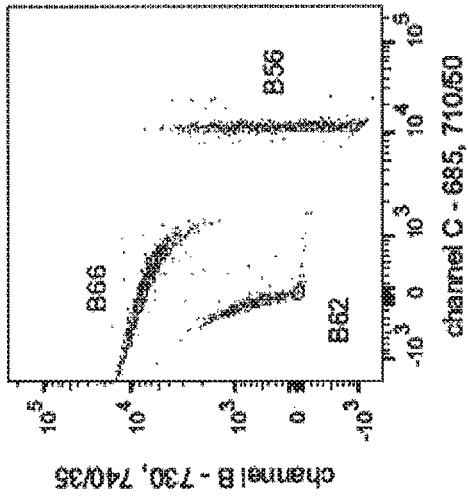
Figure 8:
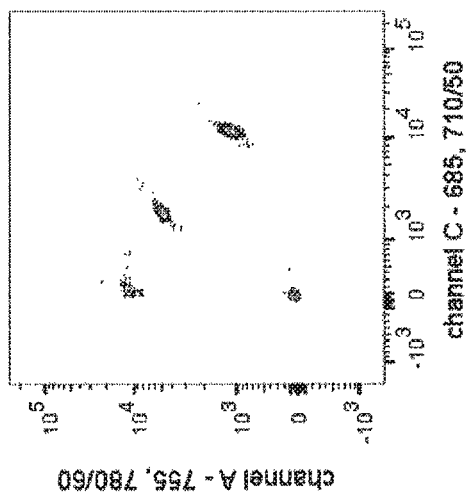
Figure 8:
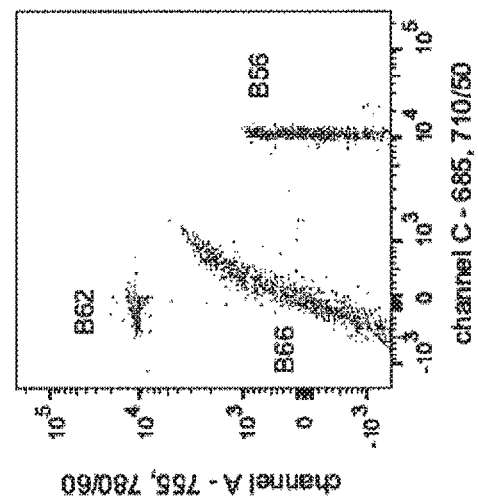
Figure 8:
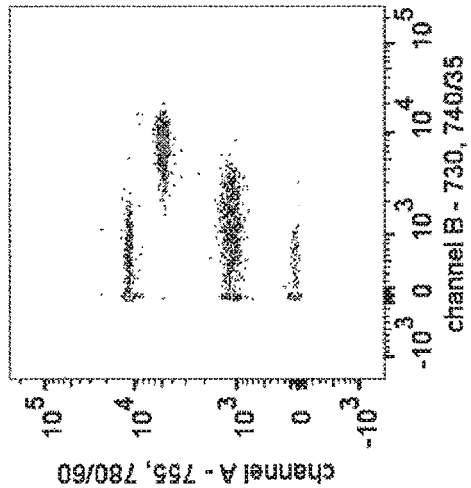
Figure 8:
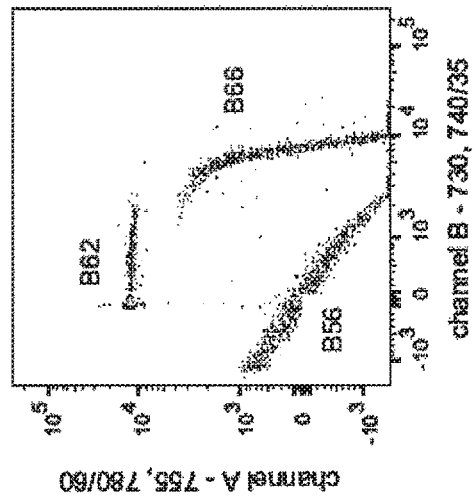

Blank beads were identified on the basis of forward and side light scatter. Gating was applied to exclude events with both lower and higher scatter than single beads and all further data was analyzed using this gating. For all experiments, 3000 gated events were collected. Following measurement of individual bacteriochlorin-doped beads, a compensation matrix was created (Table 4). Dot-plots of all three bacteriochlorins with each other are shown before and after application of compensation in FIG. 8. This data demonstrates that three narrow emission bacteriochlorins with peak emissions separated by only 60 nm can be readily separated and characterized by flow cytometry using conventional instrumentation, optics, and filter sets.

TABLE 4

Compensation Matrix for Analysis of Three Baacteriochlorin-doped PS Beads

| Channel | B62 Dye | B56 Dye | B66 Dye |
|---|---|---|---|
| C | 100 | 0.6613 | 0.1385 |
| A | 9.7537 | 100 | 8.9234 |
| B | 66.3141 | 22.871 | 100 |

Example 5

Staining of Magnetic Beads with Chlorins

Two types of beads were prepared: (1) Polystyrene (PS) Beads; mean size 5.43 μm Catalogue No. PS06N/6667, Bangs Laboratories); and (2) Polystyrene (PS) Magnetic Particles; mean size 5.21 μm (Catalogue No. PM-50-10, Lot AF01; Spherotech, Inc., Lake Forest, Illinois, United States of America). Both the dye-doped PS Beads and the PS Magnetic Particles were made by the general method described in EXAMPLE 1 with a maximum chlorin concentration in THF of 1.0 µg/mL. The PS beads were stained with chlorin SE197 and the magnetic PS beads were stained with chlorin SE357. The PS Magnetic Particles come as a stock of 2.5% w/v. To make the particle/bead concentrations equal during doping, 15.0 µL of PS Beads (10.2% w/v stock) and 60.0 µL PS Magnetic Particles (2.5% stock) were used separately in appropriate tubes.

Figure 9A:
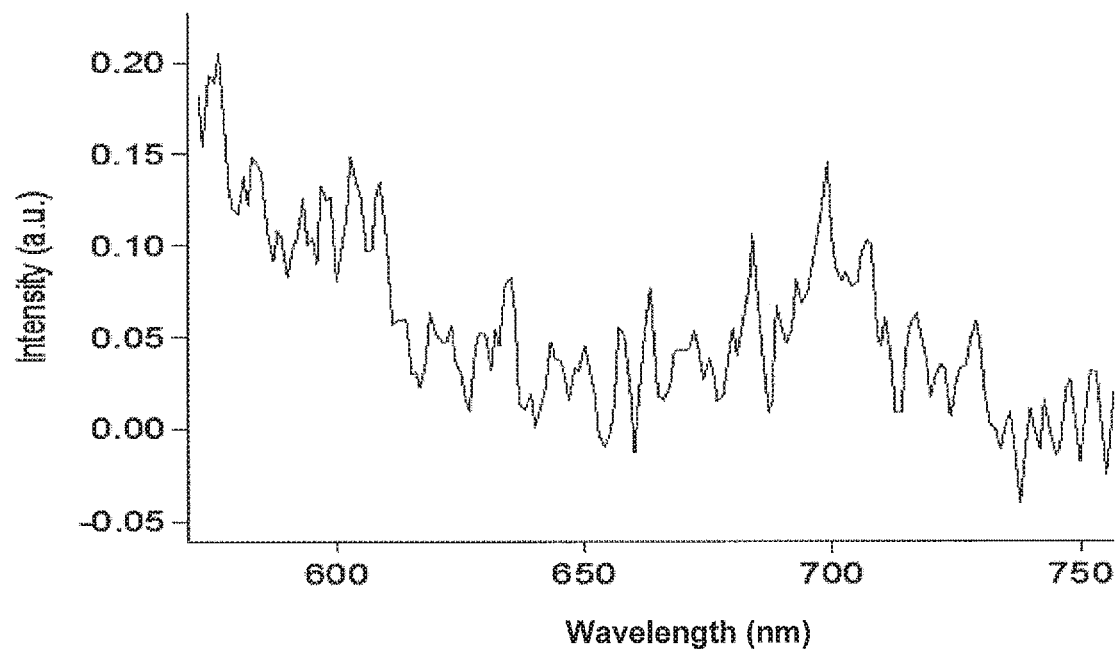
FIGS. 9A-9D are a series of plots of fluorescence of polystyrene (PS) and magnetic PS beads in suspension with excitation at 405 nm.
Figure 9B:
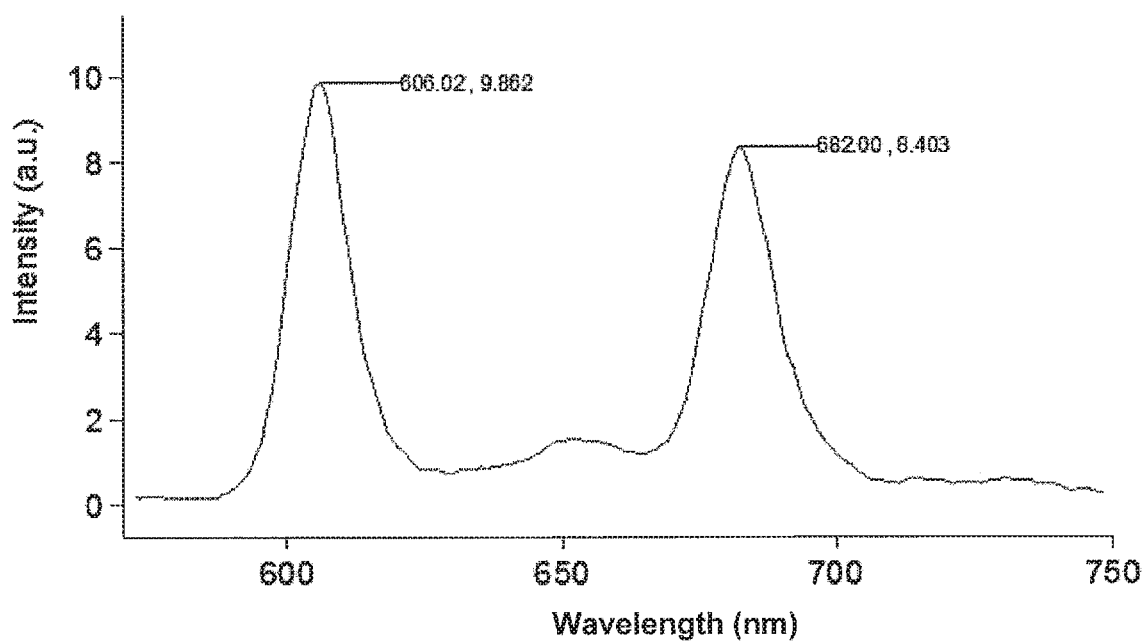
Figure 9C:
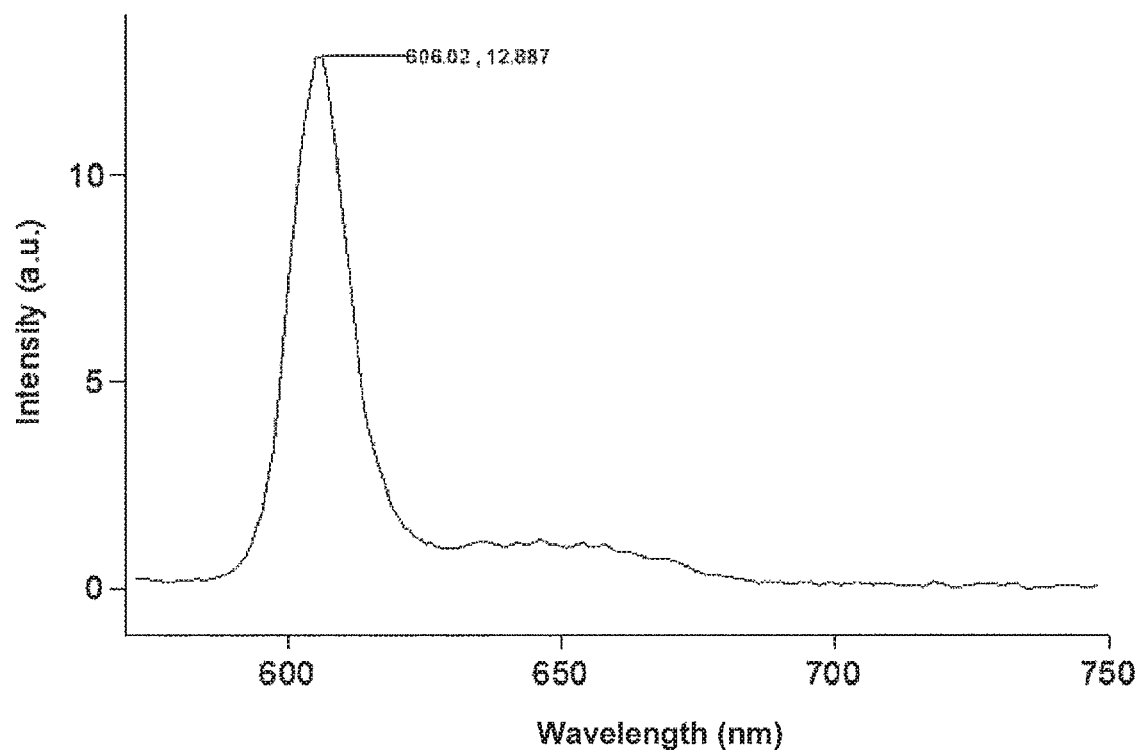
Figure 9D:
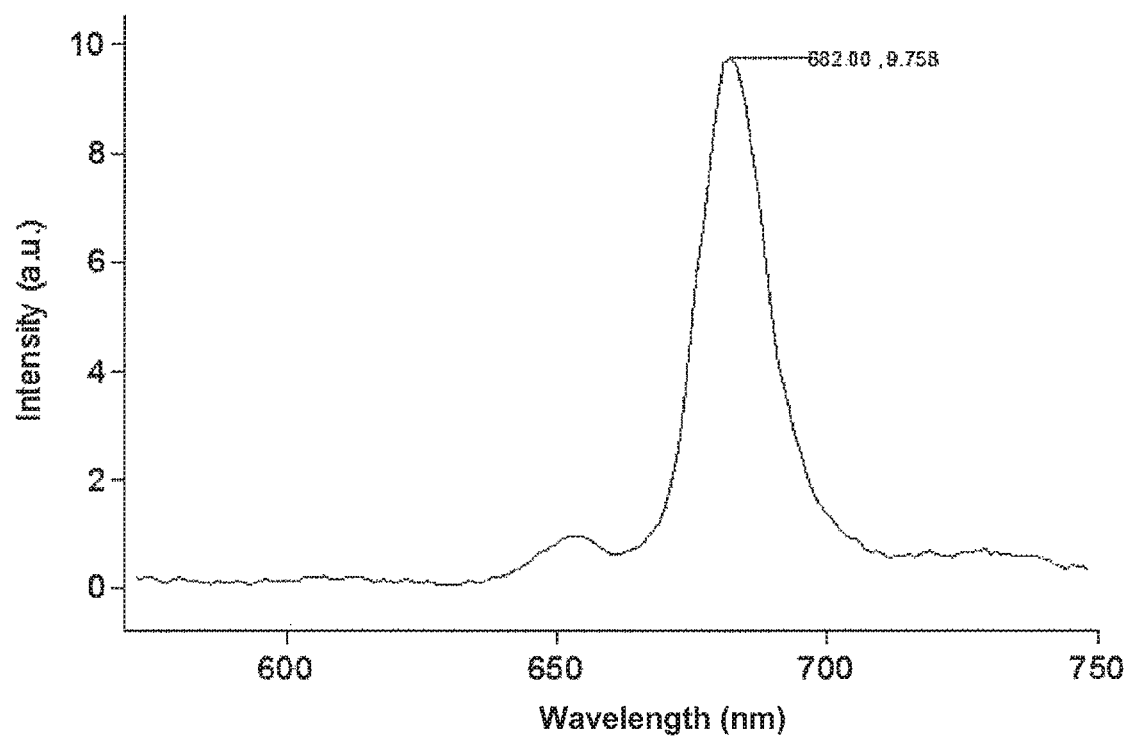

The following were added to a 1.7 mL microfuge tube: 60.0 µL 1×PBS containing 0.05% TWEEN® 20 brand polysorbate-type nonionic surfactant (Sigma-Aldrich, Inc.), 20.0 µL 1.0 µg/mL SE197-doped PS Beads, and 20.0 µL 5.0 µg/mL SE357-doped PS Magnetic Particles. Fluorescence of both unstained magnetic beads (FIG. 9A) and the mixture of chlorin-stained PS and magnetic were determined as a 1:15 dilution in water (FIG. 9B). The tube with the mixture was placed on a magnetic rack (DYNAMAG™ 2, Life Technologies Corp., now part of Thermo Fischer Scientific Corp., Waltham, Massachusetts, United States of America) for 3 minutes. The supernatant was removed using a 1000 µL pipette and tip and fluorescence was read as a 1:15 dilution in water (FIG. 9C). PBS (300 µL) containing 0.05% TWEEN® 20 brand polysorbate-type nonionic surfactant was added to the magnetic particles remaining in the tube on the magnetic rack, and the pellet was vortexed using "pulsed" method at ⅝ speed times five pulses. This was placed on the magnetic rack for 3 minutes. The vortex, magnetic rack, supernatant removal, and buffer addition steps were repeated. Thereafter, the pellet was resuspended with 80 µL of water and vortexed using the "pulsed" method at ⅝ speed with five pulses. The mixture was diluted 1:15 in water and the fluorescence was read (FIG. 9D). As can be seen in FIGS. 9B-9D, a clean separation of the two bead populations was obtained using a magnetic rack. This demonstrated that hydroporphyrins could be effectively used for bioassays requiring fluorescent magnetic beads.

Example 6

Figure 10:
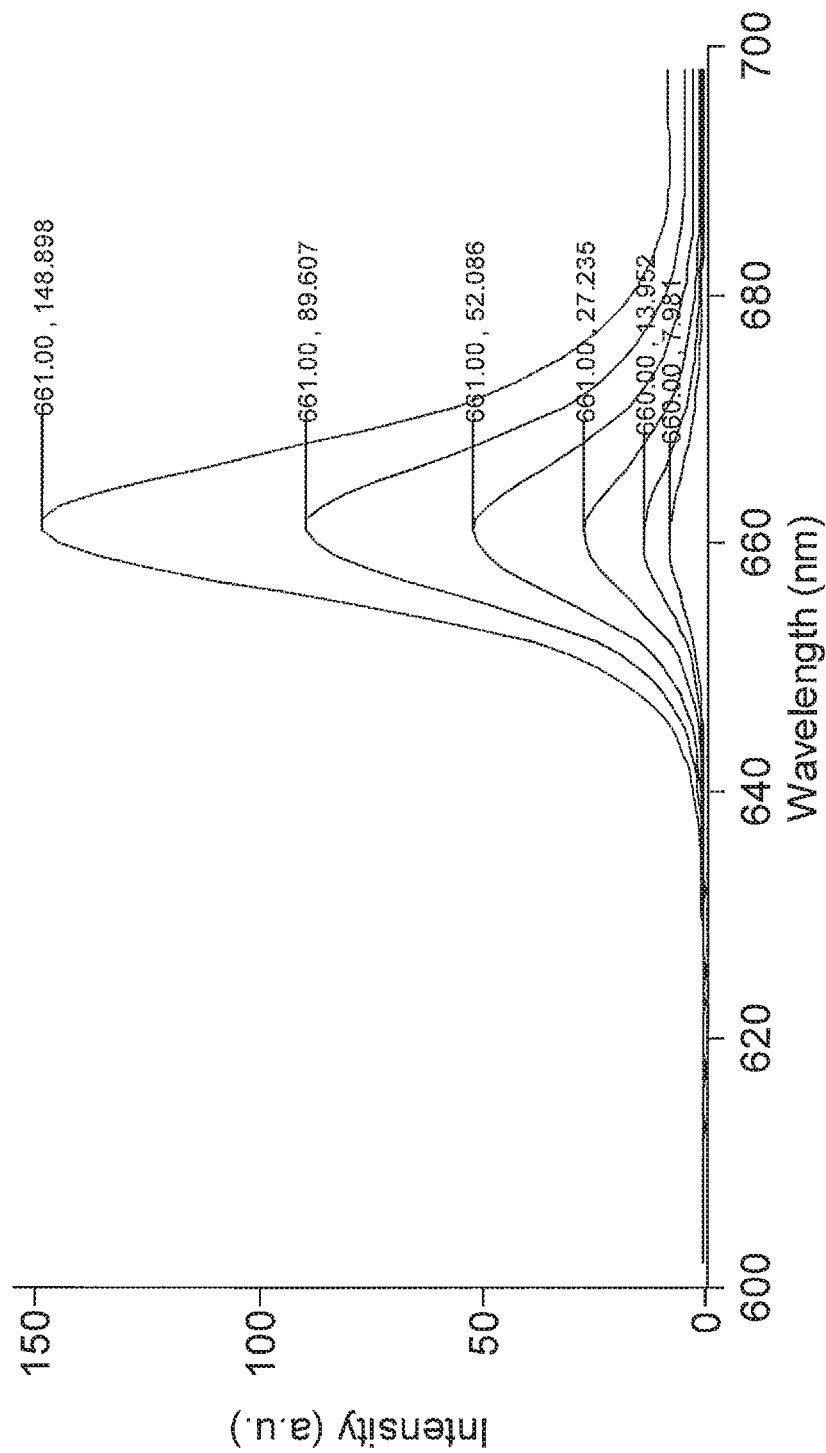
FIG. 10 is a series of plots showing fluorescence emissions of SE420 dye-doped 0.46 μm PS—COOH nanobeads at 1.0, 2.0, 4.0, 8.0, 16.0, and 32.0 μg/mL (lowest to highest peaks, respectively) with excitation at 405 nm.

Preparation of Sub-Micron Diameter Chlorin-Doped PS Particles 0.46 µm beads were prepared using chlorin SE420 and 0.46 µm PS—COOH beads (Carboxyl Polystyrene Particles; 0.46 µm; 5% (w/v); Catalogue No. CP-05-10/AH02; Spherotech) by the general method of EXAMPLE 1 with the following modifications. The reaction tubes were centrifuged at 9,000×g for 15 minutes, and water wash volumes were 600 µL rather than 300 µL. FIG. 10 shows the fluorescence emission of a series of 0.46 µm PS beads doped from solutions of 20, 40, and 80 µg/mL chlorin SE420 with excitation at 405 nm. The beads were diluted 75-fold into water from a 5% suspension.

Larger diameter polystyrene beads (e.g., 0.46 µm and 5.4 µm beads) could be readily treated and washed using centrifugation to separate beads from unbound reagents, solvents, and buffers. For doping and surface treatment of smaller particles, however, centrifugation was less effective and other separation methods such as tangential flow filtration (TFF) were required to separate modified particles from other components.

For preparing 0.11 µm and 0.046 µm diameter doped particles, a MICROKROS® brand TFF system and filters were used (Spectrum Laboratories, Rancho Dominguez, California, United States of America). For the 0.11 µm particles a 750 kiloDalton (kDa) hollow fiber filter was used (Catalog No. C02E750-10N, Spectrum Laboratories) and for the 0.046 µm particles a 300 kDa hollow fiber filter was used (Catalog No. C02E300-05N, Spectrum Laboratories). The fibers were equilibrated per the manufacturer's instructions with NCCLS water containing 0.1% (v/v) TWEEN® 20 brand polysorbate-type nonionic surfactant using 5.0 mL syringes with three (3) separate cycles for a total of 15 mL.

Chlorin doping of 0.11 µm Particles was as follows. In a 5 mL polypropylene tube, 462 µL NCCLS water, 231 µL 2.0% (v/v) PLURONIC® F127 brand non-ionic detergent, 50 µL 0.11 µm PS—COOH 10% Beads (Catalog No. PC02N/12634, Bangs Laboratories, resuspended well before use), 379 µL SE420 Chlorin dye in THF (90.0 µg/mL). The chlorin SE420 in THF solution was added drop-wise while vortexing the contents of the polypropylene tube for a final concentration approximating 33% THF. This was incubated at room temperature 15 minutes and mixed on a rotary mixer at 70-80 RPM protected from light.

Figure 11:
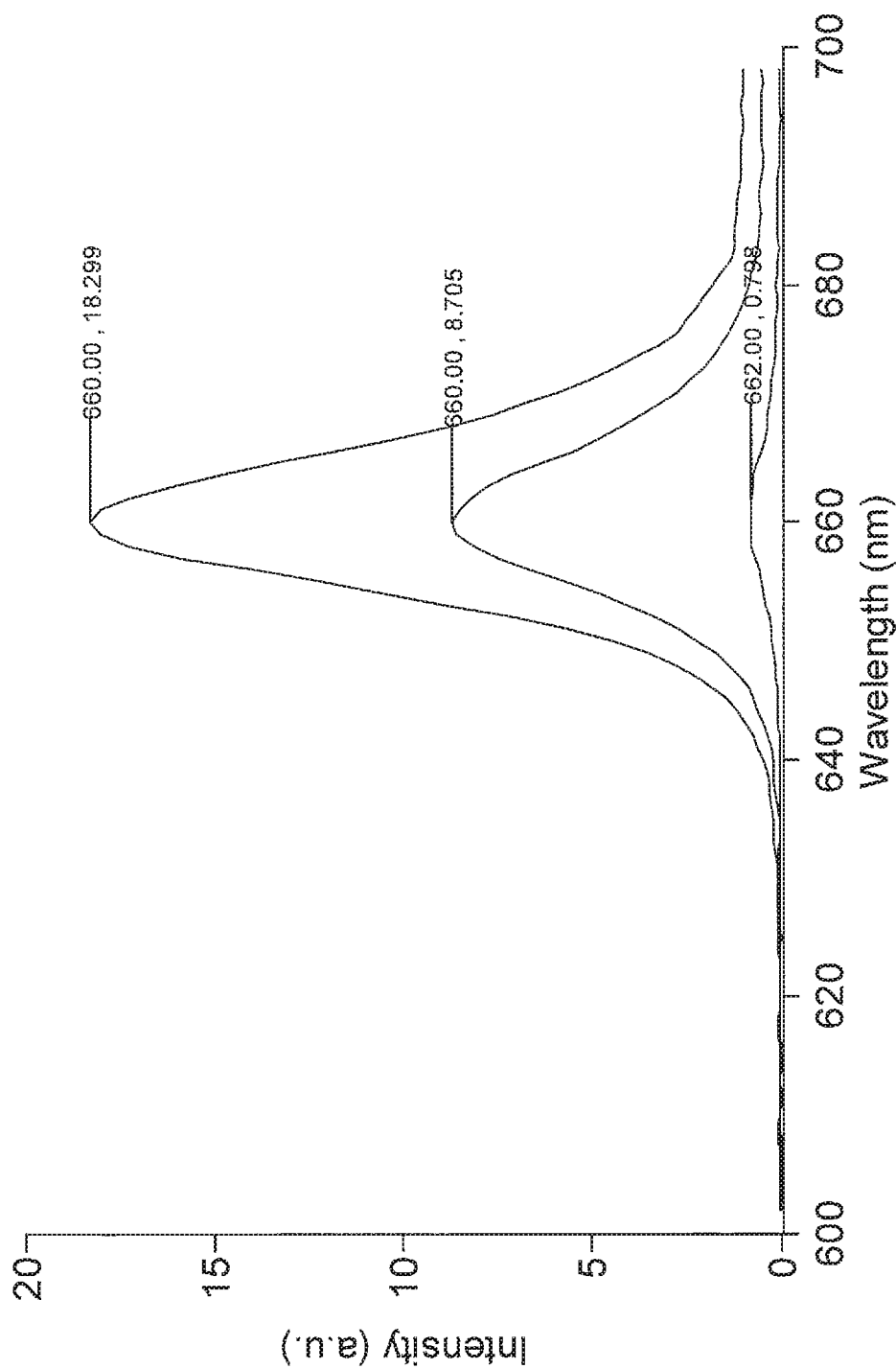
FIG. 11 is a series of plots showing fluorescence emissions of a suspension of SE420 dye-doped 0.11 μm PS nanobeads at 5.0, 45.0, and 90.0 μg/mL dye (lowest to highest peaks, respectively). Excitation was at 405 nm.

The reaction cocktail was diluted into 44.88 mL water containing 0.1% (v/v) TWEEN® 20 brand polysorbate-type nonionic surfactant as to dilute the THF to 0.74% (less than 1% as to minimize any solvent impact on the Hollow Fiber Filter). The 750 kDa Hollow Fiber Filter was conditioned with NCCLS water containing 0.1% (v/v) TWEEN® 20 brand polysorbate-type nonionic surfactant using 5 mL syringes with three (3) separate cycles for a total of 15 mL. Unreacted dye and other reactants were removed from the doped particles using a 5 mL syringe to control flow through the check valve. This was continued until it was reduced to 100 µL (retentate). The retentate was washed four times with 5.0 mL water containing 0.1% (v/v) TWEEN® 20 brand polysorbate-type nonionic surfactant until a total of 20.0 mL had been cycled through the 100 µL retentate. A further 500 µL of water containing 0.1% (v/v) TWEEN® 20 brand polysorbate-type nonionic surfactant was added to the filtrate syringe and the washed 100 µL retentate was harvested using a negative pressure back flush via the most distal retentate syringe. This was repeated to yield approximately 3.0 mL of final doped particles (0.166% particles (w/v) at $2.54 \times 10^{12}$ particles/mL). This sample was diluted 1:75 in NCCLS water for fluorescence analysis (see FIG. 11).

Chlorin doping of 0.042 µm Particles was accomplished by combining the following in a 1.7 mL polypropylene tube: 280 µL NCCLS water, 140 µL 2.0% (v/v) PLURONIC® F127 brand non-ionic detergent, 30 µL 0.042 µm PS 10% particles (Catalog No. CXCPS02N/10602, Bangs Laboratories, resuspended well before use), plus 230 µL SE420 Chlorin dye in THF (80, 40, and 20 µg/mL). The chlorin SE420 in THF solution was added drop-wise while vortexing the contents of the polypropylene tube for a final concentration approximating 33% THF. This was incubated at room temperature 15 minutes and mixed on a rotary mixer at 70-80 RPM protected from light.

Figure 12:
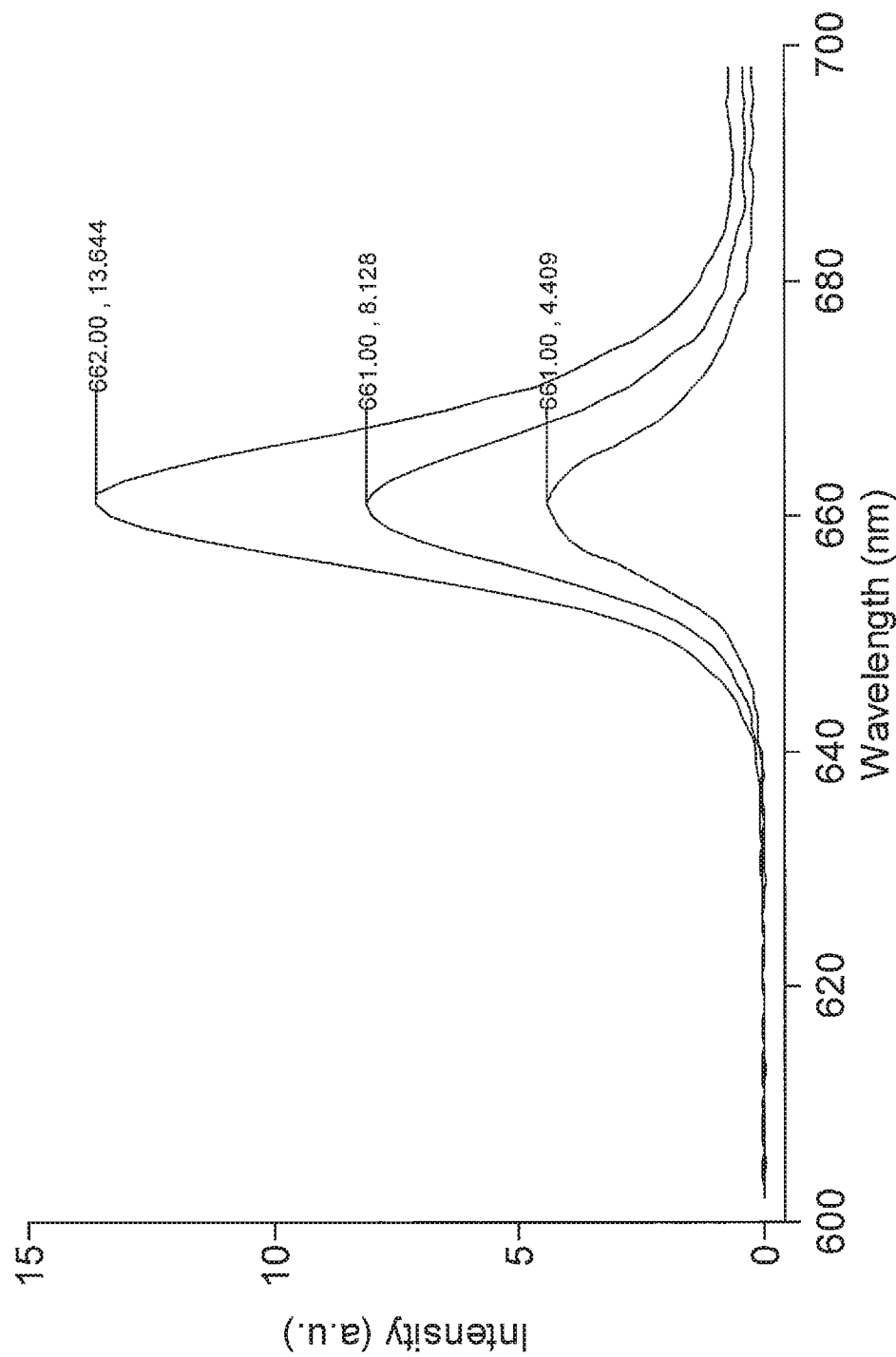
FIG. 12 is a series of plots showing fluorescence emissions of suspensions of chlorin SE420 dye-doped 0.042 μm polystyrene particles at 20 μg, 40 μg, and 80 μg/mL dye (lowest to highest peaks, respectively). 0.43% w/v final product ($1.07 \times 10^{14}$ particles/mL). Samples were diluted 250-fold. Excitation was at 405 nm.

The reaction cocktail was diluted into 34 mL water containing 0.1% (v/v) TWEEN® 20 brand polysorbate-type nonionic surfactant to dilute the THF to 0.74% (less than 1% as to minimize any solvent impact on the Hollow Fiber Filter). The 300 kDa Hollow Fiber Filter was conditioned with NCCLS water containing 0.1% (v/v) TWEEN® 20 brand polysorbate-type nonionic surfactant using 5 mL syringes with 3 separate cycles for a total of 15 mL. Unreacted dye and other reactants were removed from the doped particles using a 5 mL syringe to control flow through the check valve. This was continued until it was reduced to 100 µL (retentate). The retentate was washed four times with 5.0 mL water containing 0.1% (v/v) TWEEN® 20 brand polysorbate-type nonionic surfactant until a total of 20.0 mL had been cycled through the 100 μL retentate. A further 250 μL of water containing 0.1% (v/v) TWEEN® 20 brand polysorbate-type nonionic surfactant was added to the filtrate syringe and the washed 100 μL retentate was harvested using a negative pressure back flush via the most distal retentate syringe. This was repeated to yield approximately 1.0 mL of final doped particles. This sample was diluted 1:75 in NCCLS water for fluorescence analysis (see FIG. 12).

Example 7

Chlorin-Doped 0.11 μm Diameter PS Particles Passively Coated with Mouse Anti-Human CD8 and Mouse Anti-Human CD3 IgG Antibodies The chlorin-doped 0.11 μm diameter PS beads prepared described in EXAMPLE 6 were employed for tagging a human anti-CD8 antibody. The 750 kDa Hollow Fiber Filter was equilibrated per the manufacturer's instructions with PBS containing 0.0008% (v/v) TWEEN® 20 brand polysorbate-type nonionic surfactant using 5 mL syringes with three (3) separate cycles for a total of 15 mL. The buffer exchange into PBS containing 0.0008% (v/v) TWEEN® 20 brand polysorbate-type nonionic surfactant was begun using the freshly prepared 90.0 μg/mL SE420 dye doped 0.11 μm PS—COOH beads.

Using a new fresh 5.0 mL syringe and injecting through the check valve port, buffer was exchanged with PBS containing 0.0008% (v/v) TWEEN® 20 brand polysorbate-type nonionic surfactant for four (4) cycles until a total of 20.0 mL had been cycled through the 100 μL retentate. 500 μL of PBS containing 0.0008% (v/v) TWEEN® 20 brand polysorbate-type nonionic surfactant was added using the filtrate syringe and the washed 100 μL retentate was harvested using a negative pressure back flush via the most distal retentate syringe. This wash step was repeated twice to yield approximately 5 mL of the doped particles (0.1% particles (w/v) at $1.53 \times 10^{12}$ particles/mL).

The 5 mL of doped particles was divided equally into four separate 1.7 mL microfuge tubes. (1.25 mL per tube). To the tubes was added solutions of clone UCHT-4 mouse anti-human anti-CD8 IgG (Catalog No. C366, 9.4 mg/mL; Leinco Technologies, Inc., St. Louis, Missouri, United States of America) in the following amounts: 0.0, 28.6, 143, and 715 μg of UCHT-4; representing 0.0×, 0.2×, 1.0×, and 5.0× theoretical monolayer amounts of IgG. The tubes were rocked at 70-80 RPM at room temperature, protected from light for 4 hours, then left at 4° C. for 16-18 hours. The reactants of each tube were blocked by the addition of 125 μL of 10% bovine serum albumin (BSA) solution (final concentration of BSA 1.0%) and rocked again at 70-80 RPM at room temperature, protected from light for 1 hour. The contents of the tubes were purified using the hollow fiber method as described above, however the fiber was equilibrated with, and the samples were washed with, PBS containing 1.0% BSA and 0.05% sodium azide. The final volumes of each sample were approximately 1.0 mL.

For preparing mouse anti-human-CD3 coated nanoparticles, the same procedure was used as for CD8, but substituting mouse anti-human-CD3 IgG (clone UCHT-1, Leinco) at the same coating concentrations and amounts 0.0, 28.6, 143, and 715 μg.

Figures 13A, 13B:
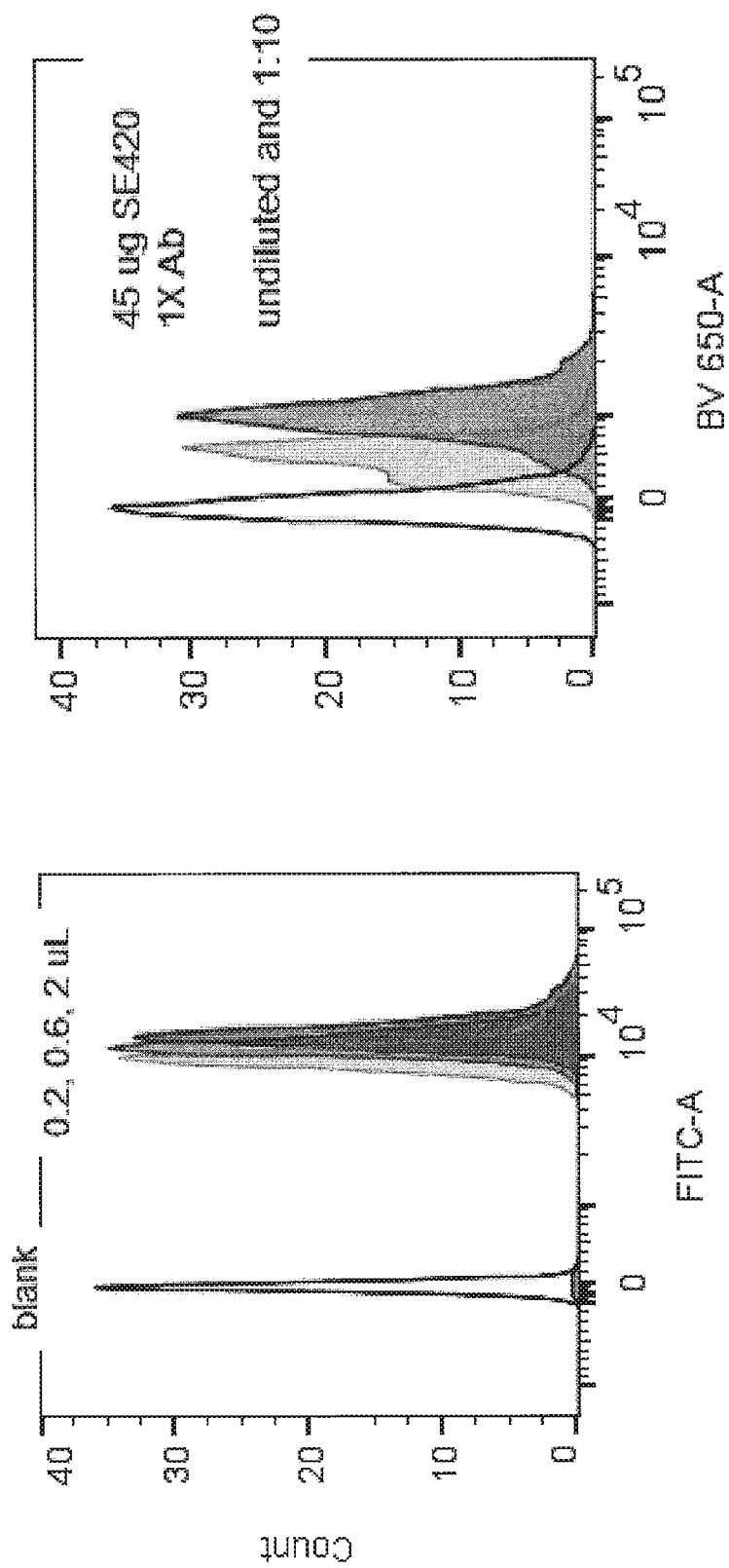
FIGS. 13A and 13B are flow cytometry histograms of goat anti-mouse IgG capture beads unbound (left most peak in each of FIGS. 13A and 13B), and bound to 0.2, 0.6, and 2.0 μL of FITC-labeled anti-CD3 antibody (FIG. 13A) of chlorin SE420-doped nanoparticles passively coated with 1× anti-CD3 at 1:1 and 1:10 dilutions (FIG. 13B).

FIG. 13B shows binding of three different dilutions (0, 1:10, and 1:1) of the 1.0× monolayer anti-CD3 IgG-coated SE420 0.11 μm diameter nanoparticles to anti-mouse IgG capture beads (Bangs Laboratories, Inc.) compared to a commercial FITC-labeled IgG of the same antibody clone (FIG. 13A; Bangs Quantum Simply Cellular Microspheres, product no. 814). The flow cytometer was set up as described in EXAMPLE 2 for flow cytometry of SE420-doped beads.

Example 8

Chlorin-Doped 0.11 μm Diameter Ps Particles Passively Coated with Protein G and Anti-CD3 IgG Antibody The SE420 chlorin-doped particles (45 μg/mL) from EXAMPLE 6 were used in this EXAMPLE. However, instead of passive coating first with IgG, the chlorin-doped particles (approximately 1.0 mL of 0.25% v/v in PBS containing 0.0008% (v/v) TWEEN® 20 brand polysorbate-type nonionic surfactant) were added to a tube containing 500 μg of Protein G solution (0.05 mL of a 10 mg/mL solution in PBS with 0.05% azide; rec-Protein G, Life Technologies Cat. No. 003005). The tube was rocked at 70-80 RPM at room temperature, protected from light for 4 hours then left at 4° C. for 16-18 hours. The coated particles were blocked by the addition of 125 μL of 10% BSA solution (1.0% BSA final) and rocked again at 70-80 RPM at room temperature, protected from light for 1 hour. The contents were washed using the hollow fiber method to yield approximately 1.0 mL.

A 50 μL aliquot of the Protein G coated chlorin-doped 0.11 μm diameter polystyrene particles passively coated first were incubated with Protein G and then 0.024 μg of anti-CD3 IgG antibody. These were analyzed (clone UCHT-1, Leinco), incubated 30 minutes at room temperature, and then washed 2× with 1 mL PBS with 0.5% BSA. FIG. 14 show their analysis by flow cytometry similar to the method described in the preceding EXAMPLE. By using immobilized Protein G to orient the antibody through the Fc portion an effective particle coating was obtained.

Example 9

Particles Doped with More than One Hydroporphyrin to Create an Array

Figure 15:
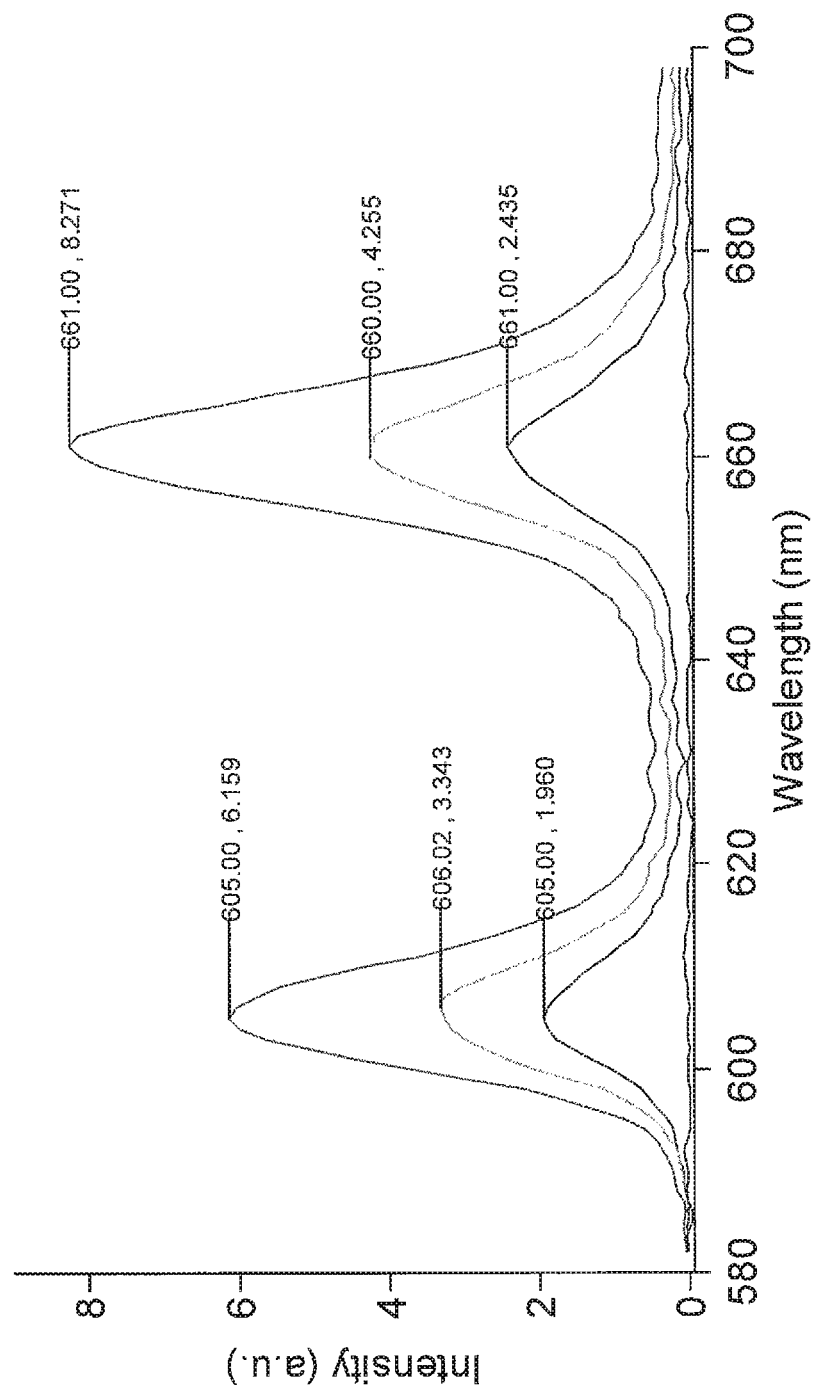
FIG. 15 is a series of plots showing fluorescence emissions of 5.43 μm particles co-doped with chlorins SE197 (left three peaks) and SE420 (right three peaks) at 0.25. 0.5, and 1.0 μg/mL (lowest to highest peaks in each set, respectively). Excitation was at 405 nm.

Using the general method of EXAMPLE 1, chlorins SE197 and SE420 were prepared in 0, 0.25, 0.5, and 1.0 μg/mL concentrations individually and in combination with each other for doping of 5.43 μm PS beads. FIG. 15 shows fluorescence of suspensions of the particles doped with 0.25, 0.5, and 1.0 μg/mL concentrations of each dye using 405 nm excitation. These displayed two distinct sharp and narrow fluorescence emission peaks for each chlorin.

Figure 16A:
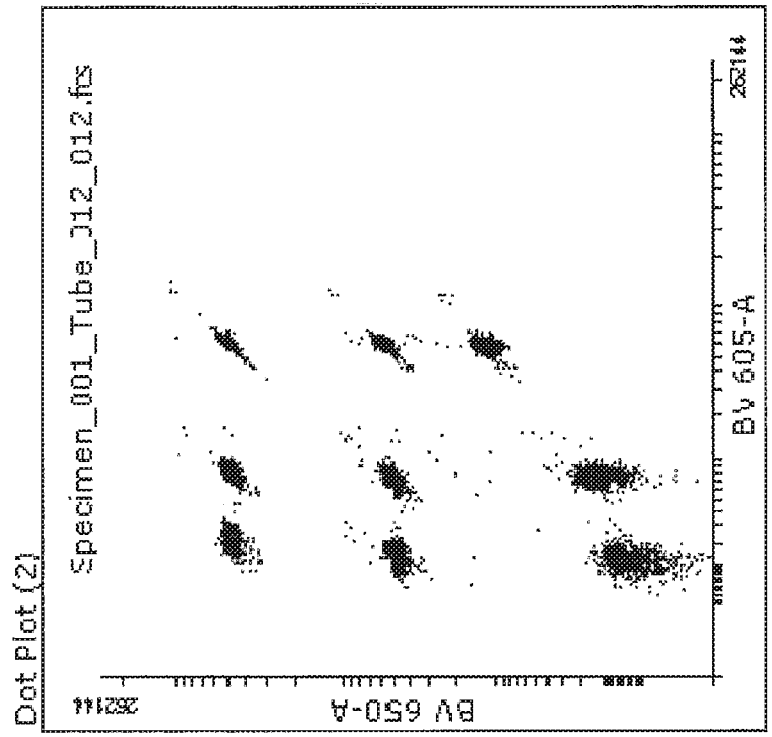
FIGS. 16A and 16B are FACS scatter plots of a mixture of multiple beads with different doping levels of two chlorins.
Figure 16B:
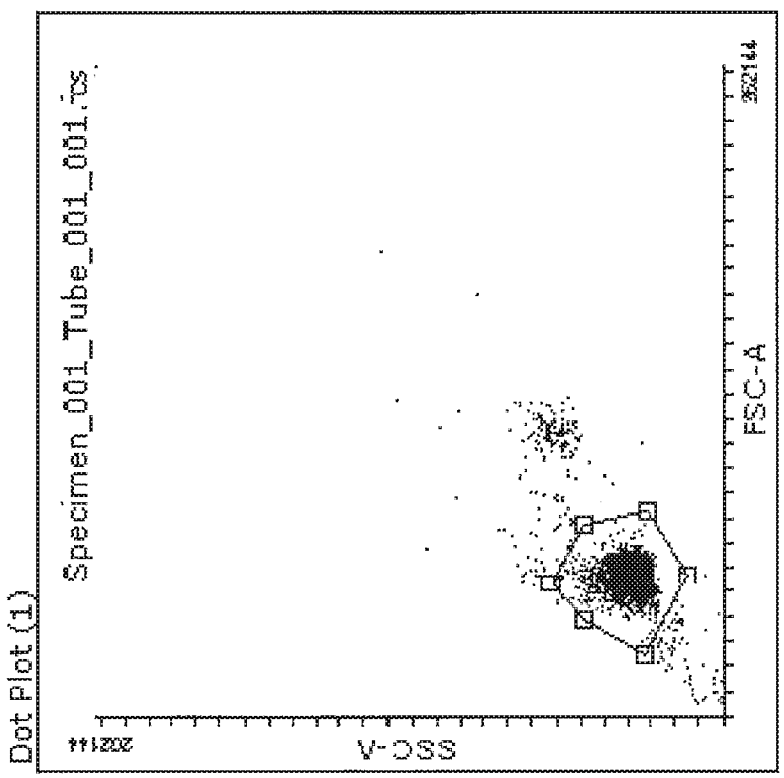

FIG. 16 shows flow cytometry of a mixture of beads possessing nine combinations of SE197 and SE420 (SE197/SE420: 0/0, 0/0.025, 0/0.25, 0.025/0, 0.25/0, 0.025/0.025, 0.025/0.25, 0.25/0.025, 0.25/0.25 μg/mL). The separation of the different populations was well defined and required minimal compensation and indicated that these or similarly prepared beads could be used for bar-coding different populations of cells in addressable arrays.

Example 10

Figure 17:
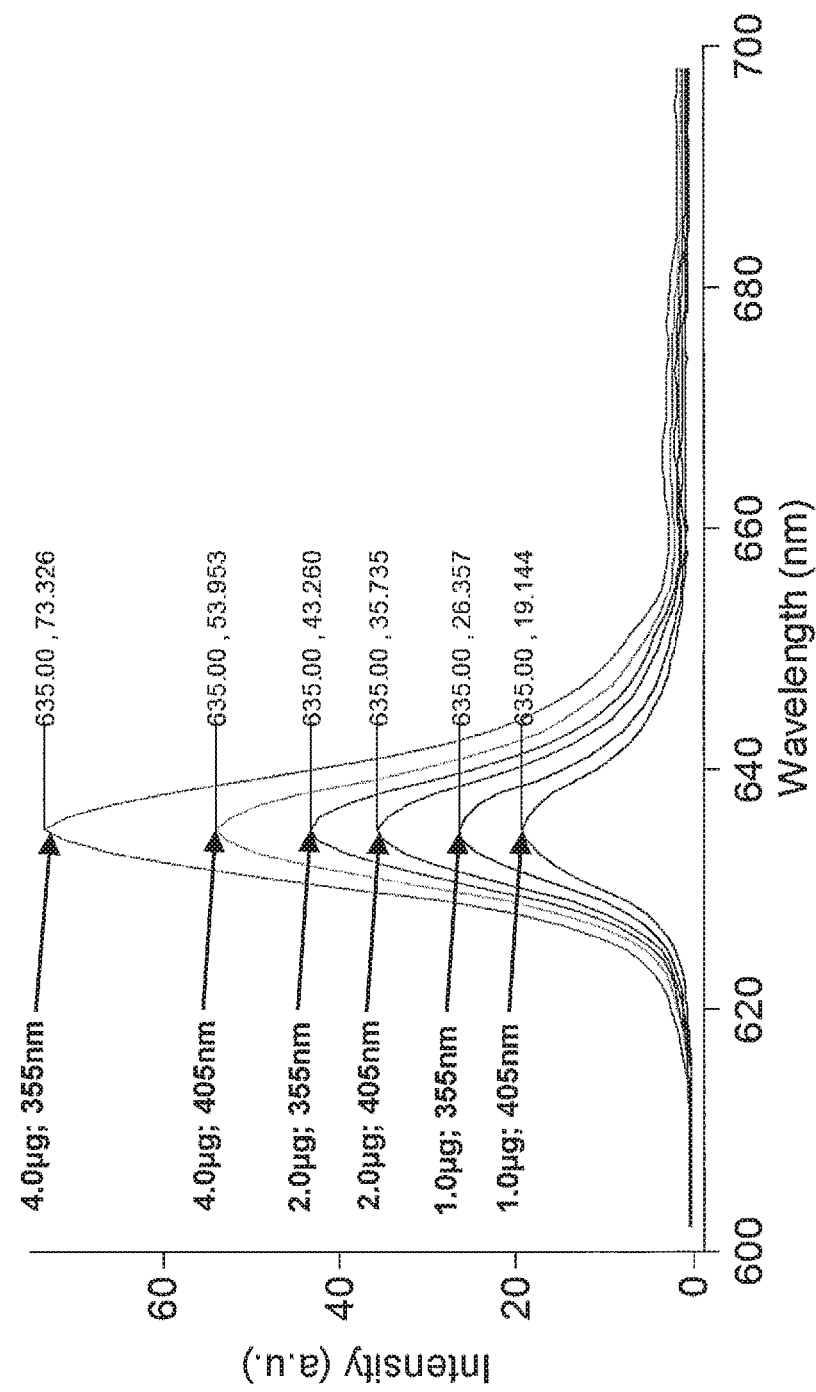
FIG. 17 is a series of fluorescence emissions of a suspension of polystyrene beads doped with a chlorin (SE211) and a fluorescence energy transfer donor (ADS036FO). Excitation was at 355 or 405 nm as indicated. "1.0 μg", "2.0 μg", and "4.0 μg" refer to the amount of chlorin SE211 tested.
Figure 18:
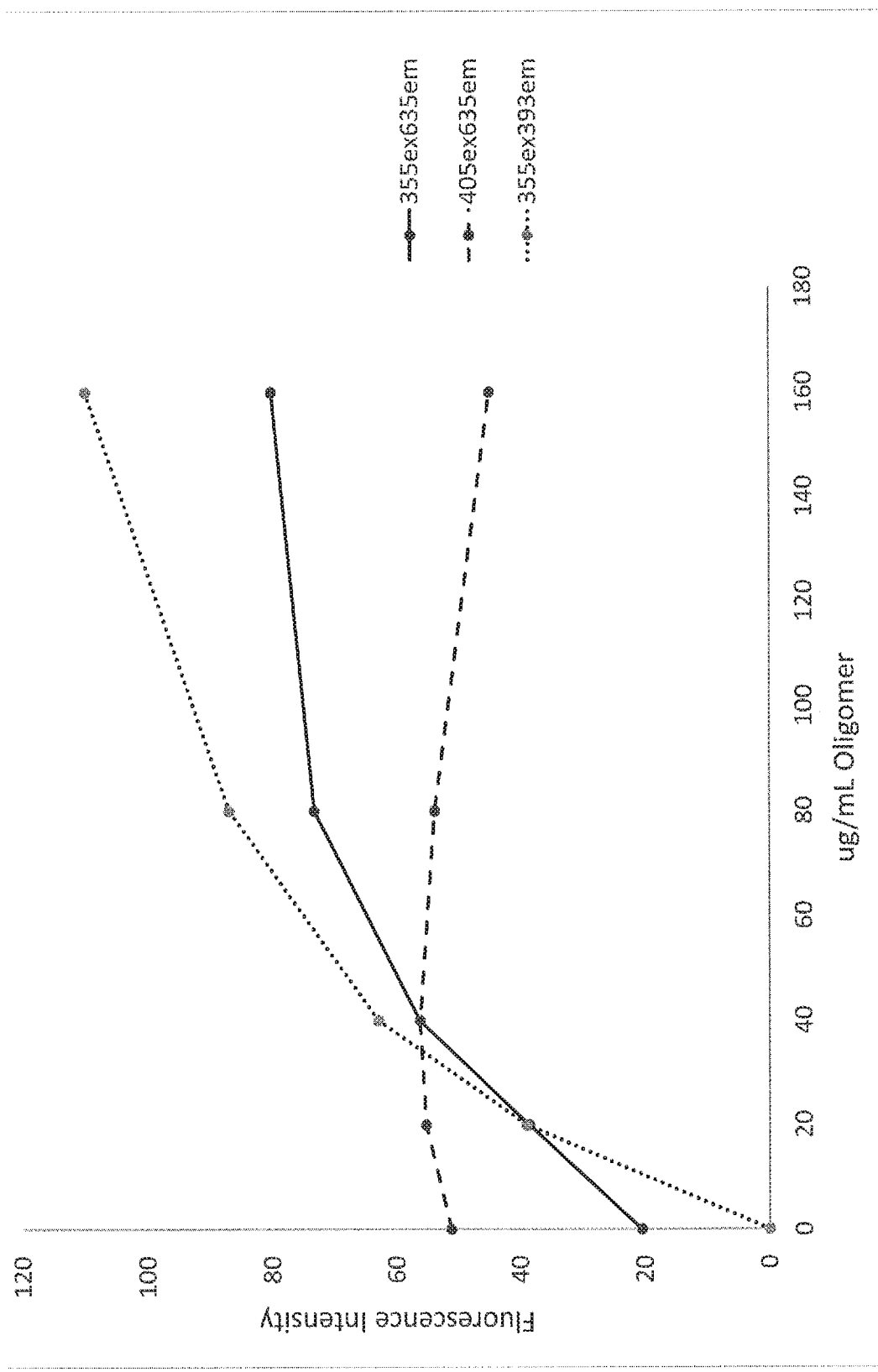
FIG. 18 is several plots of fluorescence emissions of polystyrene beads doped with a chlorin (SE211, 4 μg/mL) and a fluorescence energy transfer donor at varying concentrations, 355ex393em (dotted line) refers to excitation at 355 nm and emission at 393 nm, which corresponds to the excitation and emission of the donor alone. 355ex635em (solid line) refers to excitation of the donor and emission of the chlorin, showing the effect of the FRET donor/acceptor pair. 405ex635em (dashed line) refers to excitation of the chlorin and emission of the chlorin, showing the effect of the chlorin alone.

Preparation of Hydroporphyrin-Doped Beads Enhanced with a Fluorescence Energy Transfer Donor and a Hydroporphyrin Energy Transfer Acceptor Using the general methods of EXAMPLE 1, chlorin SE211 and the UV absorbing fluorene oligomer ADS036FO (American Dye Source, Inc, Quebec, Canada) were incorporated into 5.43 µm PS beads. SE211 was prepared in 1.0, 2.0, and 4.0 µg/mL concentrations with either 0, 40, 80, or 160 µg/mL concentrations of ADS036FO in THF. FIG. 17 shows the fluorescence emission of bead suspensions excited at either 355 nm or 405 nm. FIG. 18 shows the fluorescence intensity of 4.0 µg/mL SE211 with varying amounts of the oligomer. With 80 and 160 µg/mL of the oligomer present, the emission of the chlorin was increased between 3- and 4-fold with 355 nm excitation versus SE211 alone. This indicated that energy transfer from the oligomer to the chlorin occurred.

Example 11

Particles Doped with a Hydroporphyrin Dyad

A perylene-chlorin dyad, C-PMI13 (see Hu et al., 2016), was incorporated in 5.43 µm PS particles by the method described in EXAMPLE 1 using a 20 µg/mL solution of the dyad in THF. FIG. 19 shows the structure of the dyad. Fluorescence emission of the suspension of dyad-doped beads excited at different excitation wavelengths is shown in FIG. 20. The excitation wavelengths of 355, 405, 488, 532, 561, and 640 nm correspond to common lasers and/or laser diodes used for multi-laser flow cytometers such as the BD LSRFORTESSA™ (BD Biosciences, San Jose, CA). The dyad-doped beads displayed fluorescence emission at 678-679 nm with all excitation wavelengths demonstrating their potential for use as calibration beads for multi-laser instruments.

Discussion of the Examples

Hydroporphyrins are a class of compounds related to the porphyrins but with one or more reduced bonds within the core tetrapyrrole ring system (see e.g., Scheer et al., 1978). Naturally occurring, biologically active hydroporphyrins include chlorophyll and bacteriochlorophyll. Chlorins and bacteriochlorins are structurally related to chlorophyll and bacteriochlorophyll, differing from chlorophyll and bacteriochlorophyll by the presence of one and two reduced bonds, respectively. Compared to porphyrins, which often feature two fluorescence emission peaks, hydroporphyrins typically have a single sharp emission band in the red to near infrared (NIR) spectral regions, and in most cases, have much greater fluorescence emission intensities than porphyrins.

Disclosed herein are methods for incorporating hydroporphyrin dyes into beads that provide photostable beads useful for flow cytometry and other diagnostics assays. The methods provide dye-loaded beads with no apparent internal dye aggregation to provide signal linear with dye concentration over a greater than 2 log concentration range. The dye-loaded beads maintain the same large Stokes shifts and sharp narrow fluorescence emission spectra as displayed by the hydroporphyrins when characterized in organic solvents. It is believed that such dyes have not been incorporated into polymer beads before, perhaps due to their limited accessibility. With the robust synthesis methods disclosed herein, multiple dyes can be prepared possessing adjacent emission peaks. Also demonstrated herein is that emission signals from five chlorin-loaded polystyrene beads can be detected simultaneously in five channels within a 150 nm window with a modern flow cytometer using a common violet (405 nm) laser for excitation.

These hydroporphyrin beads have potential uses as calibration standards for instrument set-up and for determining "compensation" or mathematical correction values for overlapping fluorophores used in flow cytometry. They also have value in applications where the large effective Stokes shift minimizes background from scatter or bead autofluorescence which often is greater close to the excitation wavelength. In addition, using multiple levels of dye loading and/or two or more hydroporphyrins within beads facilitates employing the presently disclosed compositions as a platform for multiplex assay detection in flow cytometers.

Unexpectedly, it was determined that tetrahydrofuran (THF) solutions of the hydroporphyrins provide a quick and efficient vehicle for diffusion of the dyes into polystyrene (PS) beads. Gradual increases of water to THF in the bead suspension traps the hydroporphyrins in the beads. After washes to remove traces of THF, the beads were examined by phase contrast microscopy and found to have equivalent diameters and minimal aggregation comparable to unmodified PS beads. Suspensions of the hydroporphyrin-stained PS beads in aqueous buffer showed fluorescence properties (e.g., sharp emission bands) for the suspensions that were nearly superimposable over the spectra of the same hydroporphyrins dissolved in THF. Attempts to use other methods for incorporating hydroporphyrins in PS beads gave variable or inferior results. For example, the use of chloroform and isopropanol for diffusion of hydroporphyrins into beads by the gradual solvent evaporation method (see Zhang et al., 2009) led to significant bead degradation. The method described herein is also faster and more efficient, with fewer steps than methods described for preparing multiply dyes beads for multiplex assay use (see U.S. Pat. No. 6,632,536 to Chandler et al.).

In flow cytometry experiments, the beads demonstrated retention of the sharp emission bands and signal from a mixture of beads stained separately, with five chlorins being readily distinguished from each other using appropriate emission filters and a common violet (405 nm) laser excitation over the emission wavelength range from 590 nm to 750 nm.

Representative advantages of the presently disclosed subject matter include but are not limited to the following. Conventional dyes have to date been used for most calibration standards and multiplex bead arrays (e.g., rhodamines, squaraines, carbocyanines, etc.). Such dyes typically have broad emission profiles (swhm of 40-50 nm or greater). In accordance with the presently disclosed subject matter, the presently disclosed porphyrinic macrocycles have sharp narrow emission peaks: typically 15-20 nm for chlorins and 20-25 nm for bacteriochlorins. Used together, two or more of these dyes create much higher levels of multiplexing from a single excitation source than is possible with conventional dyes. For example from 590 nm to 740 nm, five chlorins can be detected with minimal spectral overlap between them. Only three conventional dyes are separable within this range at a greater level of spectral overlap than the five chlorins. Another advantage of porphyrinic macrocycles over conventional dyes is the large effective Stokes shift (difference between excitation and emission wavelengths). Conventional dyes rarely have a Stokes shift greater than 20-30 nm. Chlorins, on the other hand can be excited at 405 nm with emissions between 590 nm and 750 nm, giving an effective Stokes shift of 185 nm to 350 nm or more. This reduces background from other bead or particle non-dye components such as polystyrene, which provides cleaner and more reliable negative fluorescence control signals and more accurate positive signals.

REFERENCES

All references listed in the instant disclosure, including but not limited to all patents, patent applications and publications thereof, scientific journal articles, and database entries are incorporated herein by reference in their entireties to the extent that they supplement, explain, provide a background for, and/or teach methodology, techniques, and/or compositions employed herein. The discussion of the references is intended merely to summarize the assertions made by their authors. No admission is made that any reference (or a portion of any reference) is relevant prior art. Applicants reserve the right to challenge the accuracy and pertinence of any cited reference.

Centers for Disease Control and Prevention (CDC) (1982) Update on acquired immune deficiency syndrome (AIDS)—United States. *MMWR Morb Mortal Wkly Rep* 31:507-508, 513-504.

Chattopadhyay & Roederer (2010) Good cell, bad cell: flow cytometry reveals T-cell subsets important in HIV disease, *Cytometry A* 77:614-622.

Chattopadhyay et al. (2015) The Tenets of Helper T-Cell Classification: Checked and Challenged with 30-Parameter Flow Cytometry. 30*th Congress of the Intl. Soc. Adv. Cytometry*, Abstract 114.

Craig & Foon (2008) Flow cytometric immunophenotyping for hematologic neoplasms. *Blood* 111:3941-3967.

Hu et al. (2016) Panchromatic chromophore-tetrapyrrole light-harvesting arrays constructed from Bodipy, perylene, terrylene, porphyrin, chlorin, and bacteriochlorin building blocks. *New J Chem* 40:8032-8052.

Lakowicz (1999) *Principles of Fluorescence Spectroscopy*. Kluwer, New York, New York, United States of America.

Lindsey (2015) De Novo Synthesis of Gem-Dialkyl Chlorophyll Analogues for Probing and Emulating our Green World. *Chem Rev* 115:6534-6620.

Muthiah et al. (2008) Synthesis and Excited-state Photodynamics of a Chlorin-Bacteriochlorin Dyad—Through-space Versus Through-bond Energy Transfer in Tetrapyrrole Arrays. *Photochem Photobiol* 84: 786-801.

Paul (1993) *Fundamental Immunology*, Raven Press, New York, New York, United States of America.

PCT International Patent Application Publication No. WO 1992/22653.

Perfetto et all (2006) Quality assurance for polychromatic flow cytometry. *Nature Protocols* 1522-1530.

Peters & Ansari (2011) Multiparameter flow cytometry in the diagnosis and management of acute leukemia. *Arch Pathol Lab Med* 135:44-54.

Rees et al. (2014) Nanoparticle vesicle encoding for imaging and tracking cell populations. *Nature Methods* 11:1177-1181.

Scheer et al. (1978) Chapter 2 in *The Porphyrins, Volume II*. Dolphin (ed.), Academic Press, New York, New York, United States of America.

Taniguchi et al. (2008) Accessing the near-infrared spectral region with stable, synthetic, wavelength-tunable bacteriochlorins. *New J Chem* 32:947-958.

U.S. Pat. Nos. 6,420,648; 6559,374; 6,632,536; 6,946,533; 7,332,599; 7,408,058; 7,423,160; 7,470,785; 7,501,508; 7,518,905; 7,534,807; 7,553,977; 7,582,751; 7,595,407; 7,633,007; 7,678,900; 7,723,513; 7,745,618; 7,884,280; 7,947,828; 7,947,829; 7,951,939; 7,964,720; 7,994,312; 8,013,149; 8,062,756; 8,080,653; 8,097,609; 8,129,520; 8,173,691; 8,173,692; 8,187,824; 8,188,298; 8,207,329; 8,212,023; 8,212,055; 8,278,439; 8,304,561; 8,445,695; 8,524,892; 8,530,459; 8,546,088; 8,664,260; 8,980,565; 9,303,165; 9,365,722; 9,417,245.

Yang et al. (2011) Photophysical Properties and Electronic Structure of Stable, Tunable Synthetic Bacteriochlorins: Extending the Features of Native Photosynthetic Pigments. *J Phys Chem B* 115:10801-10816.

Yu et al. (2014) Strongly Conjugated Hydroporphyrin Dyads: Extensive Modification of Hydroporphyrins' Properties by Expanding the Conjugated System. *J Org Chem* 79:7910-7925.

Zhang et al. (2009) Preparation of fluorescent polystyrene microspheres by gradual solvent evaporation method. *European Polymer Journal* 45:550-556.

It will be understood that various details of the presently disclosed subject matter may be changed without departing from the scope of the subject matter disclosed herein, Furthermore, the foregoing description and Examples are for the purpose of illustration only, and not for the purpose of limitation.

What is claimed is:

1. A fluorescent microparticle and/or nanoparticle, wherein the fluorescent microparticle and the fluorescent nanoparticle consists of a polystyrene bead and one or more fluorescent hydroporphyrins associated therewith, wherein each of the one or more fluorescent hydroporphyrins is selected from the group consisting of chlorins and bacteriochlorins, and wherein each of the one or more fluorescent hydroporphyrins has a structure selected from the group consisting of Formulas I and II:

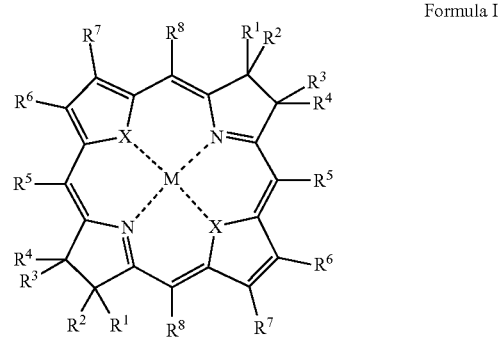

Formula I

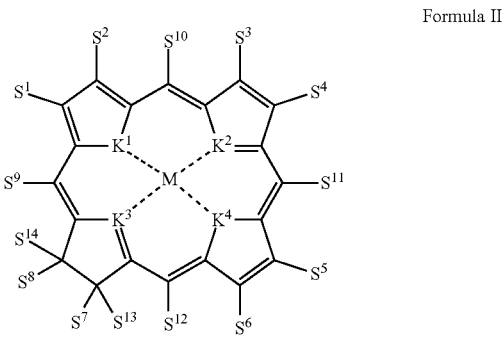

Formula II wherein:

M is a metal or is absent;

X is selected from the group consisting of Se, NH, $CH_2$, O and S; and $R^1$, $R^2$, $R^3$, $R^4$, $R^5$, $R^6$, $R^7$, and $R^8$ are independently selected from the group consisting of H, alkyl, alkenyl, alkynyl, cycloalkyl, cycloalkylalkyl, cycloalkylalkenyl, cycloalkylalkynyl, heterocyclo, heterocycloalkyl, heterocycloalkenyl, heterocycloalkynyl, aryl, arylalkyl, arylalkenyl, arylalkynyl, heteroaryl, heteroarylalkyl, heteroarylalkenyl, heteroarylalkynyl, alkoxy, halo, mercapto, azido, cyano, formyl, carboxylic acid, hydroxyl, nitro, acyl, aryloxy, alkylthio, amino, alkylamino, arylalkylamino, disubstituted amino, acylamino, acyloxy, ester, amide, sulfoxyl, sulfonyl, sulfonate, sulfonic acid, sulfonamide, urea, alkoxylacylamino, aminoacyloxy, linking groups, and surface attachment groups;

$K^1$, $K^2$, $K^3$, and $K^4$ are hetero atoms independently selected from the group consisting of N, O, S, Se, Te, and CH; and $S^3$, $S^4$, $S^7$, $S^8$, $S^9$, $S^{10}$, $S^{11}$, $S^{12}$, $S^{13}$, and $S^{14}$, and either $S^1$ and $S^5$, or $S^2$ and $S^6$ are independently selected from the group consisting of H, aryl, phenyl, cycloalkyl, alkyl, alkenyl, alkynyl, halogen, alkoxy, alkylthio, perfluoroalkyl, perfluoroaryl, pyridyl, cyano, thiocyanato, nitro, amino, alkylamino, acyl, sulfoxyl, sulfonyl, imido, amido, and carbamoyl; or $S^7$ and $S^{13}$ together form =O.

2. The fluorescent microparticle and/or nanoparticle of claim 1, wherein the fluorescent microparticle and/or nanoparticle is present in a population of fluorescent microparticles and/or nanoparticles, and further wherein:
(i) the population comprises a plurality of distinct fluorescent microparticles and/or nanoparticles;
(ii) each of the distinct fluorescent microparticles and/or nanoparticles is associated with one or more of the fluorescent hydroporphyrins that are distinct; and
(iii) each of the distinct hydroporphyrins has an emission wavelength band that has a full width at half maximum peak that is less than about 25 nm and that is separated by at least 5 nm from that of any of the other distinct hydroporphyrin in the population.

3. The fluorescent microparticle and/or nanoparticle of claim 1, wherein the one or more hydroporphyrins are non-covalently associated with the exterior of the polystyrene bead, is encapsulated by the polystyrene bead, or both.

4. A population comprising at least two distinct fluorescent microparticles and/or nanoparticles of claim 1, wherein:
(i) each of the fluorescent microparticles and/or nanoparticles consists of a polystyrene bead and one or more of the fluorescent hydroporphyrins associated therewith; and
(ii) the population comprises at least two distinct fluorescent microparticles and/or nanoparticles associated with the fluorescent hydroporphyrins that are different with respect to emission wavelength.

5. The population of claim 4, wherein each of the distinct fluorescent microparticles and/or nanoparticles is associated with one or more of the fluorescent hydroporphyrins that are distinct; and each of the distinct fluorescent hydroporphyrins has an emission wavelength band that has a full width at half maximum peak that is less than about 25 nm and that is separated by at least 5 nm from that of any of the other distinct hydroporphyrin in the population.

6. The population of claim 4, wherein said population comprises at least three, four, five, six, seven or eight distinct fluorescent microparticles and/or nanoparticles associated with at least three, four, five, six, seven or eight of the fluorescent hydroporphyrins that are distinct.

7. The population of claim 4, wherein each of the distinct fluorescent microparticles and/or nanoparticles in the population is capable of excitation by light at a single wavelength and/or by light between about 320 nm and about 450 nm.

8. The population of claim 4, wherein M is present and each M is independently selected from the group consisting of Pd, Pt, Mg, Zn, Al, Ga, In, Sn, Cu, Ni, and Au.

9. The population of claim 4, wherein the one or more of the fluorescent hydroporphyrins are selected from the group consisting of hydroporphyrins SE197, SE211, SE420, SE357, SE355, B56, B62, B66, and combinations thereof, and further wherein hydroporphyrins SE197, 3E211, SE420, SE357, SE355, B56, B62, and B66 have the following structures:

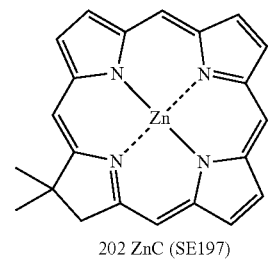

202 ZnC (SE197)

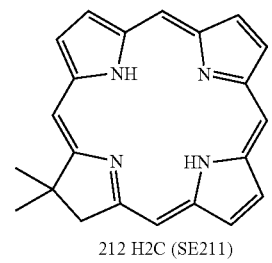

212 H2C (SE211)

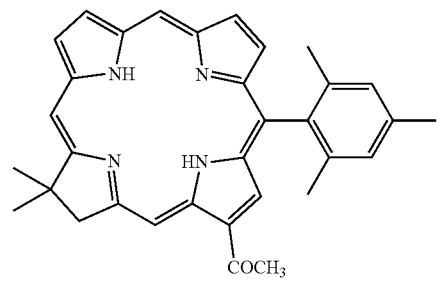

257 FbC-M10A13 (SE420)

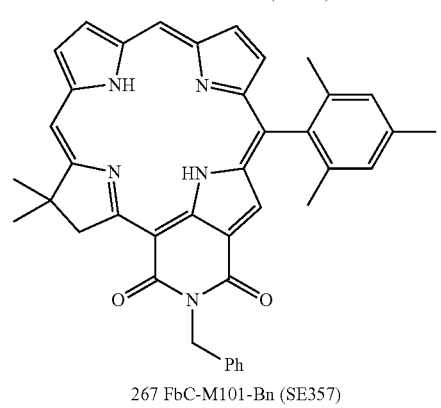

267 FbC-M101-Bn (SE357)

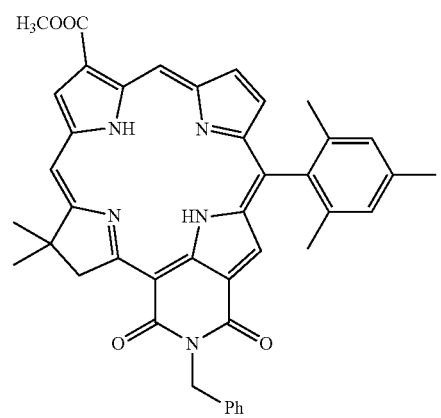

267 FbC-Es3M101-Bn (SE355)

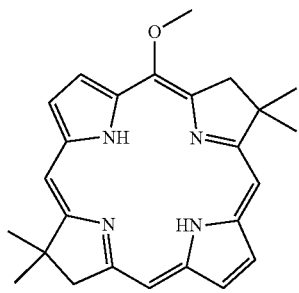

B56

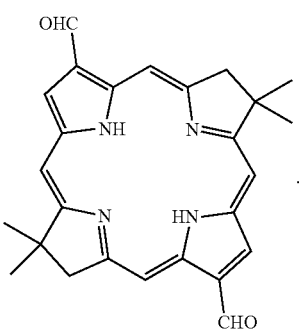

B66

OHC

B62

CHO

10. A composition consisting of (a) an antibody, or a fragment or derivative thereof and (b) a fluorescent microparticle and/or a nanoparticle; wherein the antibody, or a fragment or derivative thereof is covalently conjugated to the fluorescent microparticle and/or nanoparticle, and wherein the fluorescent microparticle and the fluorescent nanoparticle consists of a polystyrene bead and one or more fluorescent hydroporphyrins associated therewith, wherein each of the one or more fluorescent hydroporphyrins is selected from the group consisting of chlorins and bacteriochlorins, and wherein each of the one or more fluorescent hydroporphyrins has a structure selected from the group consisting of Formulas I and II:

Formula I

Formula II wherein:
M is a metal or is absent;
X is selected from the group consisting of Se, NH, $CH_2$, O and S; and
$R^1$, $R^2$, $R^3$, $R^4$, $R^5$, $R^6$, $R^7$, and $R^8$ are independently selected from the group consisting of H, alkyl, alkenyl, alkynyl, cycloalkyl, cycloalkylalkyl, cycloalkylalkenyl, cycloalkylalkynyl, heterocyclo, heterocycloalkyl, heterocycloalkenyl, heterocycloalkynyl, aryl, arylalkyl, arylalkenyl, arylalkynyl, heteroaryl, heteroarylalkyl, heteroarylalkenyl, heteroarylalkynyl, alkoxy, halo, mercapto, azido, cyano, formyl, carboxylic acid, hydroxyl, nitro, acyl, aryloxy, alkylthio, amino, alkylamino, arylalkylamino, disubstituted amino, acylamino, acyloxy, ester, amide, sulfoxyl, sulfonyl, sulfonate, sulfonic acid, sulfonamide, urea, alkoxylacylamino, aminoacyloxy, linking groups, and surface attachment groups;
$K^1$, $K^2$, $K^3$, and $K^4$ are hetero atoms independently selected from the group consisting of N, O, S, Se, Te, and CH; and
$S^3$, $S^4$, $S^7$, $S^8$, $S^9$, $S^{10}$, $S^{11}$, $S^{12}$, $S^{13}$, and $S^{14}$, and either $S^1$ and $S^5$, or $S^2$ and $S^6$ are independently selected from the group consisting of H, aryl, phenyl, cycloalkyl, alkyl, alkenyl, alkynyl, halogen, alkoxy, alkylthio, perfluoroalkyl, perfluoroaryl, pyridyl, cyano, thiocyanato, nitro, amino, alkylamino, acyl, sulfoxyl, sulfonyl, imido, amido, and carbamoyl; or $S^7$ and $S^{13}$ together form =O.

11. The composition of claim 10, wherein the fluorescent hydroporphyrin is selected from the group consisting of hydroporphyrins SE197, SE211, SE420, SE357, SE355, B56, B62, B66, and combination thereof.

* * * * *